United States Patent
Plesniak et al.

(10) Patent No.: US 12,253,157 B2
(45) Date of Patent: Mar. 18, 2025

(54) SYSTEMS AND METHODS OF USE OF SLEW DRIVERS WITH SENSOR CARRIERS

(71) Applicant: Kinematics, LLC, Phoenix, AZ (US)

(72) Inventors: Adam Plesniak, Huntington Beach, CA (US); Peter Hruby, Scottsdale, AZ (US); Brandon Larson, Lakewood, CA (US)

(73) Assignee: Kinematics, LLC, Phoenix, AZ (US)

( * ) Notice: Subject to any disclaimer, the term of this patent is extended or adjusted under 35 U.S.C. 154(b) by 399 days.

(21) Appl. No.: 17/733,725

(22) Filed: Apr. 29, 2022

(65) Prior Publication Data
US 2022/0349462 A1    Nov. 3, 2022

Related U.S. Application Data

(60) Provisional application No. 63/182,400, filed on Apr. 30, 2021.

(51) Int. Cl.
*F16H 57/01*    (2012.01)
*F16H 57/021*   (2012.01)
*F16H 57/029*   (2012.01)
*F16H 57/039*   (2012.01)

(52) U.S. Cl.
CPC .......... *F16H 57/01* (2013.01); *F16H 57/021* (2013.01); *F16H 57/029* (2013.01); *F16H 57/039* (2013.01); *F16H 2057/012* (2013.01); *F16H 2057/0213* (2013.01)

(58) Field of Classification Search
CPC ...... F16H 57/01; F16H 57/021; F16H 57/029; F16H 57/039; F16H 2057/012; F16H 2057/0213
See application file for complete search history.

(56) References Cited

U.S. PATENT DOCUMENTS

| | | | |
|---|---|---|---|
| 6,289,749 B1* | 9/2001 | Sanders | G01L 5/12 73/862.49 |
| 2004/0103735 A1 | 6/2004 | Bruhn | |
| 2010/0005897 A1 | 1/2010 | Fleury et al. | |
| 2013/0337958 A1 | 12/2013 | Scalf et al. | |
| 2015/0300479 A1 | 10/2015 | Frank | |
| 2017/0241524 A1 | 8/2017 | Olsson | |
| 2018/0136059 A1* | 5/2018 | Fulleringer | G01L 3/1457 |
| 2018/0358922 A1* | 12/2018 | Plesniak | F16H 57/039 |
| 2020/0109767 A1* | 4/2020 | Plesniak | F16H 57/039 |

FOREIGN PATENT DOCUMENTS

WO    WO-2022232636 A1    11/2022

OTHER PUBLICATIONS

PCT/US2022/027122 International Search Report and Written Opinion dated Jul. 25, 2022.

* cited by examiner

*Primary Examiner* — Eric S. McCall
*Assistant Examiner* — Timothy P Graves
(74) *Attorney, Agent, or Firm* — Wilson Sonsini Goodrich & Rosati

(57) ABSTRACT

Disclosed herein are novel slew drive components and systems. In some cases, a slew drive system can comprise a sensor configured to measure deformation in a deformation element of a sensor carrier component, which can result from axial displacement of a worm gear of the slew drive system. In some cases, measured deformation of a deformation element can be used to determine torque applied to a worm gear by a slew drive worm wheel, as described herein.

21 Claims, 40 Drawing Sheets

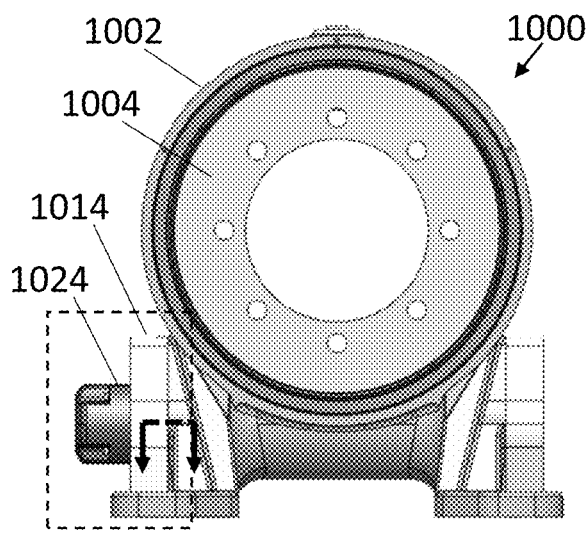
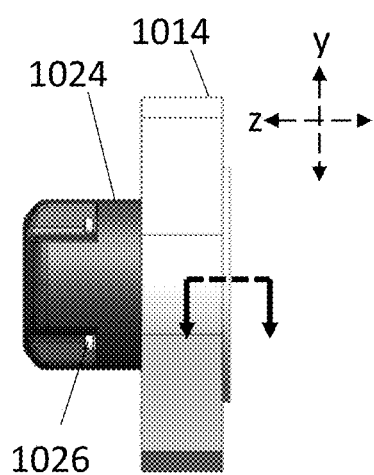
FIG. 5B
FIG. 5C
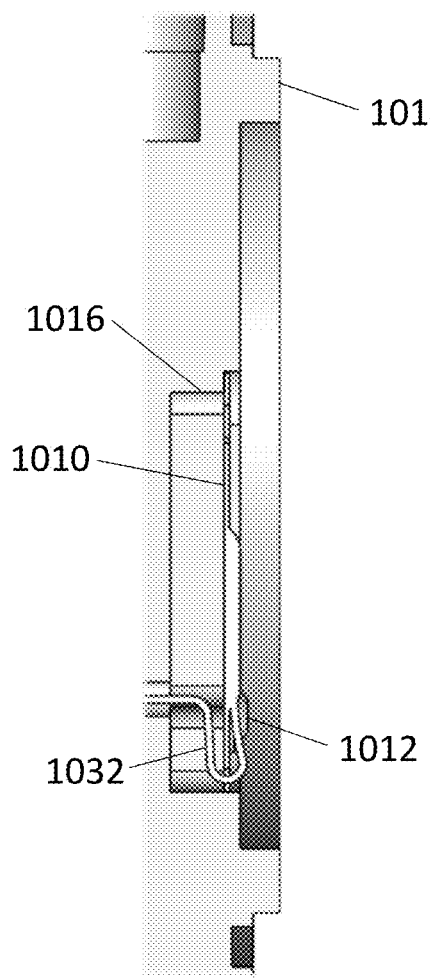
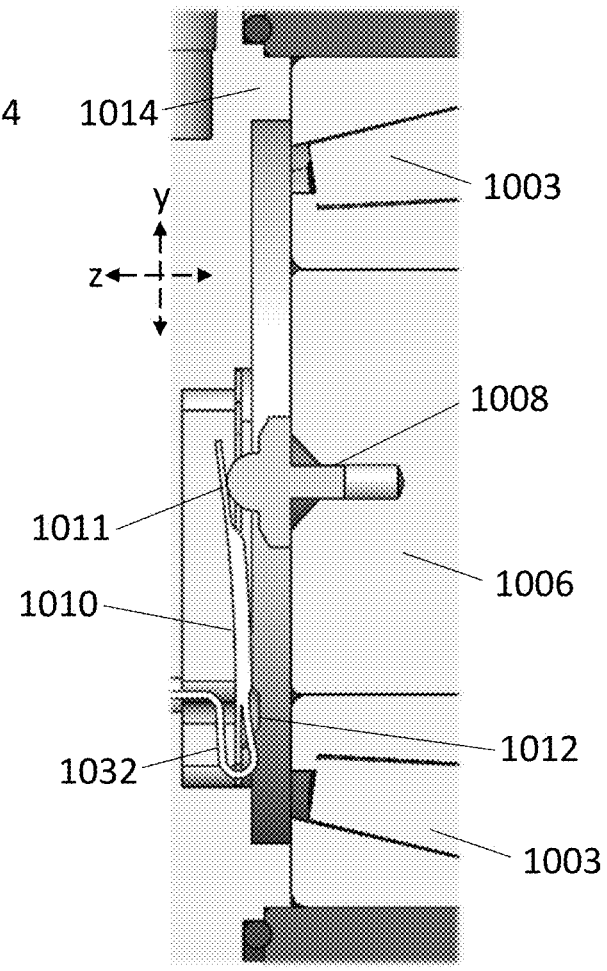
FIG. 5D
FIG. 5E

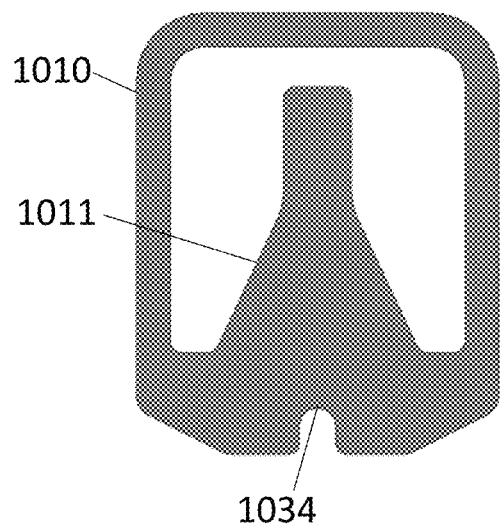
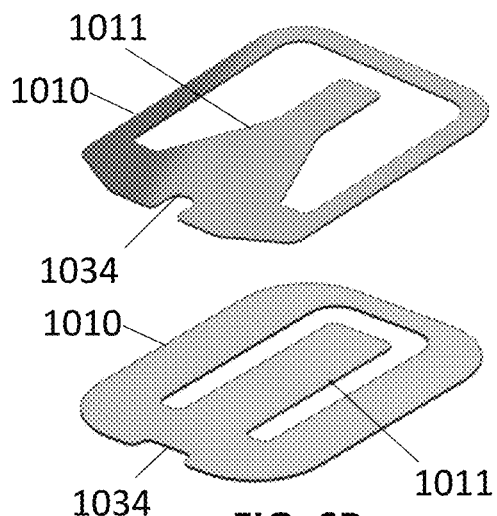
FIG. 6A
FIG. 6B
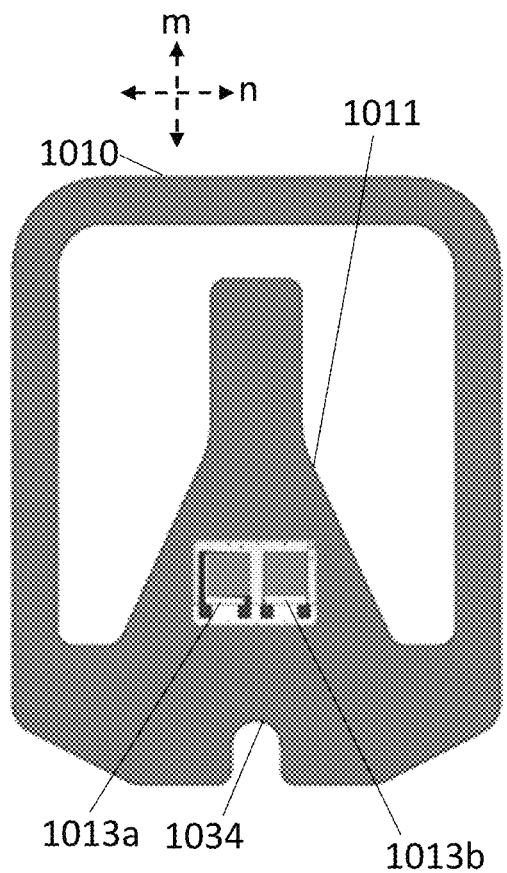
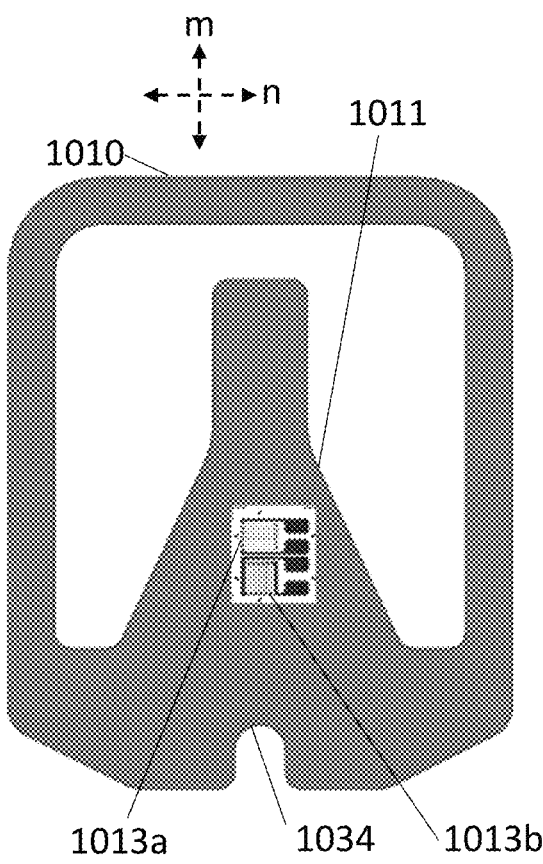
FIG. 6C
FIG. 6D

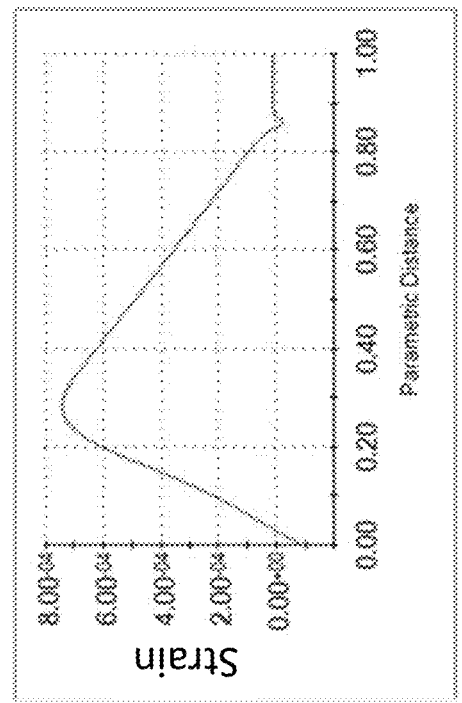
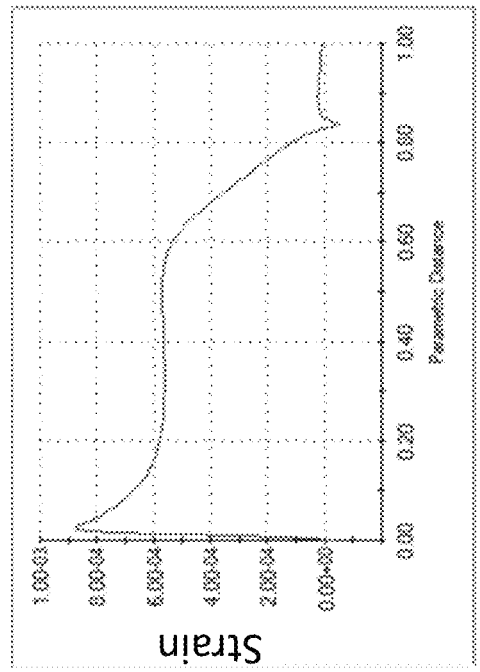
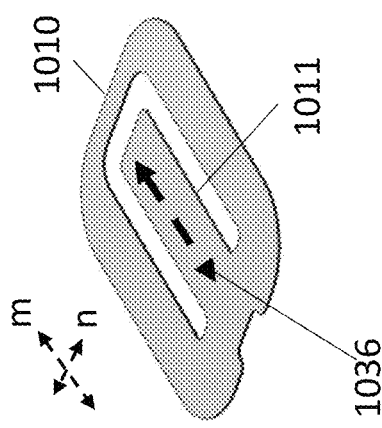
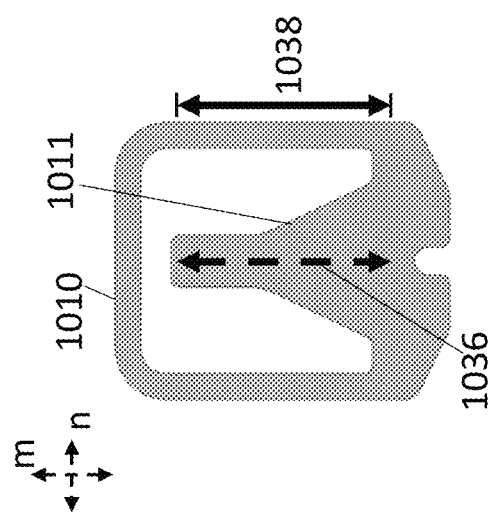
FIG. 7A
FIG. 7B

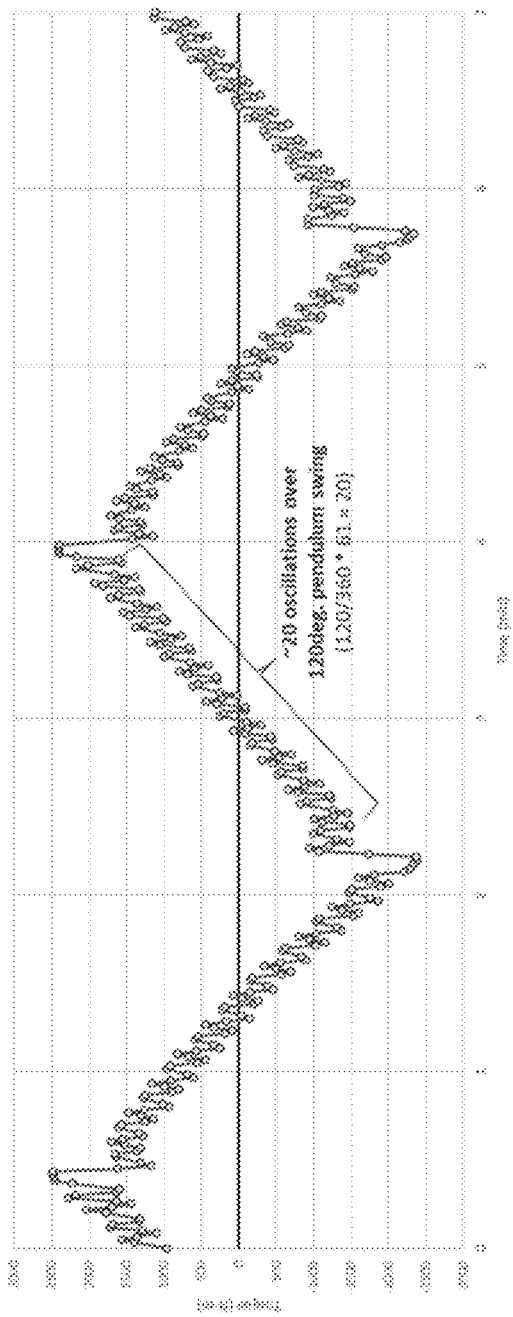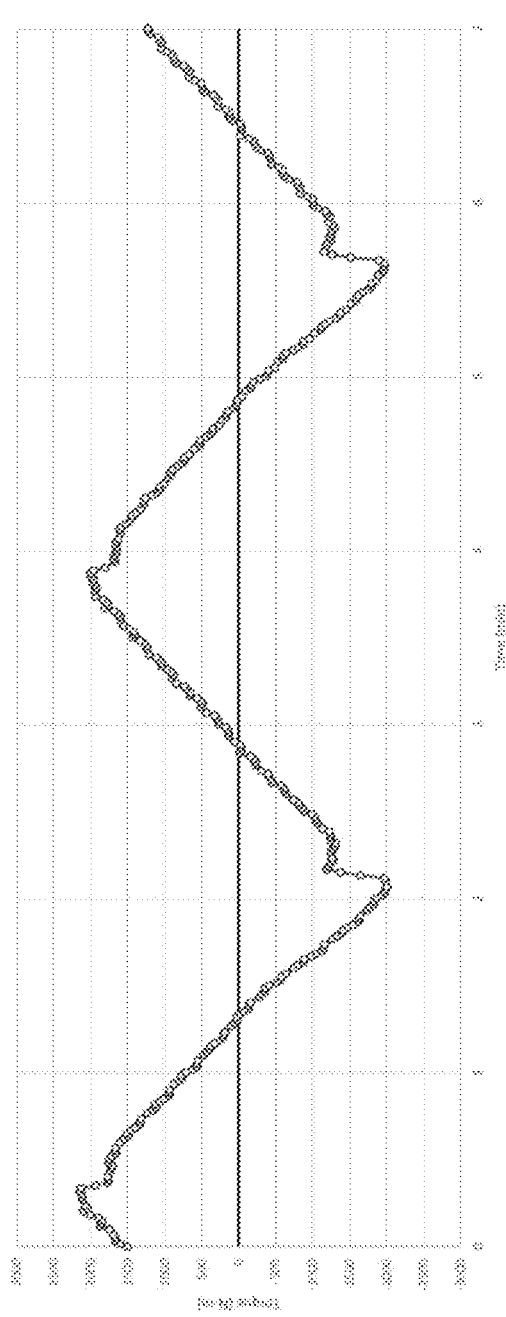
FIG. 18G
FIG. 18H

FIG. 18-I

SYSTEMS AND METHODS OF USE OF SLEW DRIVERS WITH SENSOR CARRIERS

CROSS-REFERENCE

This application claims the benefit of U.S. Provisional Application No. 63/182,400, filed Apr. 30, 2021, which is hereby incorporated by reference in its entirety herein.

BACKGROUND

A slew drive is a type of gearbox which can withstand axial and radial loads while transmitting torque to drive an external unit. Applications where a slew drive is utilized include solar trackers, wind turbines, lifts, and cranes, to name a few. Slew drives generally include a threaded shaft having a threaded section, commonly referred to as the worm gear and a geared wheel having teeth, commonly referred to as the worm wheel. The threaded section of the worm gear engages the teeth of the worm wheel thereby rotating the worm wheel. The worm gear rotates along its own axial axis at a rotational speed causing the worm wheel to rotate along its axial axis at a different rotational speed. The axes of rotation of the worm gear and worm wheel are, in general, perpendicular, although they can be at a different angle. Displacement of a worm gear in an axial direction relative to the worm gear can impact performance and safety of the slew drive. Therefore, it is important to develop systems capable of precise measurement of axial worm gear displacement.

SUMMARY

This application relates to improved slew drive devices and systems. In various aspects, a system disclosed herein comprises: a slew drive end plate; a sensor carrier comprising a cantilevered deformation element; and one or more sensors coupled to the cantilevered deformation element, wherein the sensor carrier is coupled to the end plate. In various aspects, a system disclosed herein comprises: a slew drive plug; a sensor carrier comprising a cantilevered deformation element; and one or more sensors coupled to the cantilevered deformation element, wherein the sensor carrier is coupled to the end plate. In some cases, the one or more sensors are configured to measure a deformation of the cantilevered deformation element. In some cases, the one or more sensors comprises a strain gauge sensor or a force sensor. In some cases, a system further comprises a controller in communication with at least one sensor of the one or more sensors. In some cases, a system further comprises a distal end cap coupled to the slew drive end plate, wherein the controller is coupled to the distal end cap. In some cases, a system further comprises a distal end cap coupled to the slew drive plug, wherein the controller is coupled to the distal end cap. In some cases, a system further comprises a worm gear interface pin. In some cases, the worm gear interface pin comprises one or more worm interface pin post flanges. In some cases, the worm gear interface pin comprises a rounded interface surface. In some cases, the worm gear interface pin comprises a worm interface pin post configured to engage a worm gear end surface hole. In some cases, one or more sensors comprises a plurality of linear strain gauge sensors. In some cases, the cantilevered deformation element decreases in width along its length. In some cases, a system further comprises a slew drive housing, wherein the slew drive end plate is coupleable to the slew drive housing. In some cases, a system further comprises a slew drive housing, wherein the slew drive plug is coupleable to the slew drive housing. In some cases, the interface surface of the worm interface pin is in contact with the cantilevered deformation element when the slew drive end plate is coupled to the slew drive housing. In some cases, the interface surface of the worm interface pin is in contact with the cantilevered deformation element when the slew drive plug is coupled to the slew drive housing. In some cases, the controller comprises a non-transitory memory. In some cases, a system further comprises a temperature sensor. In some cases, the temperature sensor is coupled to the controller. In various aspects, a system comprises: a housing comprising a worm gear shaft having an end wall; a sensor carrier comprising a cantilevered deformation element; and one or more sensors coupled to the cantilevered deformation element, wherein the sensor carrier is coupled to the end wall of the worm gear shaft. In various aspects, a system comprises: a slew drive protrusion cap; a sensor carrier comprising a cantilevered deformation element; and one or more sensors coupled to the cantilevered deformation element, wherein the sensor carrier is coupled to the protrusion cap.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the present disclosure will be obtained by reference to the following detailed description that sets forth illustrative embodiments, in which the principles of the disclosure are utilized, and the accompanying drawings of which:

FIG. 5B shows a schematic of a slew drive system, in accordance with embodiments.

FIG. 5C shows a proximal end plate and distal end cap of a slew drive system, in accordance with embodiments.

FIG. 5D shows a schematic of an undeformed sensor of a slew drive system, in accordance with embodiments.

FIG. 5E shows a schematic of a slew drive sensor deflected by a worm interface pin, in accordance with embodiments.

FIG. 6A shows a schematic of a sensor carrier, in accordance with embodiments.

FIG. 6B shows a schematic of a sensor carrier, in accordance with embodiments.

FIG. 6C shows a schematic of a sensor carrier comprising a plurality of sensors, in accordance with embodiments.

FIG. 6D shows a schematic of a sensor carrier comprising a plurality of sensors, in accordance with embodiments.

FIG. 7A shows a schematic of a sensor carrier and a strain relationship for a sensor carrier, in accordance with embodiments.

FIG. 7B shows a schematic of a sensor carrier and a strain relationship for a sensor carrier, in accordance with embodiments.

FIG. 18G shows a graph of slew drive sensor data, in accordance with embodiments.

FIG. 18H shows a graph of slew drive sensor data, in accordance with embodiments.

FIG. 18-I shows a schematic of a worm gear interface pin and a worm gear end surface, in accordance with embodiments.

DETAILED DESCRIPTION

Disclosed herein are improved slew drive systems and improved slew drive components. In some embodiments, improved control and precision of a slew drive system's motion, monitoring, and/or safety can be achieved by positioning a sensor carrier 1010 comprising one or more sensors 1013 such that displacement of a worm gear 1006 of the slew drive system 1000 causes compressive and/or tensile deformation the one or more sensors 1013, e.g., by deformation of a portion of the sensor carrier 1010.

Figure 1:
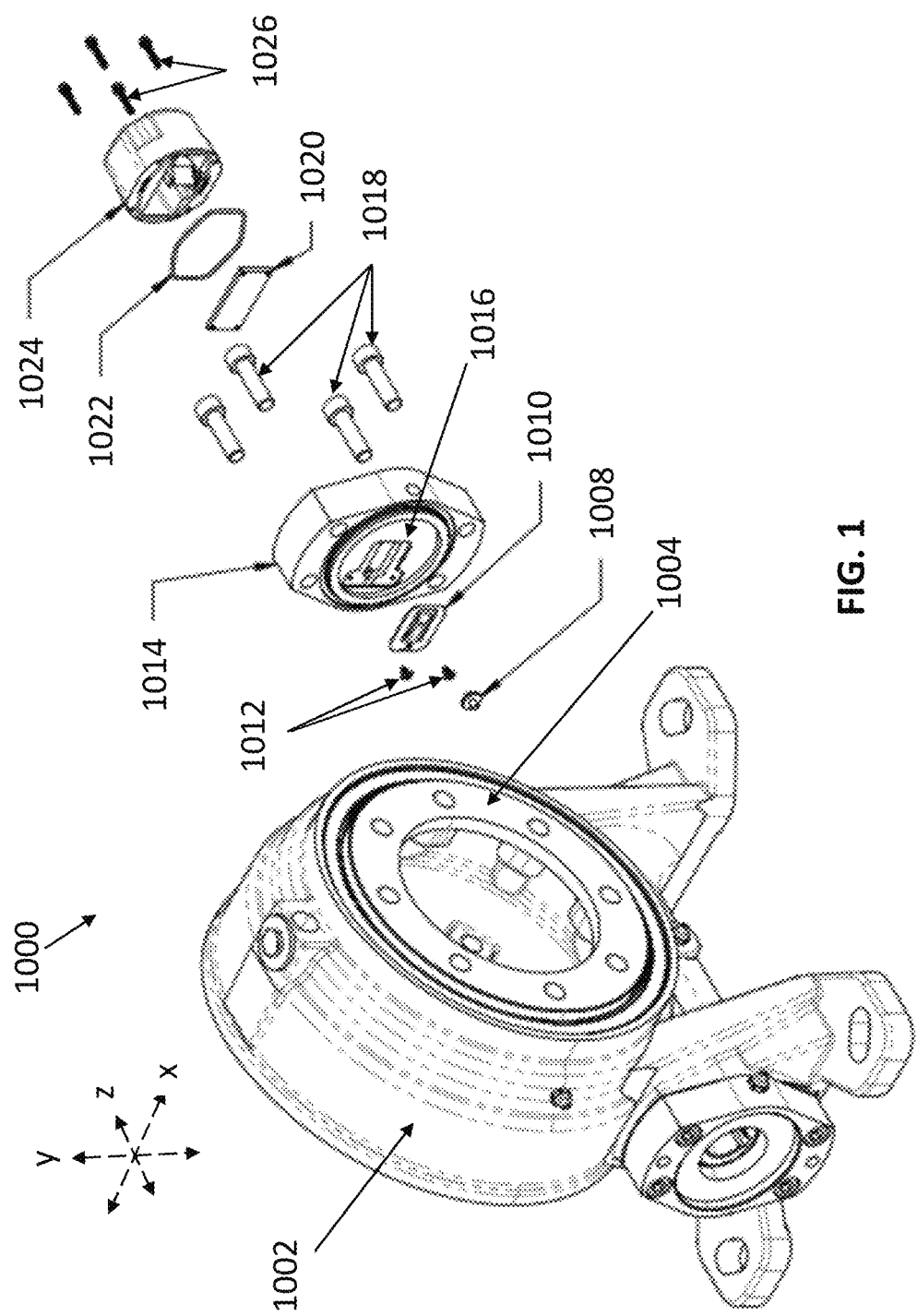
FIG. 1 shows an exploded view schematic of a slew drive system comprising a proximal end plate, in accordance with embodiments.
Figure 2:
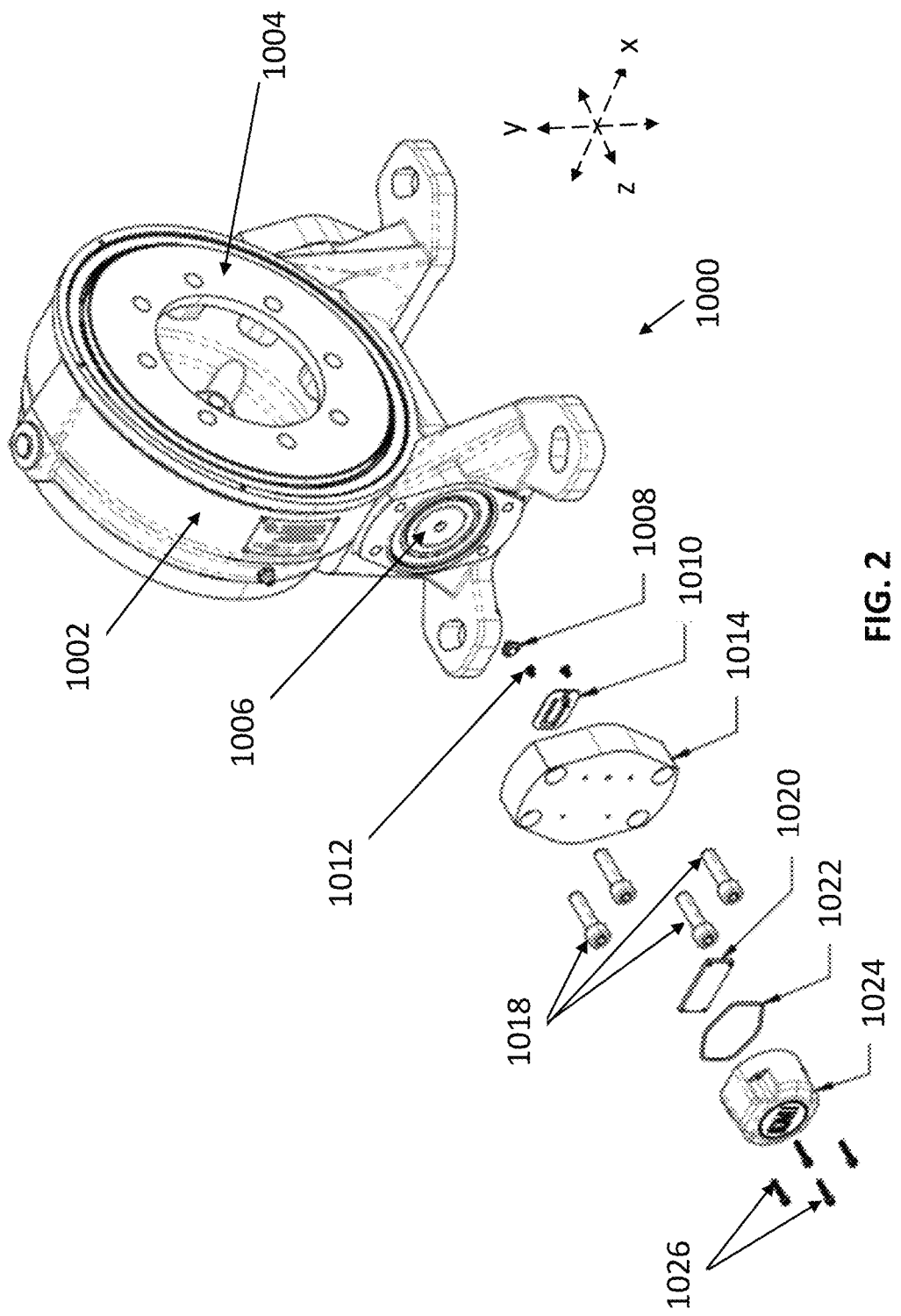
FIG. 2 shows a reverse view of the schematic of the slew drive system shown in FIG. 1, in accordance with embodiments.
Figure 3:
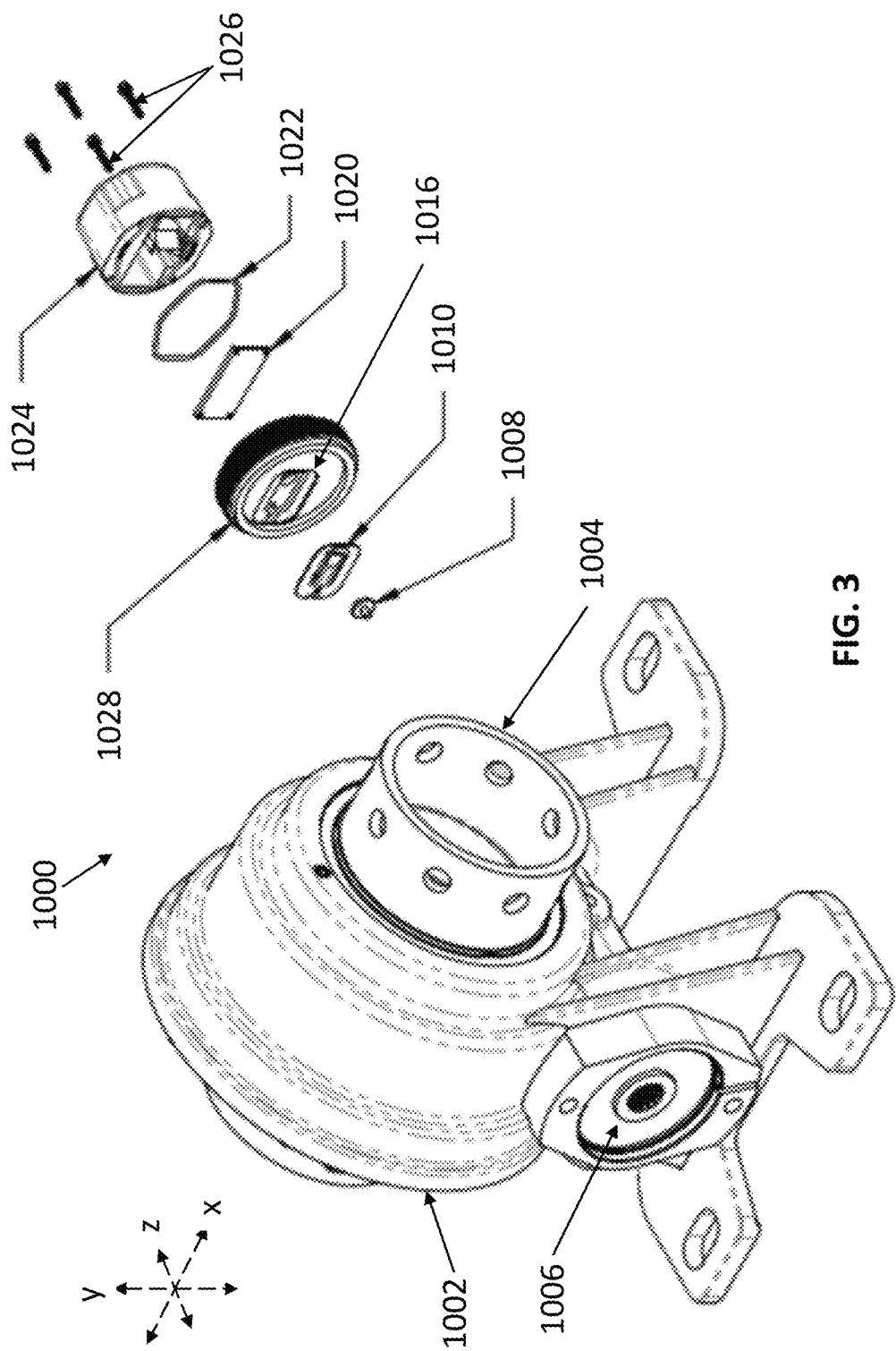
FIG. 3 shows an exploded view schematic of a slew drive system comprising a plug, in accordance with embodiments.
Figure 4:
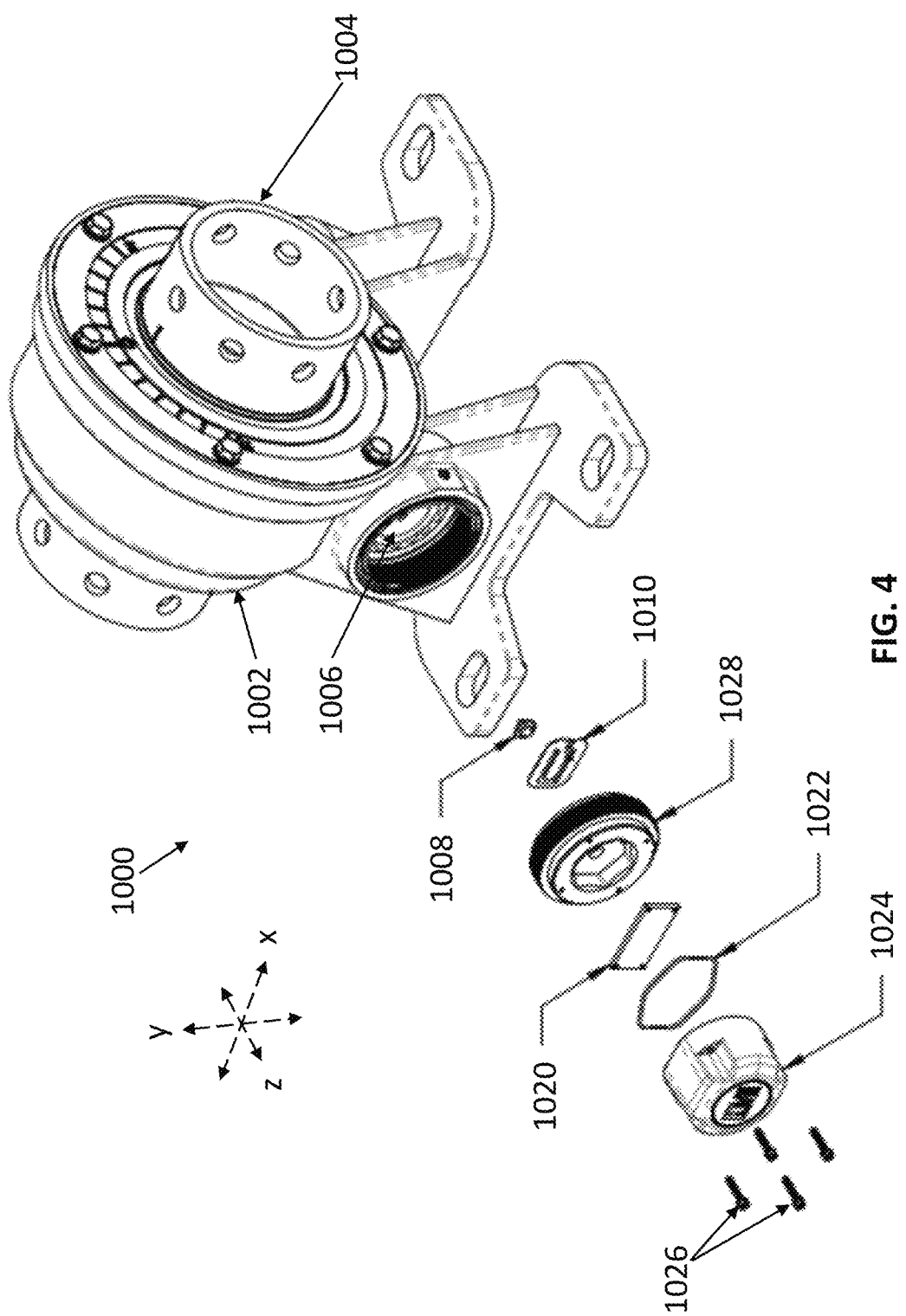
FIG. 4 shows a reverse view of the schematic of the slew drive system shown in FIG. 3, in accordance with embodiments.
Figure 5A:
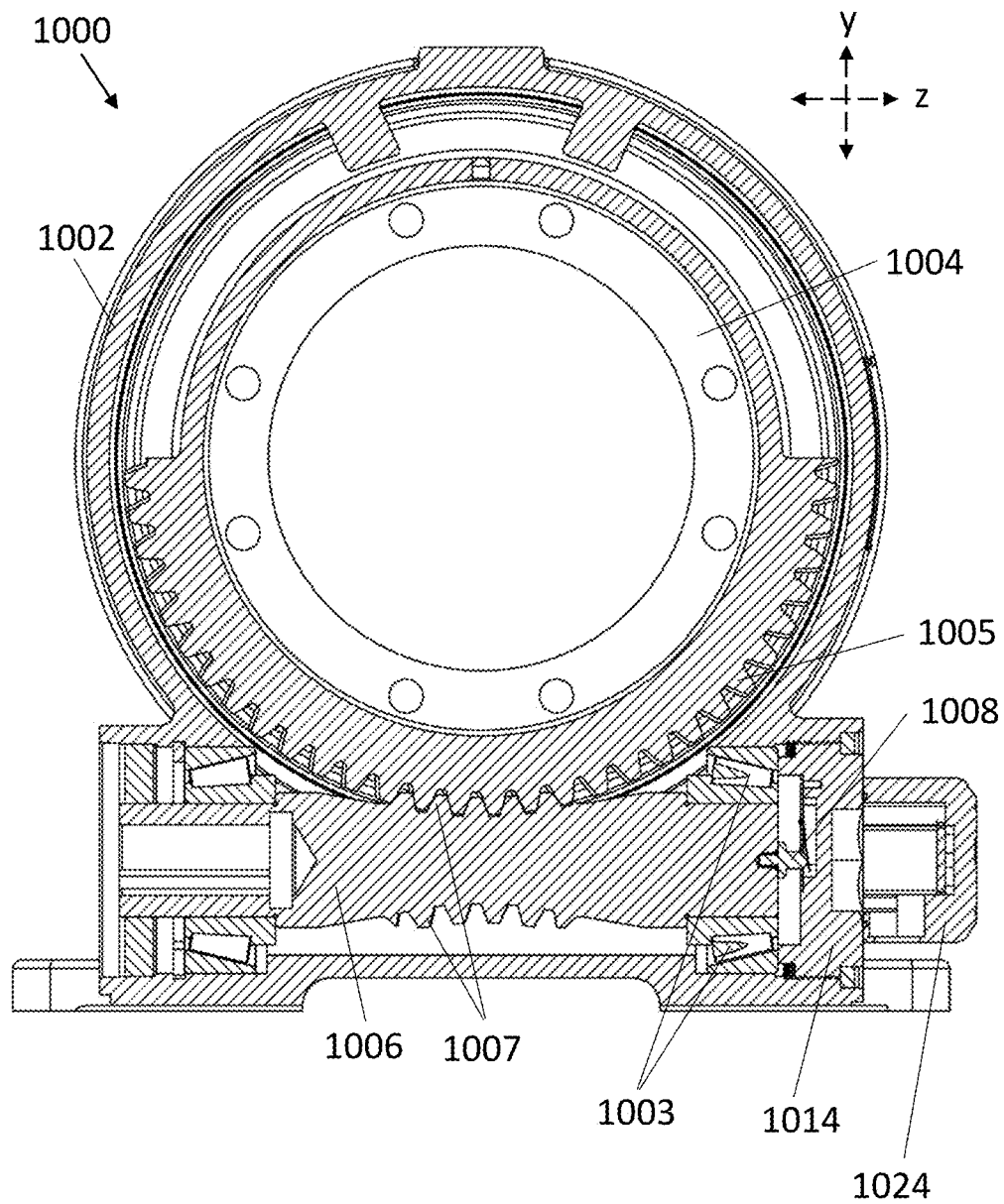
FIG. 5A shows a schematic of a slew drive system, in accordance with embodiments.

FIG. 1, FIG. 2, FIG. 3, and FIG. 4 show exploded views of slew drive systems 1000 from opposite angles. FIG. 1 shows a slew drive housing 1002 comprising a worm wheel 1004 and worm gear 1006. Worm wheel 1004 can interface with a worm gear 1006 via a mechanism capable of transmitting rotational force about a rotational axis of worm wheel 1004 (e.g., direction "x" as shown in FIGS. 1 and 2) to axial force along an axial direction of worm gear 1006 (e.g., direction "z" as shown in FIGS. 1 and 2). Such a mechanism can comprise gear threads (or teeth) disposed on an outer circumference of worm wheel 1004 contacting (e.g., engaging) threads disposed on a portion (e.g., a surface or edge) of worm gear 1006, for example, as shown in FIG. 5A. In some cases, rotation of worm wheel 1004 can cause a force (e.g., a torque) to be applied to a portion of worm gear 1006 (e.g., to gear threads or teeth disposed on the portion of worm gear 1006). In some cases, a force applied to worm gear 1006 (e.g., torque exerted upon worm gear 1006 by worm wheel 1004) can cause axial displacement of worm gear 1006 (e.g., along axial direction "z").

A slew drive system 1000 can comprise one or more sensors 1013. In some cases, a slew drive system can comprise a plurality of sensors. One or more sensors 1013 of slew drive system 1000 can be used to measure the displacement of worm gear 1006 (e.g., displacement along axial direction "z", for example, relative to slew drive housing 1002). In some cases, a strain gauge or a force sensor can be used to measure displacement of a worm gear 1006 (e.g., along axial direction "z", e.g., relative to slew drive housing 1002), for example, as a result of torque applied to the worm gear 1006 by worm wheel 1004. Precise measurement of worm gear displacement (e.g., along axial direction "z") can allow for improved precision in control of slew drive function (e.g., rotation of worm wheel 1004 about worm wheel axial direction "x" and/or displacement of worm gear 1006). Improved control of slew drive function can improve the precision and safety of the slew drive's operation.

A slew drive sensor 1013 can comprise a force sensor or a strain gauge sensor. In some cases, a slew drive system 1000 can comprise a plurality of sensors 1013. In some cases, a sensor 1013 of a slew drive system 1000 can be disposed on a sensor carrier 1010 of slew drive system 1000. A sensor carrier 1010 can aid in maintaining the position of a sensor 1013 (e.g., relative to a slew drive housing 1002 and/or a worm gear 1006 (e.g., serving as a means to couple one or more sensors 1013 to one or more of a sensor carrier mount 1016, a proximal end plate 1014, and/or a slew drive housing 1002).

A sensor carrier 1010 or a portion thereof can serve as a sensor measurement substrate. For example, a sensor 1013 may be configured (e.g., positioned or oriented on (or within) the sensor carrier 1010) to measure a deformation in the sensor carrier 1010. In some cases, deformation of a sensor 1013 may be mediated by a sensor carrier 1010 or a portion thereof. For example, a sensor carrier 1010 can comprise a deformation element 1011. In some cases, deformation of a deformation element 1011 of a sensor carrier 1013 can result from a worm gear 1006 or worm interface pin 1009 impinging on the sensor carrier or a portion thereof (e.g., as a result of displacement of the worm gear 1006 in an axial direction "z" of the worm gear). In some cases, deformation of a deformation element 1011 of a sensor carrier 1013 can be measured or detected by a sensor 1013 (e.g., a strain gauge sensor). In some embodiments, the magnitude and/or rate (e.g., over time) of a measured or detected deformation of a deformation element 1011 of a sensor carrier 1013 can be used to calculate a displacement of a worm gear 1006 (e.g., in an axial direction "z" of the worm gear) and/or a rotation or torque of a worm wheel 1004 (e.g., around an axial direction "x" of the worm wheel) with great precision. In some cases, deformation of a deformation element 1011 of a sensor carrier 1013 (e.g., as a result of a worm gear 1006 or worm interface pin 1009 impinging on the sensor carrier 1013 or a portion thereof) can cause the deformation element 1011 or a portion thereof to impinge upon a sensor 1013 (e.g., a force sensor), which may be coupled to the sensor carrier. In some cases, a deformation element 1011 or a portion thereof impinging upon a sensor 1013 (e.g., a force sensor) can facilitate measurement of worm gear 1006 displacement (e.g., relative to slew drive housing 1002).

A slew drive system 1000 can comprise a sensor carrier 1010. A sensor carrier 1010 can comprise one or more sensors 1013. In some cases, a sensor carrier 1010 can comprise a plurality of sensors 1013. For example, a sensor carrier 1010 can comprise 1, 2, 3, 4, 5, 6, 7, 8, 9, 10, 11-19, 20, 21-49, 50, or more than 50 sensors. In some cases, one or more sensors 1013 can be coupled to a sensor carrier by one or more fasteners. Fasteners can include a screw, a rivet, a grommet a hook, a threaded nut (and, optionally, a nut), a pin, a nail, a latch, a clamp, a staple, a strap or tie, a tape, a clamp, a button, a flange, a retainer such as a retaining ring, or a biasing element such as a clip. In some cases, one or more sensors 1013 can be coupled to a sensor carrier 1010 by an adhesive. Adhesives can include a glue, a cement, a putty, a paste, or an epoxy. In some cases, two or more components of a slew drive system can be coupled to one another by welding or soldering the components together.

A sensor carrier 1010 can comprise one or more force sensors 1013 and/or one or more strain gauge sensors 1013. In some cases, a slew drive sensor carrier 1010 comprises a strain gauge sensor. In some cases, a sensor 1013 comprising a force sensor comprises a piezoelectric load cell, an inductive load cell, or a capacitive load cell.

The location and/or orientation of a sensor 1013 relative to a sensor carrier 1010 (e.g., on which the sensor is disposed) and/or a slew gear 1006 of slew drive system 1000 can affect the performance of the sensor 1013. In many cases, one or more sensors 1013 of a slew drive system 1000 can be coupled to a sensor carrier 1010. For example, one or more sensors 1013 can be integrated into or affixed upon a sensor carrier 1010. In some cases, coupling one or more sensors 1013 to a sensor carrier 1010 can improve the positioning of the sensor 1013 in a slew drive system 1000 and/or the sensitivity of the sensor 1013 in measuring a displacement (e.g., axial displacement) of a worm gear 1006 in a slew drive system 1000. One or more sensors 1013 can be disposed in contact with a deformation element 1011 of a sensor carrier 1010. In some cases (e.g., wherein the one or more sensors 1013 comprises a strain gauge). In some cases, one or more sensors 1013 can be disposed on a surface of a deformation element 1011 of a sensor carrier 1010 (e.g., as shown in FIGS. 6C and 6D). In some cases, a sensor 1013 (e.g., one or more force sensors 1013) can be disposed in line (e.g., along the same axial line) with a contact point such as a portion of worm gear 1006 or worm interface pin 1008 (e.g., wherein the worm gear 1006 or worm interface pin 1008 contacts a deformation element 1011 of sensor carrier 1010, which can contact sensor 1013, e.g., as shown in FIG. 19 and FIG. 20A-FIG. 20C). In some cases, a sensor 1013 (e.g., one or more strain gauge sensors 1013) are not disposed in line with (e.g., along the same axial line) a contact point such as a portion of worm gear 1006 or worm interface pin 1008 (e.g., wherein worm gear 1006 or worm interface pin 1008 contacts a deformation element 1011 of sensor carrier 1010, which can deform the sensor 1013 without impinging upon it, for example, by causing the sensor 1013 to stretch).

A sensor carrier 1010 (e.g., comprising one or more sensors 1013) can be in contact with (e.g., fastened to or affixed to) a proximal end plate 1014 or a plug 1028. In some cases, a proximal end plate 1014 or a plug 1028 can comprise a sensor carrier mount 1016. A sensor carrier mount 1016 (e.g., in concert with the proximal end plate 1014) can aid in maintaining the position of a sensor carrier 1010 (e.g., relative to a slew drive housing 1002 and/or a worm gear 1006 of slew drive system 1000, or a portion thereof). For example, a sensor carrier 1010 comprising one or more sensors 1013 can be coupled to a sensor carrier mount 1016 (e.g., via one or more sensor carrier fasteners 1012), which can in turn be coupled to a plug 1028 or a proximal end plate 1018, the plug 1028 or proximal end plate 1018 being coupled in some cases to a slew drive housing 1002 of the slew drive system 1000 (e.g., via proximal end cap fasteners 1018 and/or threading 1030). In some embodiments, a plug 1028 (or a portion thereof) or a proximal end plate 1014 (or a portion thereof) comprises a sensor carrier mount 1016. Maintaining the position of sensor carrier (e.g., relative to a slew drive housing 1002 and/or worm gear 1006) can improve the performance (e.g., precision and/or accuracy) of one or more sensors 1013 positioned on sensor carrier 1010. In some cases, a sensor 1013 (e.g., a temperature sensor 1048) of slew drive system 1000 can be disposed on controller 1020. In some cases, a sensor carrier mount 1016 can be coupled to (e.g., fastened to or affixed to) a proximal end plate 1014 or a plug 1028. A proximal end plate 1014 can be coupled to (e.g., fastened to or affixed to) a slew drive housing 1002 of a slew drive system 1000 (e.g., via proximal end plate fasteners 1018, which may be passed through proximal end plate fastener holes 1019 in the proximal end plate 1014). A plug 1028 can be coupled to a slew drive housing 1002, for example, via screw threading 1030 on the plug 1028, which may correspond to threading on the slew drive housing 1002.

Figure 28:
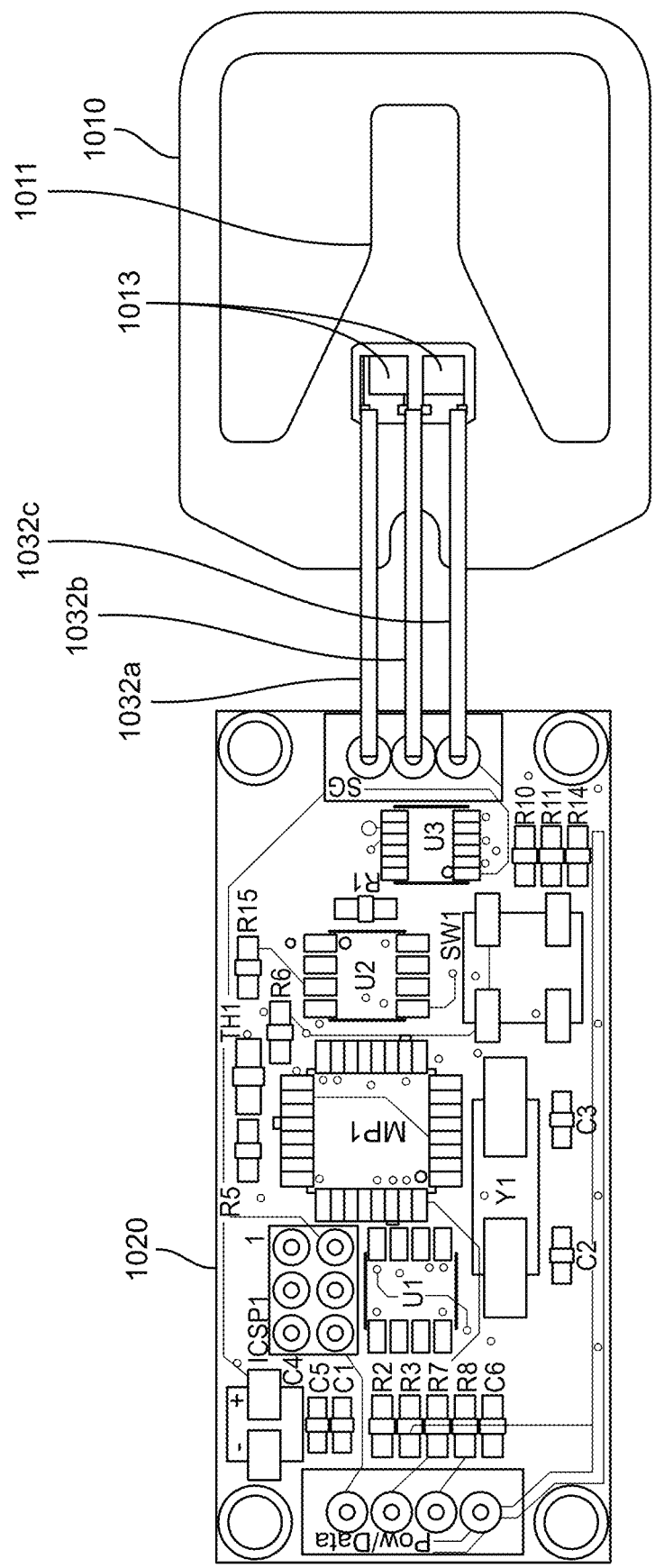
FIG. 28 shows a schematic of a controller and a sensor carrier, in accordance with embodiments.
Figure 29:
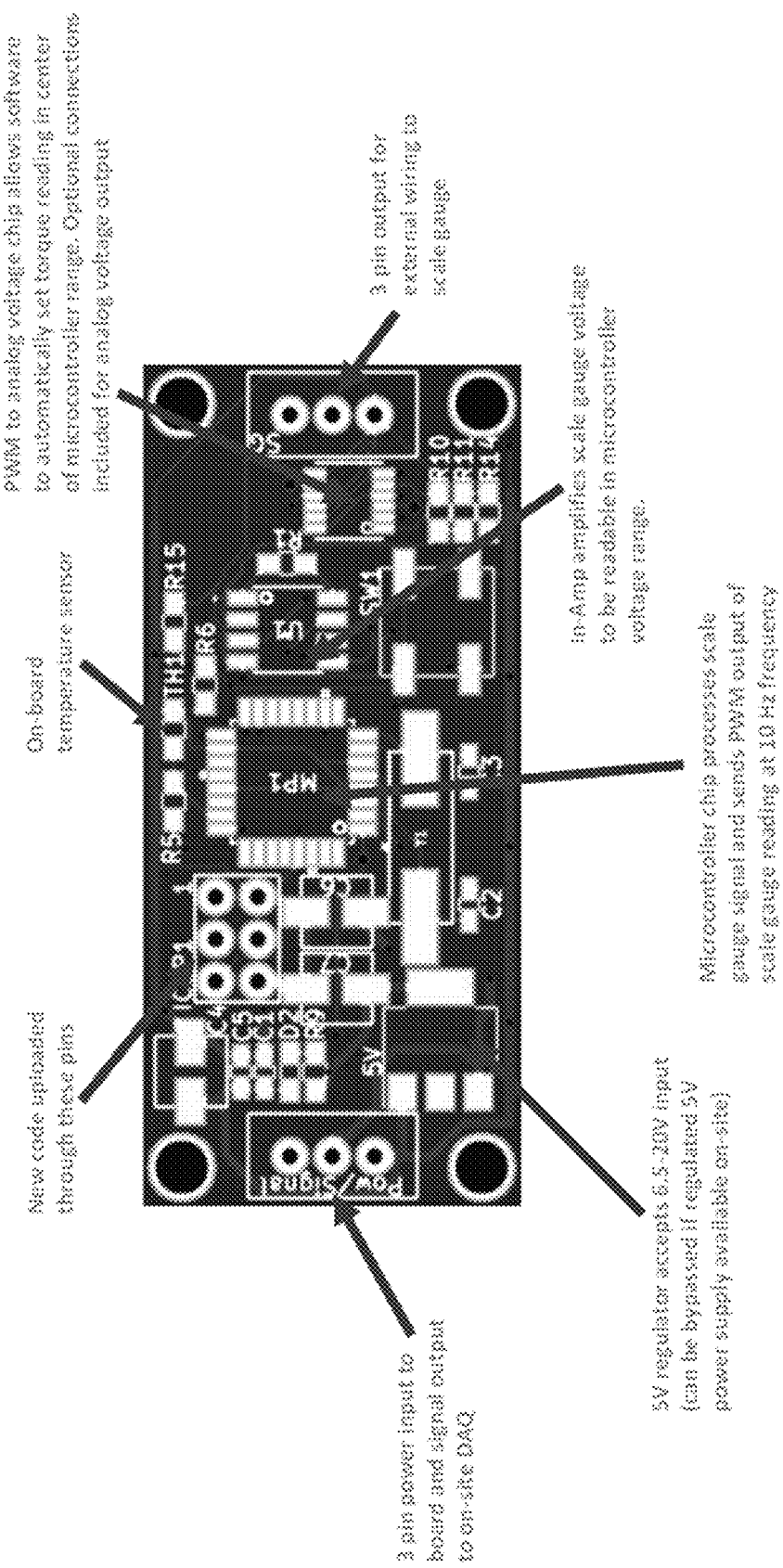
FIG. 29 shows a diagram of a controller, in accordance with embodiments.
Figure 30:
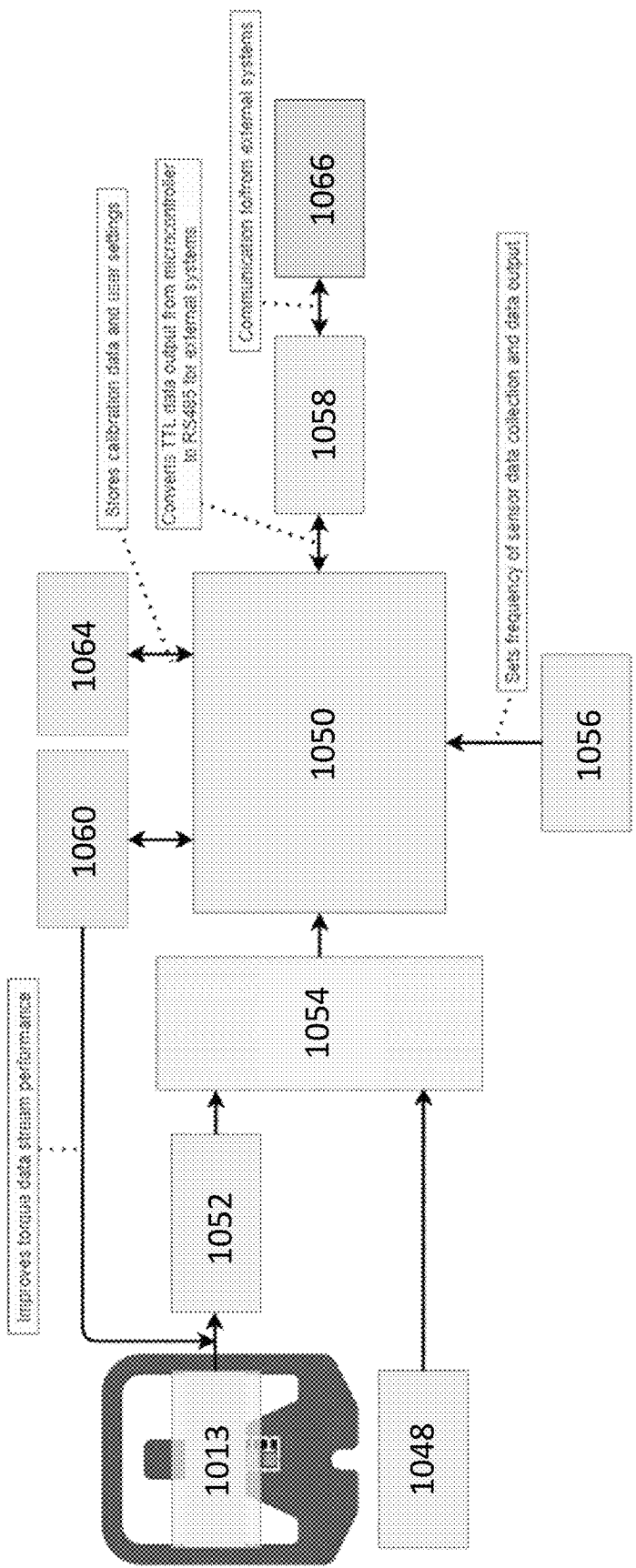
FIG. 30 shows a diagram of a slew drive system, in accordance with embodiments.

One or more signals from a sensor 1013 (e.g., a strain gauge sensor or a force sensor) of a slew drive system 1000 can be transmitted to a controller 1020 for processing and/or analysis. In some cases, one or more signals from a sensor 1013 are transmitted to a controller 1020 of a slew drive system 1000 via a wired connection 1032. In some cases, one or more signals from a sensor 1013 are transmitted to a controller 1020 of a slew drive system 1000 via a wireless connection 1032. In some cases, a controller 1020 (e.g., an "internal" controller) of a slew drive system 1000 is "on board" or "local" relative to one or more mechanical components of the slew drive mechanism (e.g., physically coupled to or affixed to one or more components within or directly coupled to the slew drive housing 1002 or any of the slew drive plates, plugs, or end caps). For example, a controller 1020 can be coupled to (e.g., fastened to) a distal end cap 1024 of the slew drive system 1000 (e.g., which can be coupled to one or more components of the slew drive system 1000, such as proximal end plate 1014 and/or slew drive housing 1002 by distal end cap fasteners 1026). In many cases, a seal 1022 (e.g., a rubber or plastic O-ring) is disposed between (e.g., sandwiched between) the distal end cap 1024 and a proximal end plate 1014 or between a distal end cap 1024 and a plug 1028, e.g., to prevent fluids (e.g., lubricants 1021) from contacting an "on-board" controller during or between uses of the slew drive system. In some cases, a controller 1020 (e.g., an external controller 1066) is "remote" relative to one or more mechanical components of the slew drive mechanism (e.g., not housed within (or in some cases coupled to) the slew drive housing 1002 or any of the slew drive plates, plugs, or end caps). For example, an external controller 1020 can be wirelessly connected to one or more "on board" or "local" sensors 1013 of the slew drive system. In some cases, an "on board" controller 1020 can be connected (e.g., via a wired or wireless connection) to an external controller 1066 (e.g., as illustrated in FIG. 28, FIG. 29, and FIG. 30)

Turning to FIG. 5A, a slew drive system 1000 can comprise a worm wheel 1004 and a worm gear 1006 housed inside of a slew drive housing 1002. A slew drive system 1000 can further include bearings, seals, and other components which can be secured within slew drive housing 1002. The slew drive housing 1002 can include a shaft, which can comprise one or more housing bearings 1003 (e.g., a pair of tapered roller bearings 1003) at either end. A worm gear 1006 can be secured to the slew drive housing 1002 via housing bearings 1003. A slew drive system 1000 can comprise one or more seals 1022, which can operate to maintain the lubricants within the housing 1002. A seal 1022 can comprise neoprene, fluorinated ethylene, fluorinated ethylene-propylene (FEP), fluorosilicone (FVMQ), polytetrafluoroethylene (PTFE), carboxylated nitrile, hydrogenated nitrile (HNBR), highly saturated nitrile (HSN), or polyacrylate (ACM). A slew drive system 1000 can comprise one or more end plates and/or end caps (e.g., proximal end plates 1014 or distal end caps 1024) and a plurality of end plate and/or end cap fasteners, such as bolts (e.g., four distal end cap fasteners per distal end cap). In some cases, fastening one or more proximal end plates 1014 and/or one or more distal end caps 1024 to a slew drive housing 1002 can exert an axial compressive force on the worm gear 1006 which in turn can exert a force on the teeth 1005 of the work wheel. In some cases, this configuration can improve engagement between the threads 1007 (or teeth) of the worm gear and the teeth 1005 of the worm wheel 1004.

FIG. 5B shows an external view of a slew drive system 1000 comprising a worm wheel 1004 and a slew drive housing 1002, wherein the slew drive housing 1002 is coupled to a proximal end plate 1014 and a distal end cap 1024 is coupled to the proximal end plate 1014. FIG. 5C shows a distal end cap 1024 coupled to a proximal end plate 1014 by a plurality of distal end cap fasteners 1026 (e.g., wherein the distal end cap fasteners 1026 are bolts), for example, such as a proximal end plate 1014 and a distal end cap 1024 as indicated by the dotted box of FIG. 5B that have been unfastened from the slew drive housing 1002. FIG. 5D shows a cross-sectional view of a proximal end plate 1014, e.g., along the cross-sectional cut indicated by the dotted line and arrows shown in FIGS. 5B and 5C. In some cases, a proximal end plate 1014 comprises a sensor carrier mount 1016, which can be coupled to a sensor carrier 1010 by one or more sensor carrier fasteners 1012. A sensor carrier 1010 can comprise (or be coupled to) one or more sensors 1013, which can be connected to (e.g., in communication with) a controller 1020 by wiring 1032. FIG. 5E shows a cross-section as shown in FIG. 5D, wherein the proximal end plate 1014 is coupled to a slew drive housing 1002 of a slew drive system 1000. As shown in FIG. 5E, a worm interface pin 1008 can impinge upon a portion of the sensor carrier 1010 (e.g., a deformation element 1011 of the sensor carrier 1010), for example, as a result of axial force in the "z" direction exerted by worm gear 1006 on worm interface pin 1008. In some cases, deformation of deformation element 1011 (e.g., as a result of axial force in the "z" direction exerted by worm interface pin 1008 on deformation element 1011) can be detected and/or measured by a sensor 1013 coupled to (e.g., fastened to or affixed to) sensor carrier 1010 and communicated to a controller 1020 via wiring 1032. In some cases, worm gear 1006 dimensions, worm interface pin 1008 dimensions, sensor carrier 1010 dimensions, and/or tensioning of proximal end plate fasteners can be adjusted such that a non-zero force (and, optionally, a non-zero deflection or deformation) is applied to sensor carrier 1010 or a portion thereof (e.g., to a deformation element 1011 of sensor carrier 1011), e.g., when the system is at rest. In some cases, adjusting such parameters of the system to achieve a non-zero force (and, optionally, a non-zero deflection or deformation) to a portion of sensor carrier 1010 can increase the sensitivity and/or dynamic range of sensor measurements.

FIG. 6A and FIG. 6B show sensor carriers 1010 comprising a deformation element 1011. In some cases, a portion of a deformation element can deform or displace, for example, as a result of impingement of one or more objects (e.g., a worm gear 1006 or a worm interface pin 1008) on the deformation element 1011). In some cases, deformation and/or displacement of a deformation element 1011 of a sensor carrier 1010 can cause a change (e.g., in a strain or force) experienced by one or more sensors (e.g., which may be coupled to the sensor carrier 1010, for instance at the deformation element 1011). In some cases, a deformation element 1011 (e.g., a cantilevered deformation element 1011) can comprise a cantilevered portion of a sensor carrier frame. In some cases, a cantilevered portion of a sensor carrier 1010 can be configured to deform and/or displace (e.g., elastically) in a predictable manner when subjected to a force from another object (e.g., a worm gear 1006 or worm interface pin 1008, which may impinge upon the deformation element, for instance, at a cantilevered portion of the deformation element). In some cases, a sensor carrier can comprise one or more sensor carrier notches 1034. In some cases, a sensor carrier notch 1034 can be used as a location for a fastener (e.g., a clip or flange of a screw head or bolt) to couple a sensor carrier 1010 to another structure (e.g., a sensor carrier mount or proximal end plate 1014) of a slew drive system 1000. In some cases, wiring 1032 coupled to one or more sensors 1013 can pass through a sensor carrier notch (and, optionally, through a sensor carrier mount and/or a proximal end plate 1014), for example, to decrease the length of wiring required to connect the sensor(s) 1013 to the controller 1020 and/or to decrease any impact the thickness of the wiring might have on the clearance or force between the sensor carrier 1010 and/or proximal end plate 1014 and the worm gear 1006 and/or the slew drive housing 1002.

FIG. 6C and FIG. 6D show sensor carriers 1010 comprising a plurality of strain gauge sensors (1013a and 1013b) coupled to a surface of the sensor carriers 1010. In some cases, one or more of the sensors of a system or device described herein can be a linear strain gauge sensor (1013a, 1013b). FIG. 6C shows sensors 1013a and 1013b disposed at the same position in direction "m" along the deformation element 1011 of the sensor carrier 1010. FIG. 6D shows a first sensor 1013a disposed further up a cantilevered deformation element 1011 than a second sensor 1013b. In FIG. 6D, the sensors 1013a and 1013b are depicted at the same lateral position along direction "n". In some cases, a first sensor (e.g., strain gauge 1013a in FIG. 6D) can be oriented such that a directionality of sensor sensitivity (e.g., strain measurement direction) is at an angle (e.g., perpendicular to) a directionality of sensor sensitivity of a second sensor (e.g., strain gauge 1013b in FIG. 6D). In some cases, orienting a first sensor at an angle relative to a second sensor on a sensor carrier 1010 can allow for measurement of deformation in the deformation element 1011 (e.g., via a sensor oriented such that its directionality of sensor sensitivity is in line with an expected direction of deformation of the deformation element 1011, such as an expected bending of a cantilevered deformation element in direction "m") and measurement of deformation of the sensor carrier 1010 or a portion thereof which may result from causes other than deformation induced by worm gear displacement, such as sensor carrier material expansion or contraction, e.g., due to changes in temperature. In some cases, a sensor carrier can comprise aluminum. In some cases, a sensor carrier material can have a thermal expansion of about 11 μm/m-° C. (micrometer per meter degree Celsius). In some cases, orienting a first sensor at an angle relative to a second sensor on a sensor carrier 1010 can allow for measurement of deformation in the deformation element 1011 in a first direction (e.g., via a sensor oriented such that its directionality of sensor sensitivity is in line with a first expected direction of deformation of the deformation element 1011, such as an expected bending of a cantilevered deformation element in direction "m") and measurement of deformation of the sensor carrier 1010 or a portion thereof which may result from deformation in a second direction (e.g., via a sensor oriented such that its directionality of sensor sensitivity is not parallel to the first expected direction of deformation of the deformation element 1011). Such biaxial deformation measurement can be advantageous in determining whether one or more components of the system (e.g., a sensor 1013, sensor carrier 1010, worm interface pin 1008, or worm gear 1006) are properly aligned (e.g., during initial assembly and calibration) or have gone out of alignment (e.g., during use).

In some cases, a cross-sectional thickness of a sensor carrier 1010 or portion thereof (e.g., a deformation element 1011) is constant. A constant cross-sectional thickness in a sensor carrier 1010 (or a portion thereof) can simplify correction calculations for processing sensor 1013 signals. For example, deformation in a sensor carrier 1010 due to temperature changes may be easier to calculate and correct for in a sensor carrier 1010 having a constant cross-sectional thickness. In some cases, a cross-sectional thickness of a sensor carrier 1010 is not constant.

In some cases, a width of all or a portion of a sensor carrier 1010 is constant. For example, a width of a deformation element 1011 of a sensor carrier 1010 (e.g., in an "n" direction, as shown in FIG. 7A) may remain constant over the entirety of the length of the deformation element 1011 (e.g., in an "m" direction, as shown in FIG. 7A). In some cases, a width of all or a portion of a sensor carrier 1010 is not constant. For example, a width of a deformation element 1011 of a sensor carrier 1010 (e.g., in an "n" direction, as shown in FIG. 7B) may increase or decrease in width (e.g., in an "m" direction, as shown in FIG. 7B) over all or a portion of the length of the deformation element 1011. In some cases, a region of minimal strain difference due to deformation of a deformation element 1011 (e.g., bending in a cantilevered deformation element) can be created when width of the deformation element decreases over a portion of the deformation element (see plateau region in strain curve over parameterized distance 1038 for a centerline length 1036 of the cantilevered deformation element in FIG. 7B; compare to FIG. 7A). Placement of one or more sensors 1013 (e.g., strain gauge sensors) in or on a region of minimal strain difference in a deformation element (e.g., as formed by geometry of the deformation element) can be advantageous, for example, because strain of the deformation element remains constant or approximately constant over the region in which or on which the one or more sensors are placed, which can reduce the impact of sensor placement (e.g., on or near a deformation element) on sensor accuracy. In some cases, the formation of a region of minimal strain difference along a length and/or width of a deformation element 1011 (e.g., by controlling changes to one or more dimensions of the deformation element) can help to distribute stresses in the material of the deformation element, which can aid in mitigation of stresses on the carrier material (e.g., which can lead to failure of the material, such as fracture or plastic deformation) while allowing larger deformations (e.g., deflections) of the deformation element (e.g., which can increase sensitivity and/or dynamic range of the measurement system). Thus utilization of a sensor carrier 1010 and/or deformation element 1011 having a geometry and thickness that creates a minimal strain region can improve elastic deformation of the material without yield and can decrease fatigue failure of the sensor carrier and/or deformation element throughout the life of the component. In some cases, a thickness of a sensor carrier 1010 or portion thereof can be 0.10 mm to 0.40 mm. In some cases, a thickness of a sensor carrier 1010 or portion thereof can be 0.10 mm to 0.13 mm, 0.10 mm to 0.15 mm, 0.10 mm to 0.17 mm, 0.10 mm to 0.20 mm, 0.10 mm to 0.23 mm, 0.10 mm to 0.27 mm, 0.10 mm to 0.30 mm, 0.10 mm to 0.35 mm, 0.10 mm to 0.40 mm, 0.13 mm to 0.15 mm, 0.13 mm to 0.17 mm, 0.13 mm to 0.20 mm, 0.13 mm to 0.23 mm, 0.13 mm to 0.27 mm, 0.13 mm to 0.30 mm, 0.13 mm to 0.35 mm, 0.13 mm to 0.40 mm, 0.15 mm to 0.17 mm, 0.15 mm to 0.20 mm, 0.15 mm to 0.23 mm, 0.15 mm to 0.27 mm, 0.15 mm to 0.3 mm, 0.15 mm to 0.35 mm, 0.15 mm to 0.4 mm, 0.17 mm to 0.20 mm, 0.17 mm to 0.23 mm, 0.17 mm to 0.27 mm, 0.17 mm to 0.3 mm, 0.17 mm to 0.35 mm, 0.17 mm to 0.40 mm, 0.20 mm to 0.23 mm, 0.20 mm to 0.27 mm, 0.20 mm to 0.30 mm, 0.20 mm to 0.35 mm, 0.20 mm to 0.40 mm, 0.23 mm to 0.27 mm, 0.23 mm to 0.3 mm, 0.23 mm to 0.35 mm, 0.23 mm to 0.40 mm, 0.27 mm to 0.3 mm, 0.27 mm to 0.35 mm, 0.27 mm to 0.40 mm, 0.30 mm to 0.35 mm, 0.30 mm to 0.40 mm, or 0.35 mm to 0.40 mm. In some cases, a thickness of a sensor carrier 1010 or portion thereof can be 0.10 mm, 0.13 mm, 0.15 mm, 0.17 mm, 0.20 mm, 0.23 mm, 0.27 mm, 0.3 mm, 0.35 mm, or 0.40 mm. In some cases, a thickness of a sensor carrier 1010 or portion thereof can be at least 0.1 mm, 0.13 mm, 0.15 mm, 0.17 mm, 0.20 mm, 0.23 mm, 0.27 mm, 0.30 mm, 0.35 mm, or 0.40 mm. In some cases, a thickness of a sensor carrier 1010 or portion thereof can be at most 0.10 mm, 0.13 mm, 0.15 mm, 0.17 mm, 0.20 mm, 0.23 mm, 0.27 mm, 0.30 mm, 0.35 mm, or 0.40 mm. In some cases, a sensor carrier 1010 and/or a deformation element 1011 can comprise a metal, such as aluminum or steel. In some cases, a sensor carrier 1010 and/or a deformation 1011 can be formed by stamping sheet stock.

Figure 8:
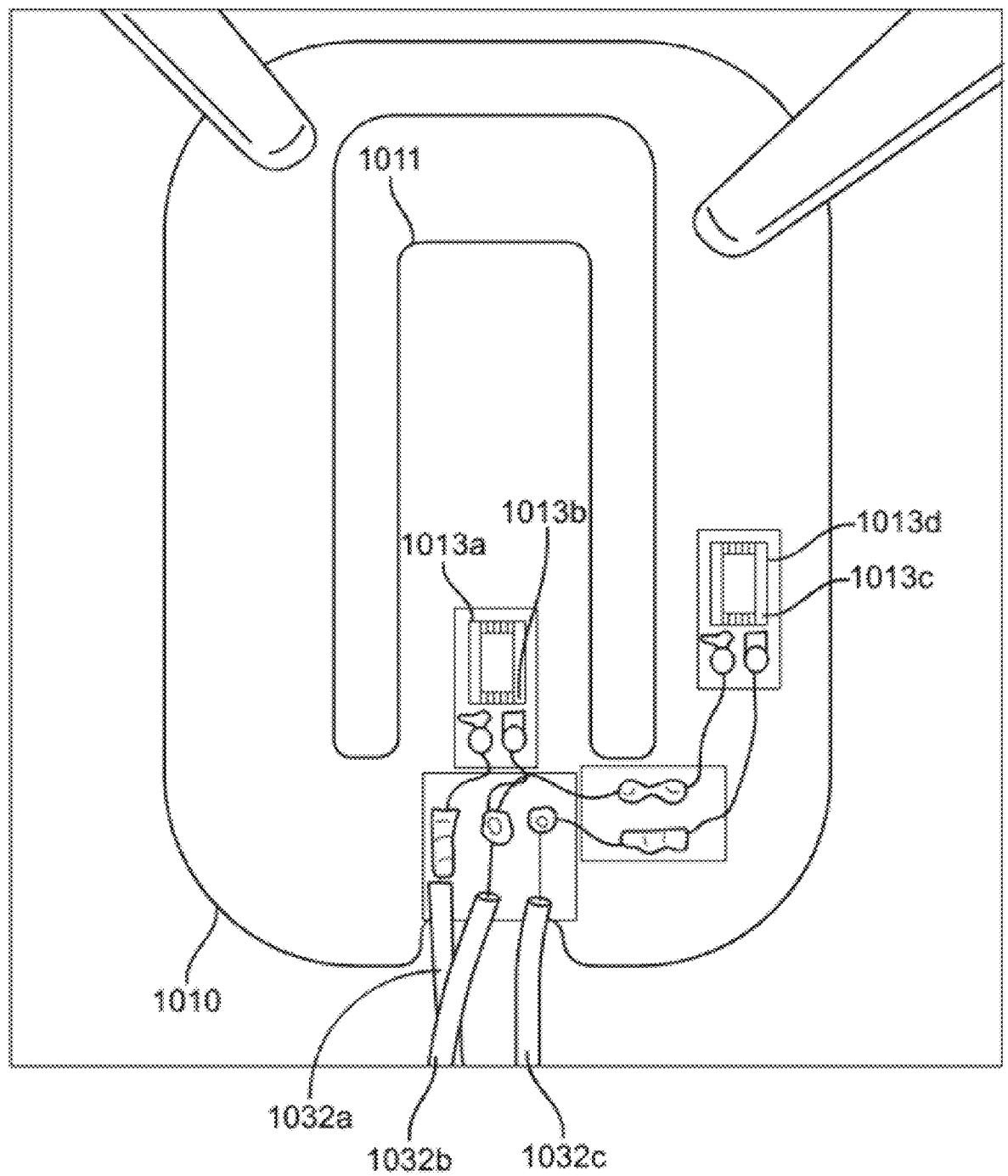
FIG. 8 shows a sensor carrier comprising a plurality of sensors, in accordance with embodiments.

In some cases, one or more sensors (e.g., 1013a and 1013b, as shown in FIG. 8) can be coupled to a deformation element 1011 of a sensor carrier 1010. Optionally, one or more additional sensors (e.g., 1013c and 1013d, as shown in FIG. 8) can be coupled to the frame of the sensor carrier 1010, for instance, to serve as control measurement devices for one or more sensors positioned on the deformation element 1011 of the sensor carrier 1010. Wiring 1032 can be coupled to one or more sensors 1013 on a sensor carrier 1010. For example, one or more wires (e.g., wire(s) 1032b, as shown in FIG. 8, which can be used for transmitting sensor data) can provide electrical communication between one or more sensors 1013 (e.g., 1013a, 1013b, 1013c, and/or 1013d) and one or more controllers 1020. In some cases, wiring connected to one or more sensors 1013 on a sensor carrier 1010 can comprise a ground wire 1032c. In some cases, wiring connected to one or more sensors 1013 (e.g., 1013a, 1013b, 1013c, and/or 1013d) on a sensor carrier 1010 can comprise a wire for providing electrical current or voltage to the one or more sensors 1013 (e.g., wire 1032a, as shown in FIG. 8, which can be used to provide a voltage (for example a direct current (DC) voltage) of, for example, +5 volts DC, +7 volts DC, from +0.5 to +5 volts DC, or greater than +5 volts DC).

Figure 9A:
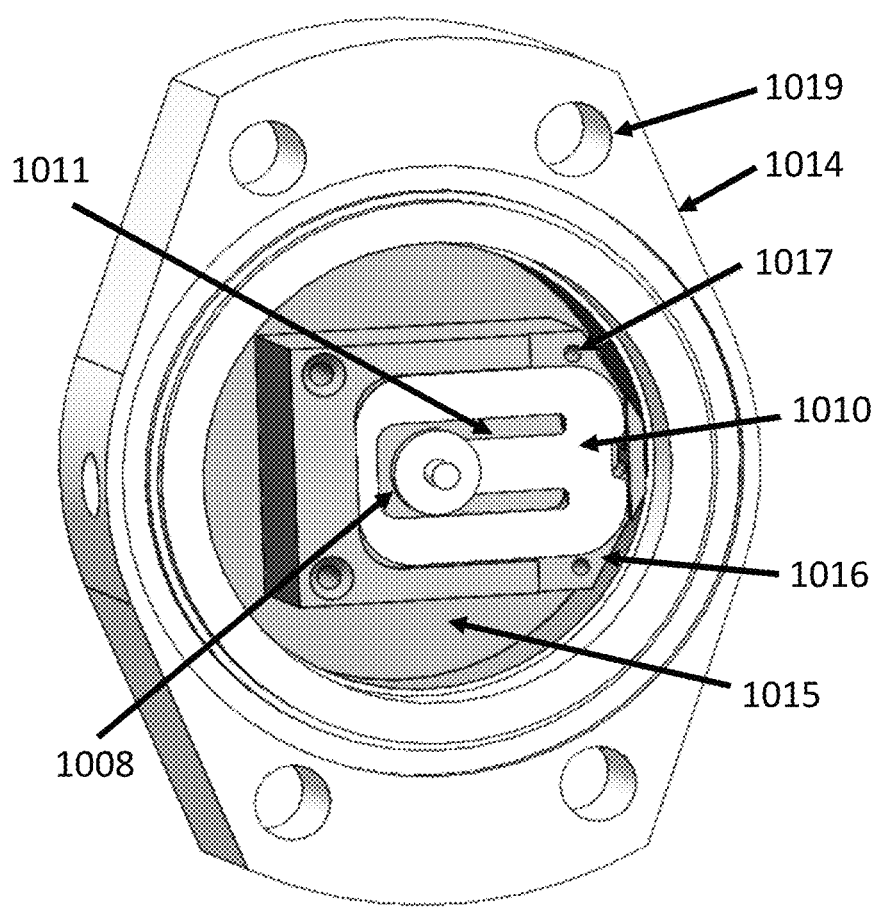
FIG. 9A shows a schematic of a proximal end plate and a sensor carrier, in accordance with embodiments.
Figure 9B:
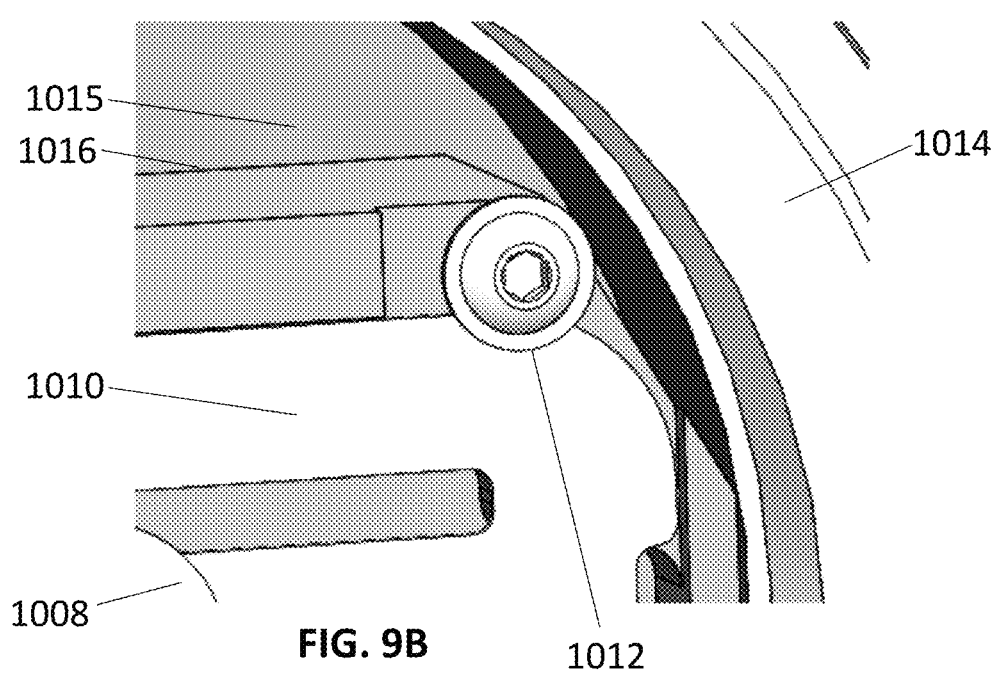
FIG. 9B shows a schematic of a sensor carrier and a sensor carrier fastener, in accordance with embodiments.
Figure 9C:
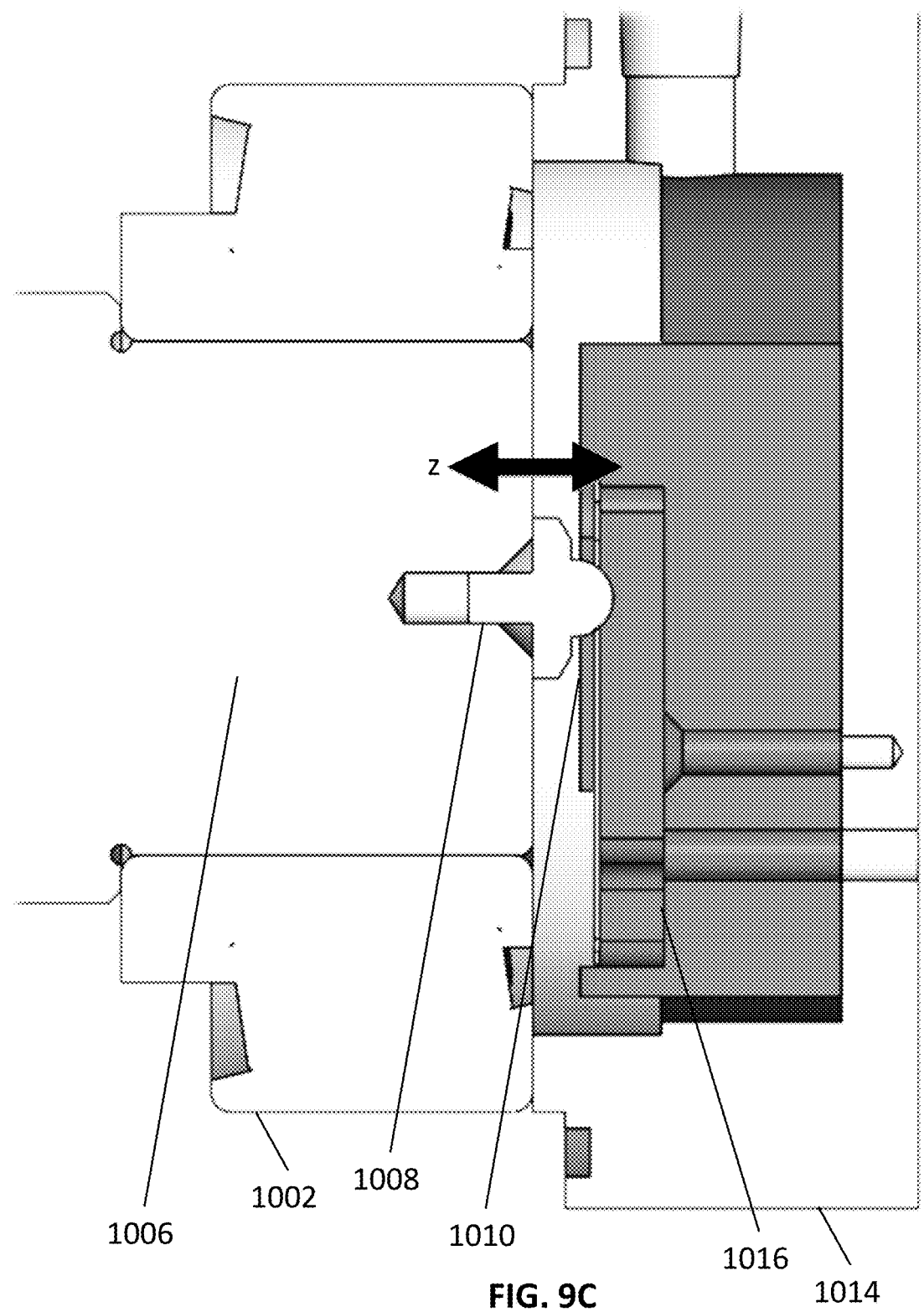
FIG. 9C shows a schematic of a system comprising a worm gear, a worm gear interface pin, and a sensor carrier, in accordance with embodiments.
Figure 10:
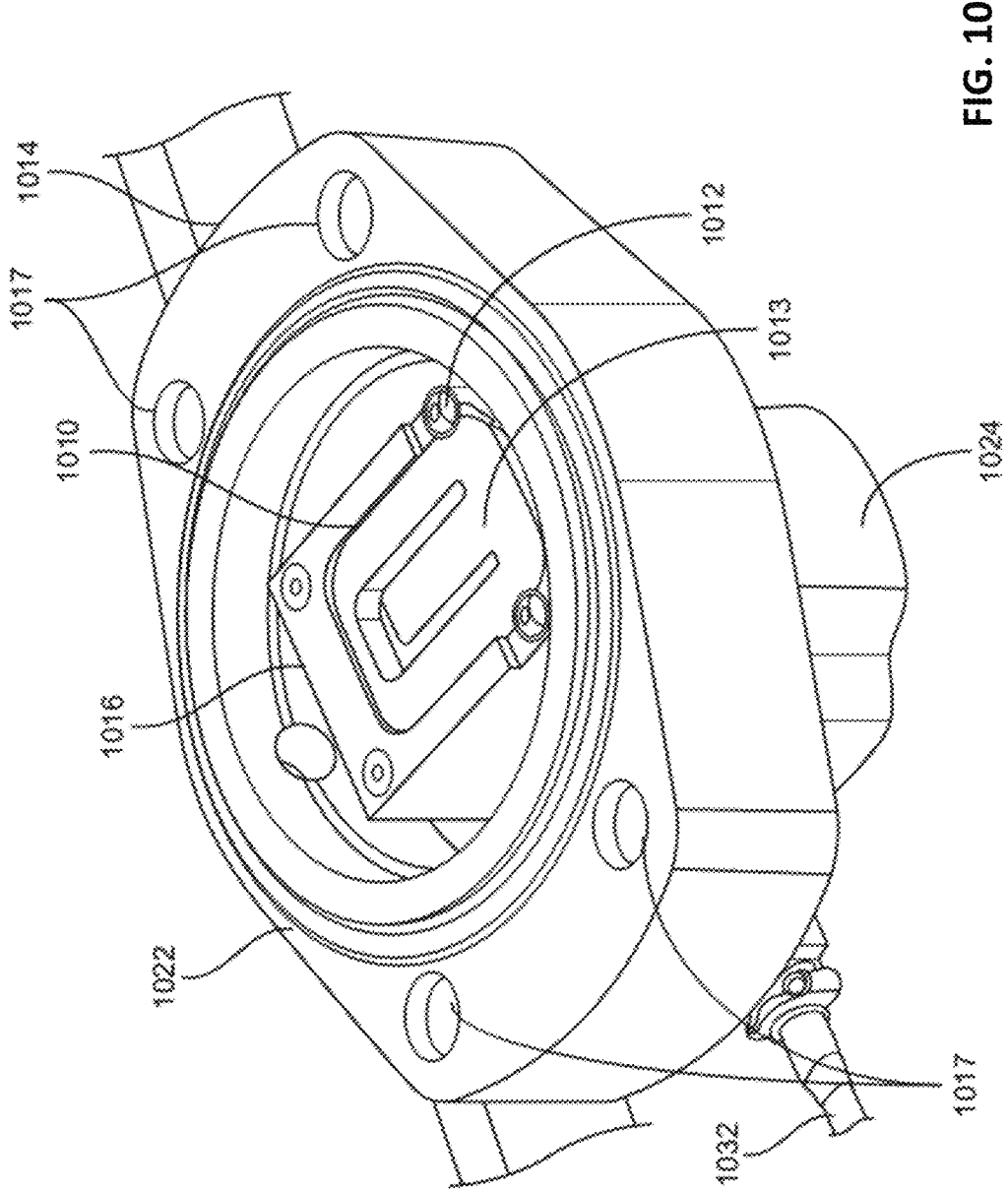
FIG. 10 shows a proximal end plate comprising a sensor and sensor carrier, in accordance with embodiments.

FIG. 9A shows a proximal end plate 1014 comprising a sensor carrier mount 1016 having sensor carrier mount holes 1017 and a sensor carrier 1010 mounted on the sensor carrier mount 1016. A worm interface pin 1008 is depicted in contact with a deformation element 1011 of the sensor carrier 1010. The proximal end plate 1014 shown in FIG. 9A comprises a machined surface 1015 and proximal end plate fastener holes 1019. FIG. 9B shows an enlarged view of FIG. 9A, wherein a sensor carrier fastener 1012 is shown coupling sensor carrier 1010 to sensor carrier mount 1016. In some embodiments, a worm gear 1006 can positively or negatively displace along an axial direction "z" during use of a slew drive system 1000 and cause worm interface pin 1008 to increase or decrease pressure exerted on sensor carrier 1010 (or a portion thereof, such as deformation element 1011), for example, due to sensor carrier 1010 being securely coupled to sensor carrier mount 1016 and sensor carrier mount 1016 being securely coupled to slew drive housing 1002, e.g., as shown in FIG. 9C FIG. 10A shows an image of a proximal end plate 1014 comprising a sensor carrier mount 1016 coupled to a sensor carrier 1010 comprising a sensor 1013 via sensor carrier mount fasteners 1012. Wiring 1032 used to communicate data measured by sensor 1013 can pass through a connector port (e.g., a side connector port) in proximal end plate 1014, a connector port (e.g., a side connector port) in distal end cap 1024, or a gap between proximal end plate 1014 and distal end plate 1024. Proximal end plate fastener holes 1017 can be used to couple the assembly to slew drive housing 1002.

Figure 11A:
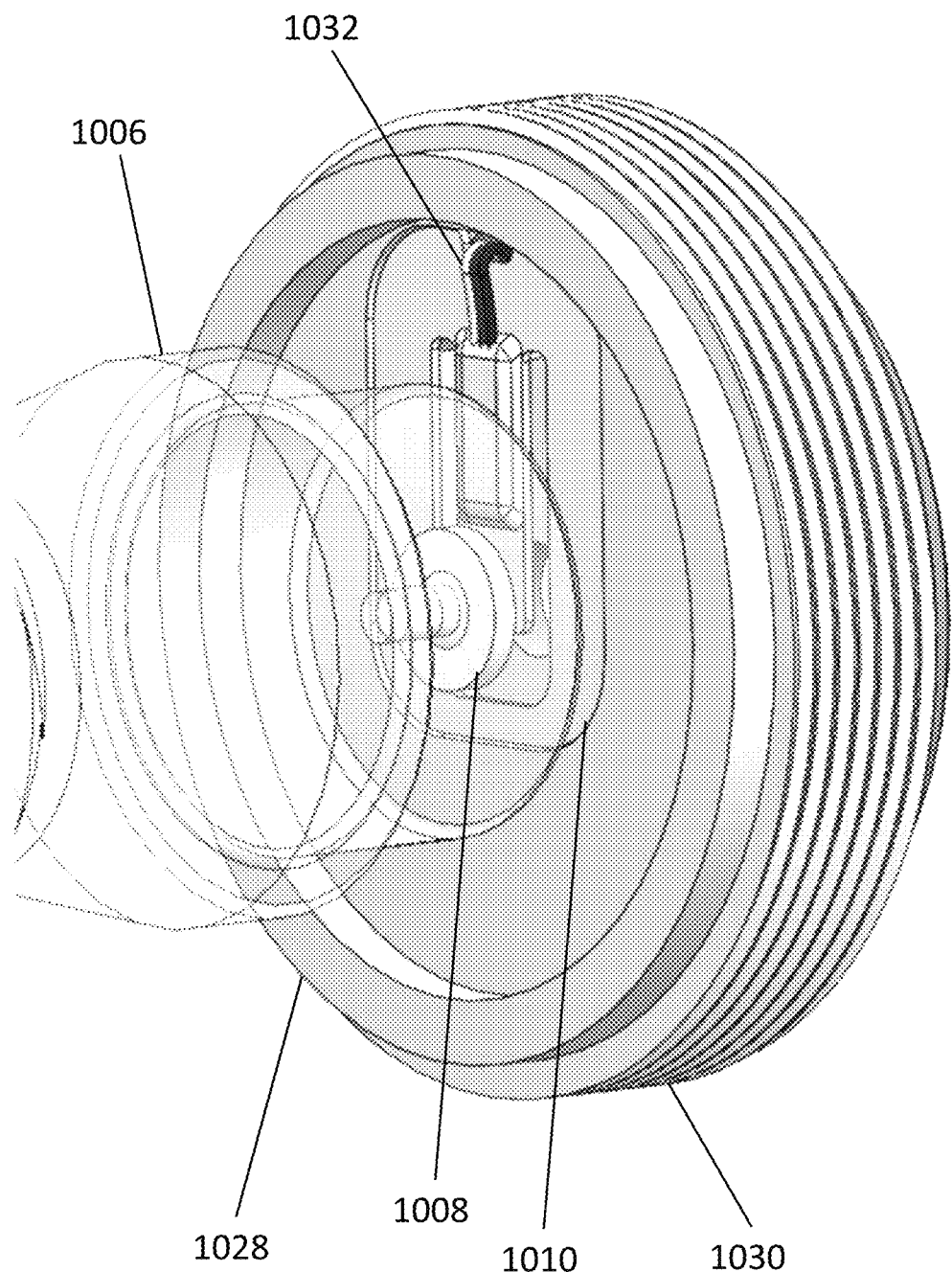
FIG. 11A shows a schematic of a plug comprising a sensor carrier, in accordance with embodiments.
Figure 11B:
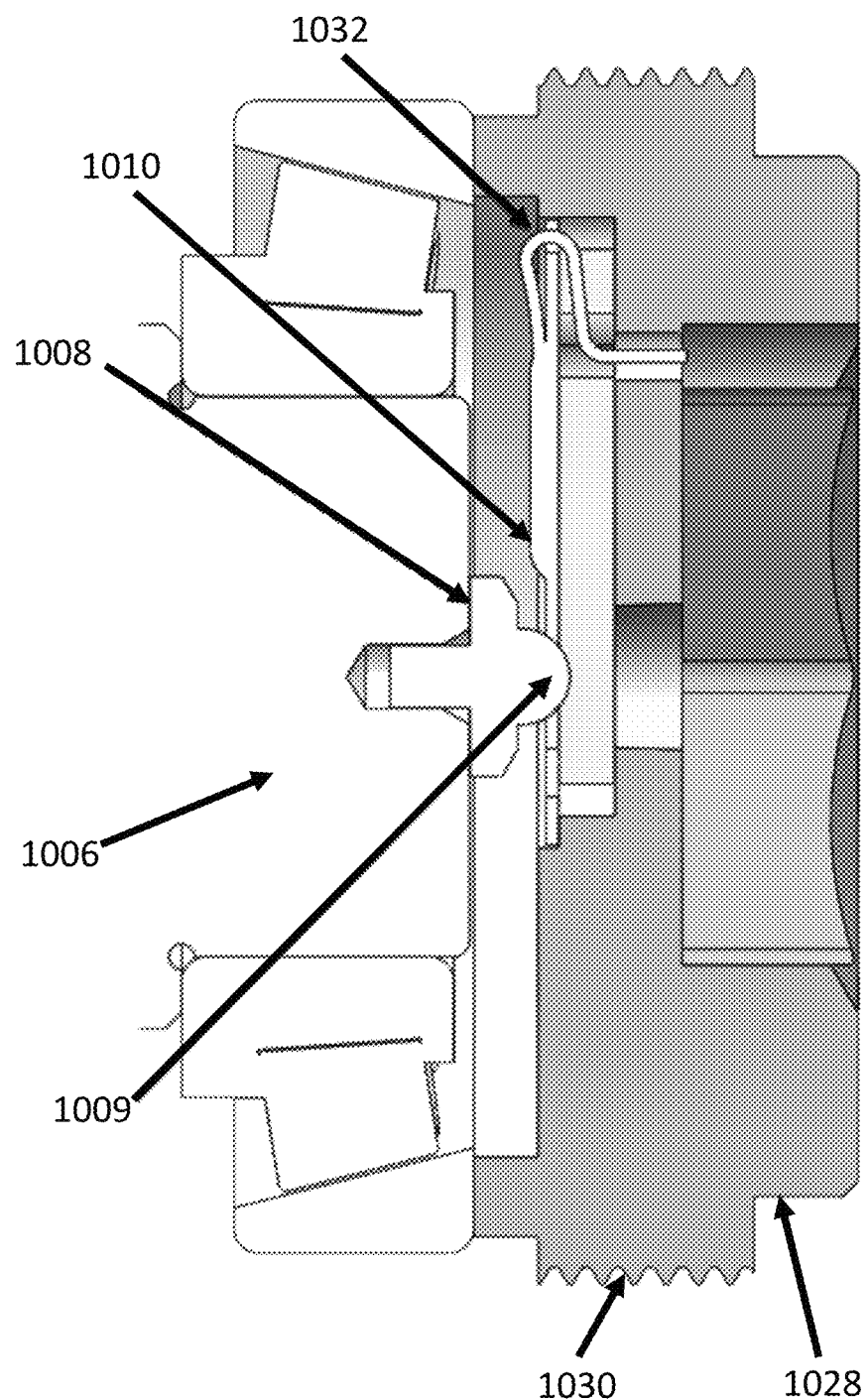
FIG. 11B shows a schematic of a worm interface pin and a plug comprising a sensor carrier, in accordance with embodiments.

In some cases, a slew drive system 1000 can comprise a plug 1028, e.g., in place of or in addition to a proximal end plate 1014. A plug 1028 can be secured within a slew drive housing 1002 at an end of worm gear 1006, e.g., as shown in FIG. 11A. In some cases, plug 1028 can comprise threading 1030 along its outer edge(s), e.g., to couple plug 1028 to slew drive housing 1002. For example, a sensor carrier 1010 comprising one or more sensors 1013 can be secured to plug 1028 and screwed into slew drive housing 1002 using threading 1030 and corresponding threading in slew drive housing 1002 at an end of a chamber containing worm gear 1006. Optionally, wiring 1032 connecting sensor 1013 to controller 1020 can pass through all or a portion of plug 1028, e.g., as in some embodiments of slew drive system 1000 comprising a proximal end plate 1014 having a sensor carrier mount 1016. FIG. 11B shows a cross-sectional view of a plug 1028 coupled to a sensor carrier 1010 comprising one or more sensors 1013 that has been coupled to a slew drive housing 1002 such that worm interface pin 1008 impinges upon a deformation element of sensor carrier 1010 by contacting the deformation element 1011 at the interface surface 1009 of the worm interface pin 1008.

Figure 12:
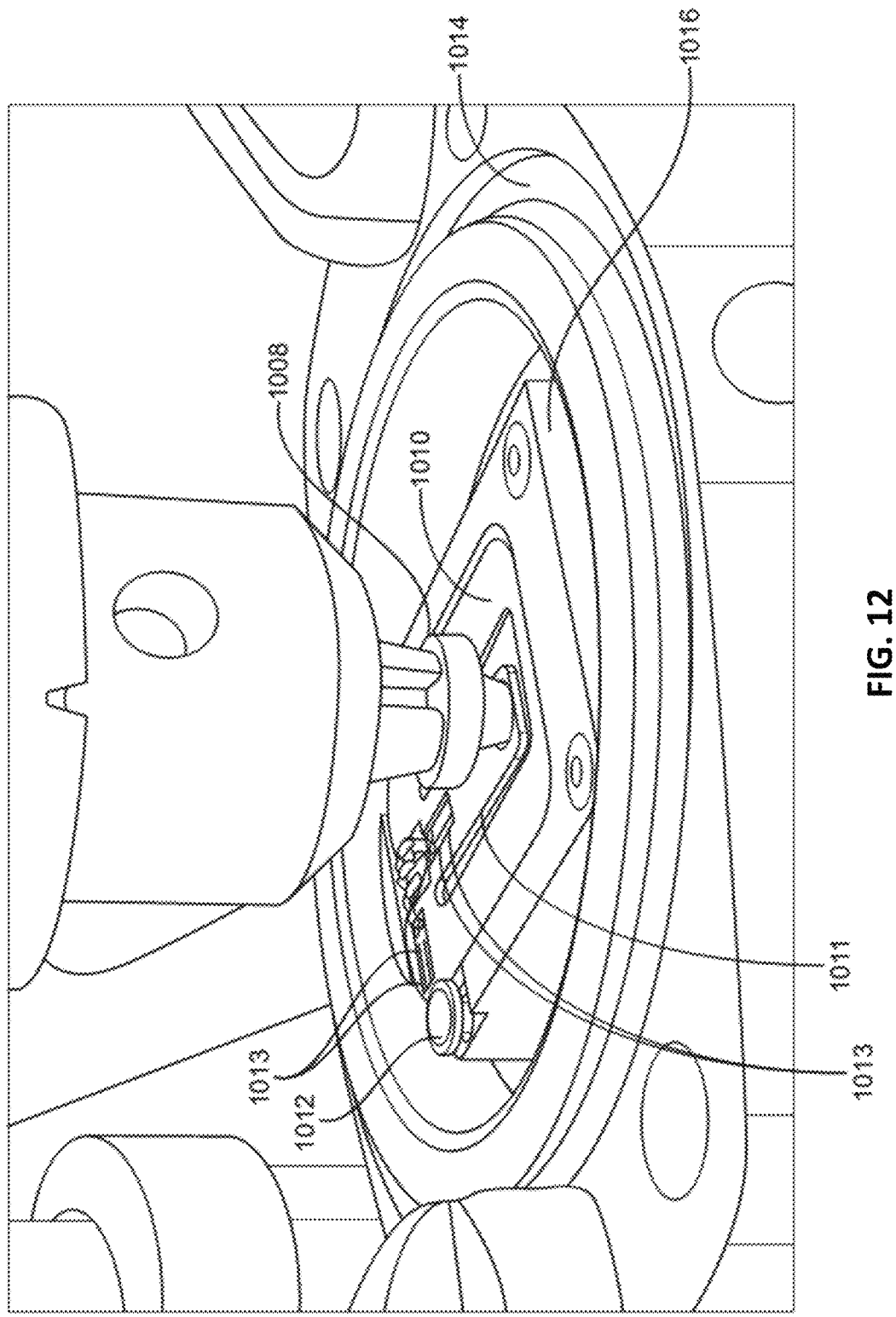
FIG. 12 shows loading of a sensor carrier, in accordance with embodiments.

FIG. 12 shows an image of a first plurality of sensors 1013 coupled to the surface of a deformation element 1011 of a sensor carrier 1010 and a second plurality of sensors 1013 coupled to a portion of sensor carrier 1010 not located on the deformation element 1011. As shown in FIG. 12, deformation element 1011 can be pre-loaded by a worm interface pin 1008, e.g., to increase sensor dynamic range and measurement sensitivity. Sensor carrier 1010 can be coupled to a sensor carrier mount 1016 by one or more sensor carrier fasteners 1012, which can comprise, for example a bolt or screw and, optionally, a washer. A sensor carrier fastener 1012 can bias sensor carrier 1010 to sensor carrier mount 1016 or proximal end plate 1014, e.g., to secure the position of sensor carrier 1010 relative to worm interface pin 1008, for example, to maintain the position of contact between the worm interface pin 1008 and the deformation element 1011.

Figure 13C:
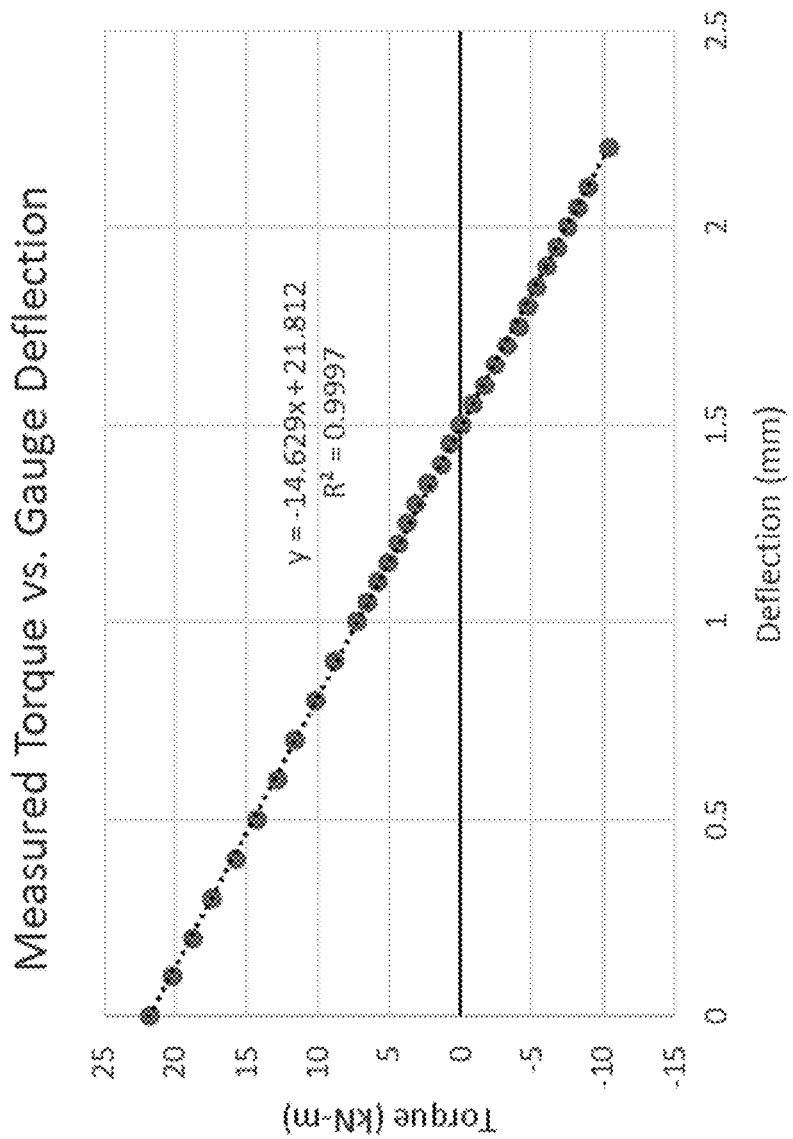
FIG. 13C shows data illustrating a relationship between torque and deflection in a sensor carrier, in accordance with embodiments.
Figure 13A:
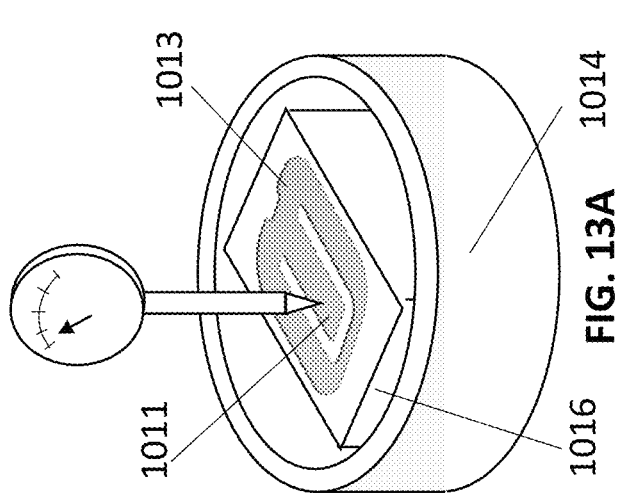
FIG. 13A shows a schematic of a sensor deflection testing apparatus, in accordance with embodiments.
Figure 13B:
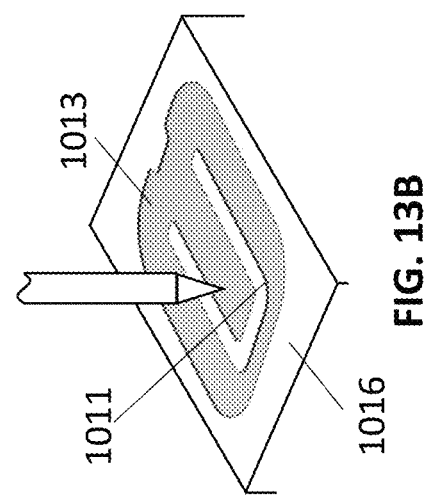
FIG. 13B shows an enlarged view of the sensor deflection testing apparatus, in accordance with embodiments.

FIG. 13A shows a testing apparatus for applying precisely controlled deformations in a deformation element 1011 of a sensor carrier 1010 (e.g., by turning a threaded adapter coupled to a worm interface adapter contacting the deformation element 1011). FIG. 13C shows experimental data showing a linear relationship (r-squared value 0.9997) between torque (in kilonewton-meters, kNm) exerted on a deflection element 1011 by the worm interface pin shown in FIGS. 13A and 13B measured by strain gauge sensor 1013. In some cases, a sensor can be used to detect deformation forces (e.g., in a deformation element, sensor carrier or portion thereof) of −32 kNm to 32 kNm. In some cases, a sensor can be used to detect deformation forces (e.g., in a deformation element, sensor carrier or portion thereof) of −32 kNm to −16 kNm, −32 kNm to −8 kNm, −32 kNm to 4 kNm, −32 kNm to 0 kNm, −32 kNm to 4 kNm, −32 kNm to 8 kNm, −32 kNm to 16 kNm, −32 kNm to 32 kNm, −16 kNm to −8 kNm, −16 kNm to 4 kNm, −16 kNm to 0 kNm, −16 kNm to 4 kNm, −16 kNm to 8 kNm, −16 kNm to 16 kNm, −16 kNm to 32 kNm, −8 kNm to 4 kNm, −8 kNm to 0 kNm, −8 kNm to 4 kNm, −8 kNm to 8 kNm, −8 kNm to 16 kNm, −8 kNm to 32 kNm, 4 kNm to 0 kNm, 4 kNm to 4 kNm, 4 kNm to 8 kNm, 4 kNm to 16 kNm, 4 kNm to 32 kNm, 0 kNm to 4 kNm, 0 kNm to 8 kNm, 0 kNm to 16 kNm, 0 kNm to 32 kNm, 4 kNm to 8 kNm, 4 kNm to 16 kNm, 4 kNm to 32 kNm, 8 kNm to 16 kNm, 8 kNm to 32 kNm, or 16 kNm to 32 kNm. In some cases, a sensor can be used to detect deformation forces (e.g., in a deformation element, sensor carrier or portion thereof) of −32 kNm, −16 kNm, −8 kNm, 4 kNm, 0 kNm, 4 kNm, 8 kNm, 16 kNm, or 32 kNm. In some cases, a sensor can be used to detect deformation forces (e.g., in a deformation element, sensor carrier or portion thereof) of at least −32 kNm, −16 kNm, −8 kNm, 4 kNm, 0 kNm, 4 kNm, 8 kNm, 16 kNm, or 32 kNm. In some cases, a sensor can be used to detect deformation forces (e.g., in a deformation element, sensor carrier or portion thereof) of at most −32 kNm, −16 kNm, −8 kNm, 4 kNm, 0 kNm, 4 kNm, 8 kNm, 16 kNm, or 32 kNm. In some cases, slew drive system 1000 can have a detection resolution of 10 Nm to 100 Nm. In some cases, slew drive system 1000 can have a detection resolution of 10 Nm to 20 Nm, 10 Nm to 30 Nm, 10 Nm to 40 Nm, 10 Nm to 50 Nm, 10 Nm to 60 Nm, 10 Nm to 65 Nm, 10 Nm to 70 Nm, 10 Nm to 80 Nm, 10 Nm to 90 Nm, 10 Nm to 100 Nm, 20 Nm to 30 Nm, 20 Nm to 40 Nm, 20 Nm to 50 Nm, 20 Nm to 60 Nm, 20 Nm to 65 Nm, 20 Nm to 70 Nm, 20 Nm to 80 Nm, 20 Nm to 90 Nm, 20 Nm to 100 Nm, 30 Nm to 40 Nm, 30 Nm to 50 Nm, 30 Nm to 60 Nm, 30 Nm to 65 Nm, 30 Nm to 70 Nm, 30 Nm to 80 Nm, 30 Nm to 90 Nm, 30 Nm to 100 Nm, 40 Nm to 50 Nm, 40 Nm to 60 Nm, 40 Nm to 65 Nm, 40 Nm to 70 Nm, 40 Nm to 80 Nm, 40 Nm to 90 Nm, 40 Nm to 100 Nm, 50 Nm to 60 Nm, 50 Nm to 65 Nm, 50 Nm to 70 Nm, 50 Nm to 80 Nm, 50 Nm to 90 Nm, 50 Nm to 100 Nm, 60 Nm to 65 Nm, 60 Nm to 70 Nm, 60 Nm to 80 Nm, 60 Nm to 90 Nm, 60 Nm to 100 Nm, 65 Nm to 70 Nm, 65 Nm to 80 Nm, 65 Nm to 90 Nm, 65 Nm to 100 Nm, 70 Nm to 80 Nm, 70 Nm to 90 Nm, 70 Nm to 100 Nm, 80 Nm to 90 Nm, 80 Nm to 100 Nm, or 90 Nm to 100 Nm. In some cases, slew drive system 1000 can have a detection resolution of 10 Nm, 20 Nm, 30 Nm, 40 Nm, 50 Nm, 60 Nm, 62.5 Nm, 65 Nm, 70 Nm, 80 Nm, 90 Nm, or 100 Nm. In some cases, slew drive system 1000 can have a detection resolution of at least 10 Nm, 20 Nm, 30 Nm, 40 Nm, 50 Nm, 60 Nm, 65 Nm, 70 Nm, 80 Nm, or 90 Nm. In some cases, resolution of force detection can be impacted by magnitude of force measured. In some cases, forces from 0 to 2 kNm can be detected with a resolution of from 5 Nm to 10 Nm, 10 Nm to 20 Nm, 20 Nm to 30 Nm, 30 Nm to 40 Nm, 40 Nm to 50 Nm, 50 Nm to 60 Nm, 57 Nm, 60 Nm to 70 Nm, 70 Nm to 80 Nm, or 80 Nm to 90 Nm. In some cases, forces from 2 to 5 kNm can be detected with a resolution of from 50 Nm to 60 Nm, 60 Nm to 70 Nm, 70 Nm to 80 Nm, 80 Nm to 90 Nm, 90.8 Nm, 100 Nm to 110 Nm, 110 Nm to 120 Nm, or 120 Nm to 130 Nm. In some cases, forces from greater than 5 kNm can be detected with a resolution of from 80 Nm to 90 Nm, 90 Nm to 100 Nm, 100 Nm to 110 Nm, 110 Nm to 125 Nm, 124.6 Nm, 125 Nm to 140 Nm, 140 Nm to 150 Nm, 150 Nm to 160 Nm, or 160 Nm to 170 Nm. In some cases, a slew drive system 1000 described herein can determine a worm gear displacement of 0.1 mm to 2 mm. In some cases, a slew drive system 1000 described herein can determine a worm gear displacement of 0.1 mm to 0.5 mm, 0.1 mm to 0.7 mm, 0.1 mm to 0.9 mm, 0.1 mm to 1 mm, 0.1 mm to 1.1 mm, 0.1 mm to 1.3 mm, 0.1 mm to 1.5 mm, 0.1 mm to 2 mm, 0.5 mm to 0.7 mm, 0.5 mm to 0.9 mm, 0.5 mm to 1 mm, 0.5 mm to 1.1 mm, 0.5 mm to 1.3 mm, 0.5 mm to 1.5 mm, 0.5 mm to 2 mm, 0.7 mm to 0.9 mm, 0.7 mm to 1 mm, 0.7 mm to 1.1 mm, 0.7 mm to 1.3 mm, 0.7 mm to 1.5 mm, 0.7 mm to 2 mm, 0.9 mm to 1 mm, 0.9 mm to 1.1 mm, 0.9 mm to 1.3 mm, 0.9 mm to 1.5 mm, 0.9 mm to 2 mm, 1 mm to 1.1 mm, 1 mm to 1.3 mm, 1 mm to 1.5 mm, 1 mm to 2 mm, 1.1 mm to 1.3 mm, 1.1 mm to 1.5 mm, 1.1 mm to 2 mm, 1.3 mm to 1.5 mm, 1.3 mm to 2 mm, or 1.5 mm to 2 mm. In some cases, a slew drive system 1000 described herein can determine a worm gear displacement of 0.1 mm, 0.5 mm, 0.7 mm, 0.9 mm, 1 mm, 1.1 mm, 1.3 mm, 1.5 mm, or 2 mm. In some cases, a slew drive system 1000 described herein can determine a worm gear displacement of at least 0.1 mm, 0.5 mm, 0.7 mm, 0.9 mm, 1 mm, 1.1 mm, 1.3 mm, 1.5 mm, or 2.0 mm. In some cases, a slew drive system 1000 described herein can determine a worm gear displacement of at most 0.1 mm, 0.5 mm, 0.7 mm, 0.9 mm, 1 mm, 1.1 mm, 1.3 mm, 1.5 mm, or 2 mm. In some cases, displacement of a worm gear 1006 by greater than 1.0 mm (e.g., in either direction) could indicate abnormal slew drive operation or an extreme load on the slew drive system 1000. In some cases, a warning of system error and/or unsafe loading may be issued as a result of worm gear displacements greater than from 0.7 mm to 1.3 mm (e.g., greater than 1.0 mm) in either direction. In some cases, a slew drive system 1000 described herein can determine a worm gear displacement of 10 percent to 100 percent of the slew drive's rated capacity. In some cases, a slew drive system 1000 described herein can determine a worm gear displacement of 10 percent to 20 percent, 10 percent to 30 percent, 10 percent to 40 percent, 10 percent to 50 percent, 10 percent to 60 percent, 10 percent to 70 percent, 10 percent to 80 percent, 10 percent to 90 percent, 10 percent to 100 percent, 20 percent to 30 percent, 20 percent to 40 percent, 20 percent to 50 percent, 20 percent to 60 percent, 20 percent to 70 percent, 20 percent to 80 percent, 20 percent to 90 percent, 20 percent to 100 percent, 30 percent to 40 percent, 30 percent to 50 percent, 30 percent to 60 percent, 30 percent to 70 percent, 30 percent to 80 percent, 30 percent to 90 percent, 30 percent to 100 percent, 40 percent to 50 percent, 40 percent to 60 percent, 40 percent to 70 percent, 40 percent to 80 percent, 40 percent to 90 percent, 40 percent to 100 percent, 50 percent to 60 percent, 50 percent to 70 percent, 50 percent to 80 percent, 50 percent to 90 percent, 50 percent to 100 percent, 60 percent to 70 percent, 60 percent to 80 percent, 60 percent to 90 percent, 60 percent to 100 percent, 70 percent to 80 percent, 70 percent to 90 percent, 70 percent to 100 percent, 80 percent to 90 percent, 80 percent to 100 percent, or 90 percent to 100 percent of the slew drive's rated capacity. In some cases, a slew drive system 1000 described herein can determine a worm gear displacement of 10 percent, 20 percent, 30 percent, 40 percent, 50 percent, 60 percent, 70 percent, 80 percent, 90 percent, or 100 percent of the slew drive's rated capacity. In some cases, a slew drive system 1000 described herein can determine a worm gear displacement of at least 10 percent, 20 percent, 30 percent, 40 percent, 50 percent, 60 percent, 70 percent, 80 percent, or 90 percent, or 100 percent of the slew drive's rated capacity. In some cases, a slew drive system 1000 described herein can determine a worm gear displacement of at most 10 percent, 20 percent, 30 percent, 40 percent, 50 percent, 60 percent, 70 percent, 80 percent, 90 percent, or 100 percent of the slew drive's rated capacity.

Figure 14A:
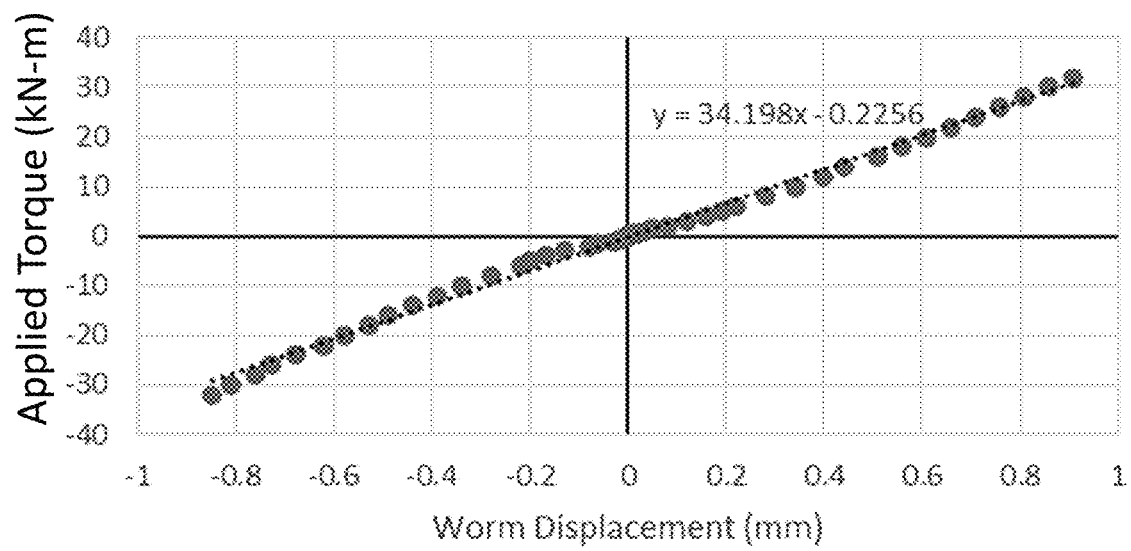
FIG. 14A shows data illustrating a relationship between applied torque and worm displacement in a slew drive system, in accordance with embodiments.
Figure 14B:
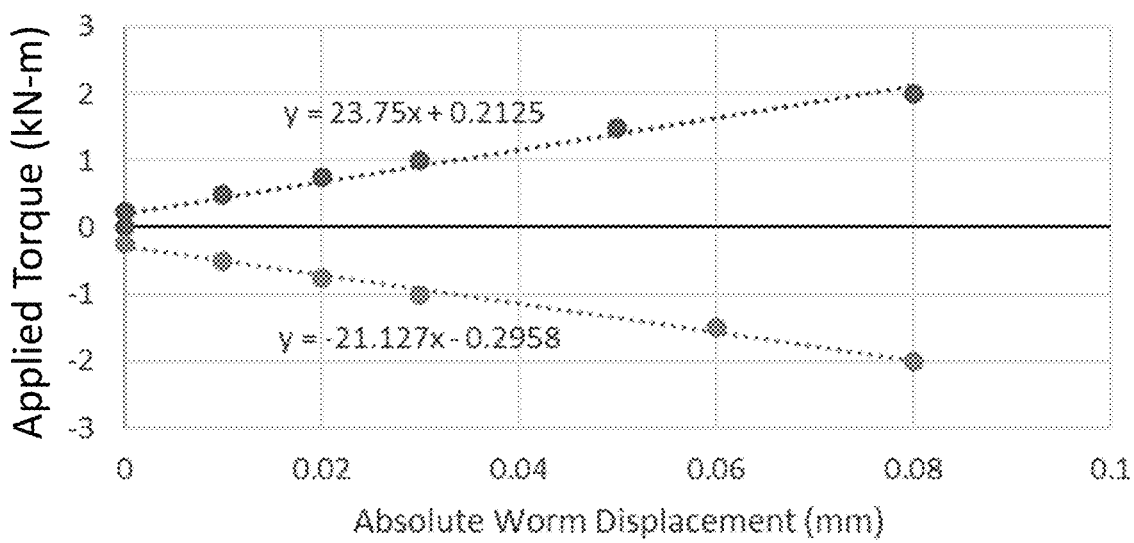
FIG. 14B shows data illustrating a relationship between applied torque and absolute worm displacement in a slew drive system, in accordance with embodiments.

FIG. 14A shows experimental data showing a relationship between load (in kilonewton-meters, kN-m) and worm displacement. FIG. 14B shows a relationship between applied torque (in kilonewton-meters) and absolute displacement of a worm gear 1006, e.g., wherein the worm gear 1006 and worm interface pin 1008 are configured to induce an initial deformation on deformation element 1011 at zero additional applied torque. Experimental data show that the force-to-deformation relationship is linear when the deformation element is further deformed by additional positive displacement of the worm interface pin and when the initial deformation is relieved by negative displacement of the worm interface pin. In some cases, coupling, geometry, and/or dimensions of a worm interface pin 1008, a deformation element 1011, a sensor carrier 1010, a sensor carrier mount, and/or a proximal end plate 1014 can be adjusted to result in an initial deformation of a (e.g., cantilevered) deformation element 1011 of 1.50 mm, 1.25 mm to 1.75 mm, 1.00 mm to 2.00 mm, 0.75 mm to 2.25 mm, 0.5 mm to 2.5 mm, 0.25 mm to 2.75 mm, or larger than 2.75 mm (e.g., to improve dynamic range of sensor measurements, for example, in one or both direction(s) of worm gear displacement in and axial worm gear direction).

Figure 15B:
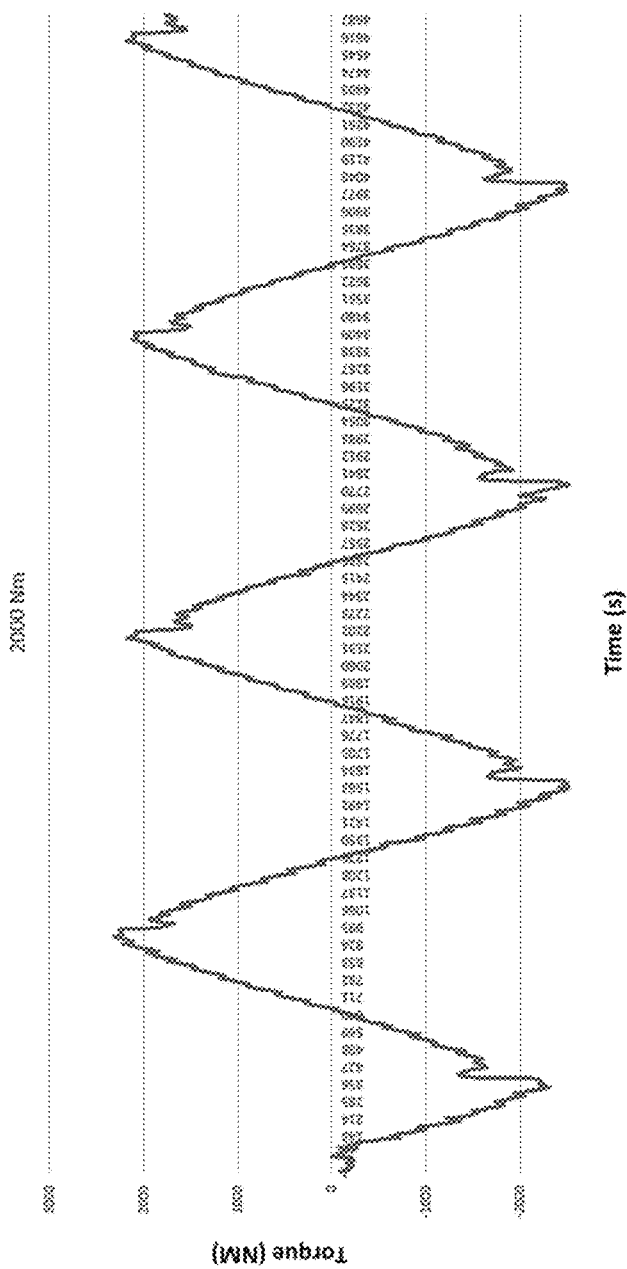
FIG. 15B shows torque values detected by a slew drive system sensor, in accordance with embodiments.
Figure 15A:
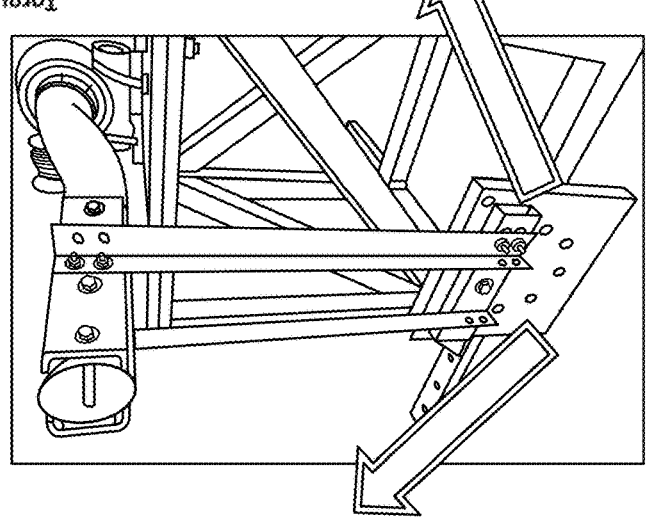
FIG. 15A shows a slew drive torque testing rig, in accordance with embodiments.

FIG. 15A shows a testing apparatus for applying an oscillatory torque load (max 2 kilonewton-meters) to a worm wheel via an accelerated pendulum weight (e.g., in directions indicated by arrows). FIG. 15B shows experimental data obtained from strain gauge sensors coupled to a deformation element of a slew drive system 1000, as described herein, wherein oscillatory torque applied to the worm wheel by the testing apparatus is translated into displacement of a worm gear in an axial direction of the worm gear and, in turn deformation of a deformation element of a sensor carrier to which the sensor is coupled.

Figure 16:
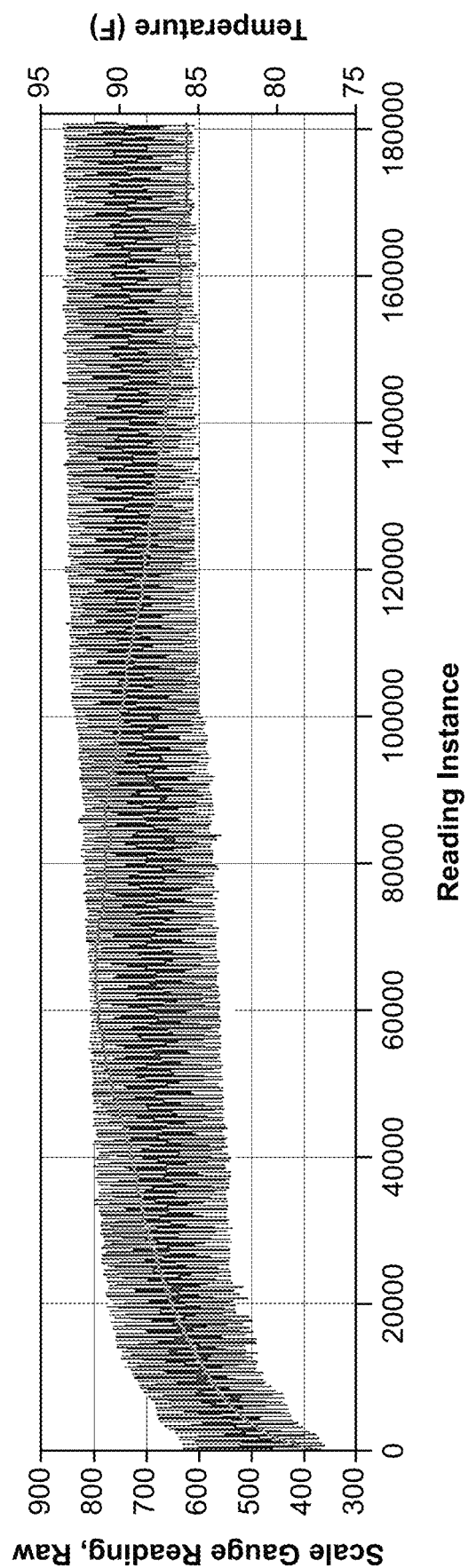
FIG. 16 shows strain gauge sensor data and temperature data during oscillatory displacement testing, in accordance with embodiments.
Figure 17:
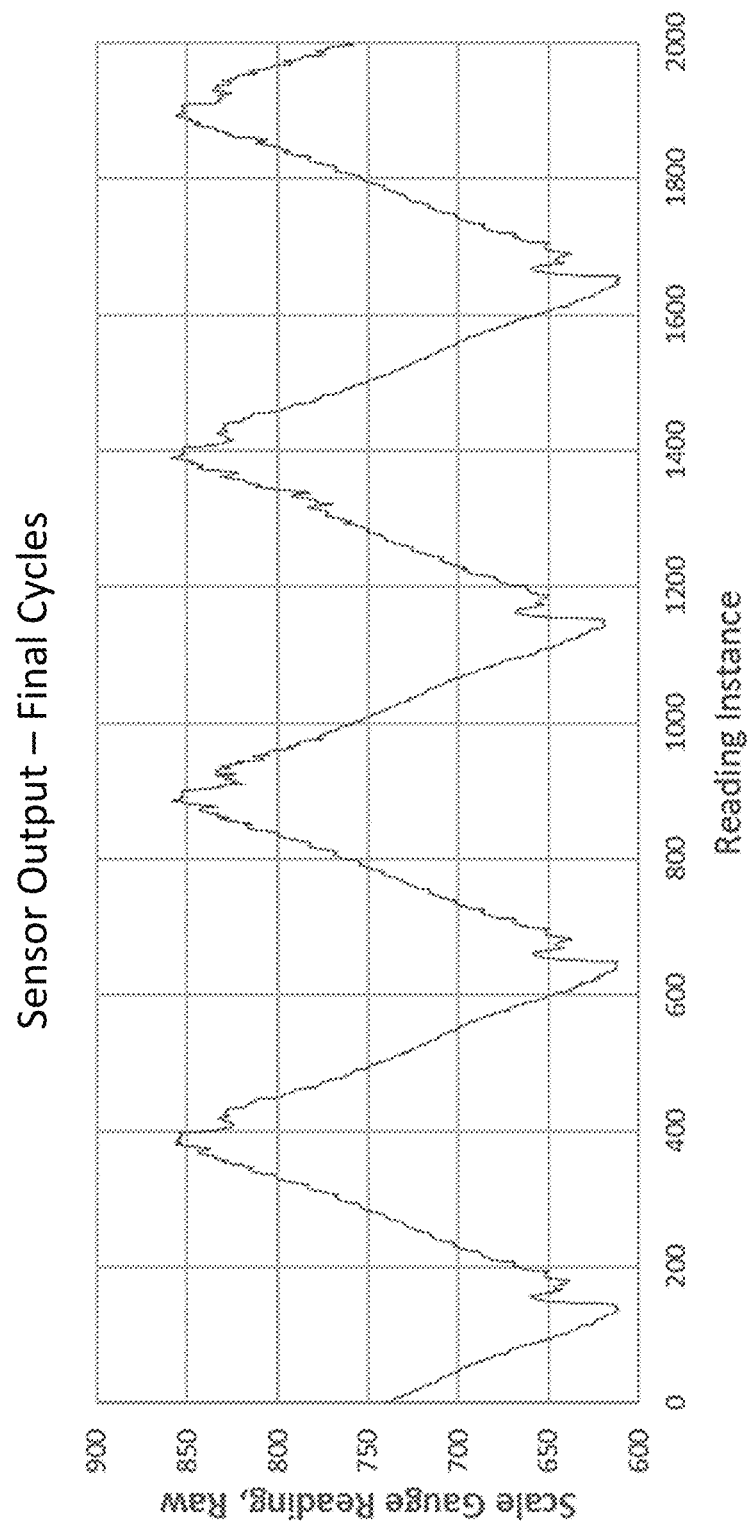
FIG. 17 shows sensor data during oscillatory displacement testing, in accordance with embodiments.

FIG. 16 shows raw strain gauge data and temperature sensor data from oscillatory torque testing over 359 total oscillatory cycles, in accordance with some embodiments. After an initial acclimation period, strain gauge readings are stable over extended oscillatory loading. Measured temperature varies during testing from a maximum of approximately 92 degrees Fahrenheit to approximately 86 degrees Fahrenheit at the conclusion of testing. FIG. 17 shows an enlarged view of raw strain gauge data obtained during the final four cycles of oscillatory testing. In some cases, periodic temperature measurements can be made, e.g., to correct for temperature-effects on sensor measurements, e.g., by evaluating changes in strain gauge sensors 1013 expansion or contraction in view of change(s) in temperature from a temperature at which the sensor(s) 1013 were initially zeroed. In some cases, such a relationship is approximately 15 to 25 Nm/° C. (newton-meters per degree Celsius), e.g., 23 Nm/° C.

Figure 18A:
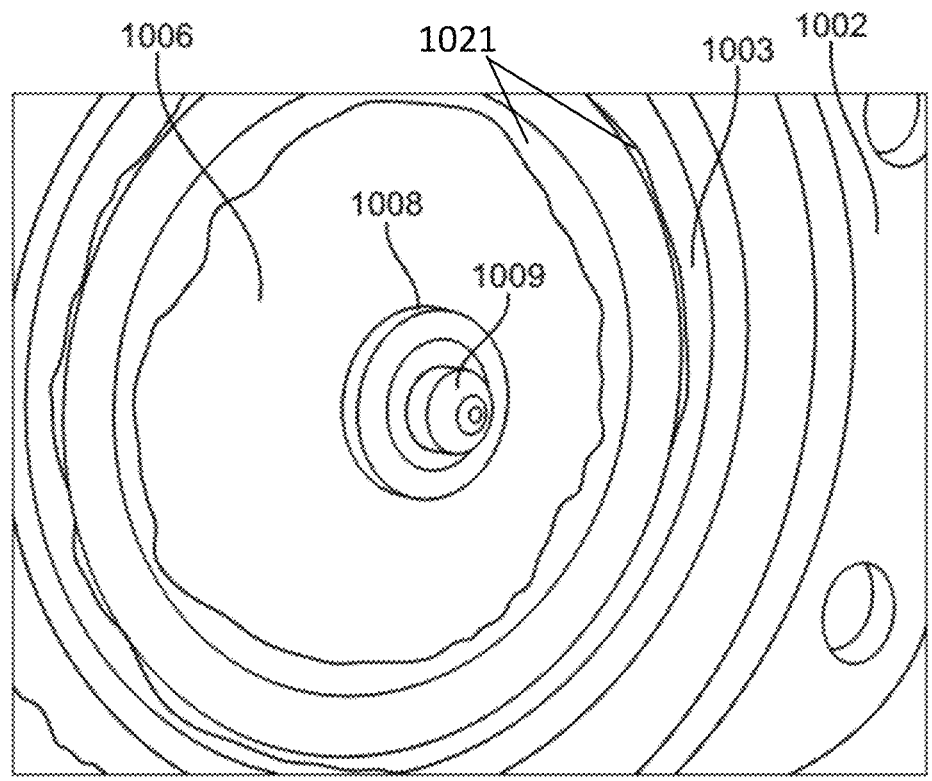
FIG. 18A shows a worm interface pin of a slew drive system, in accordance with embodiments.
Figure 18B:
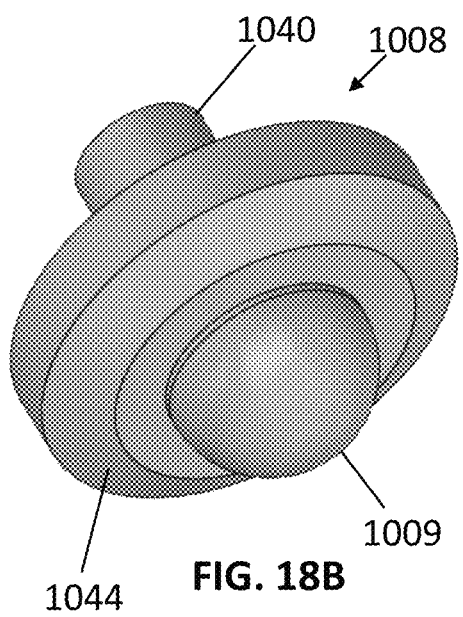
FIG. 18B shows a worm interface pin, in accordance with embodiments.
Figure 18C:
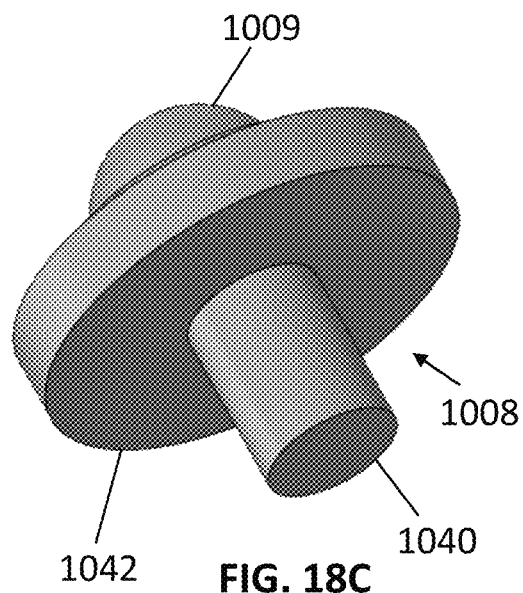
FIG. 18C shows a reverse view of the worm interface pin shown in FIG. 18B.

FIG. 18A shows a worm interface pin 1008 fitted to an end surface of a worm gear 1006. As shown in FIG. 18A, the end of worm gear 1006 can be housed within a housing bearing 1003 of slew drive housing 1002. One or more fluids, such as one or more lubricants 1021 can be used to decrease friction between two or more components of a slew drive system (e.g., between a worm gear 1006 and a slew drive housing bearing 10003. Worm interface pin 1008 can comprise a worm interface pin interface surface 1009, which can be used to contact a sensor carrier 1010, e.g., at a point on a deformation element 1011. In some cases, the geometry of a worm interface pin interface surface 1009 can be designed to reduce wear and fatigue in the worm interface pin and in the sensor carrier. For example, worm interface pin interface surface 1009 can have a round geometry (e.g., hemispherical, spherical, or other rounded shapes) or other geometry that minimizes contact area between the worm interface pin 1008 and the sensor carrier 1010, e.g., as shown in FIGS. 18B-18F. In some cases, minimizing contact area between the worm interface pin 1008 and the sensor carrier 1010 can decrease the amount of wear resulting from rotation of the worm gear 1006 (e.g., and in turn rotation of the worm interface pin 1008), for example, as the worm wheel applies a force against the threading of the worm gear. In some cases, a worm interface pin interface surface having a rounded geometry (e.g., spherical, hemispherical, or other rounded shape) can aid in maintaining a single point of contact on a sensor or sensor carrier (or portion thereof) over a wide range of deflections of the sensor or sensor carrier. In some cases, a worm interface pin interface surface 1009 can be flat (e.g., as shown in FIG. 19). In some cases, a longitudinal length of a worm interface pin 1008 can be from 1 mm to 12 mm. In some cases, a longitudinal length of a worm interface pin 1008 can be from 1 mm to 4 mm, 1 mm to 6 mm, 1 mm to 8 mm, 1 mm to 10 mm, 1 mm to 12 mm, 4 mm to 6 mm, 4 mm to 8 mm, 4 mm to 10 mm, 4 mm to 12 mm, 6 mm to 8 mm, 6 mm to 10 mm, 6 mm to 12 mm, 8 mm to 10 mm, 8 mm to 12 mm, or 10 mm to 12 mm. In some cases, a longitudinal length of a worm interface pin 1008 can be from 1 mm, 4 mm, 6 mm, 8 mm, 10 mm, or 12 mm. In some cases, a longitudinal length of a worm interface pin 1008 can be from at least 1 mm, 4 mm, 6 mm, 8 mm, or 10 mm. In some cases, a longitudinal length of a worm interface pin 1008 can be from at most 4 mm, 6 mm, 8 mm, 10 mm, or 12 mm. In some cases, a width, radius, or diameter of all or a portion of a worm interface pin 1008 (e.g., of an interface surface 1009 of worm interface pin 1008) can be from 0.5 mm to 6 mm. In some cases, a width, radius, or diameter of all or a portion of a worm interface pin 1008 (e.g., of an interface surface 1009 of worm interface pin 1008) can be from 0.5 mm to 1 mm, 0.5 mm to 2 mm, 0.5 mm to 3 mm, 0.5 mm to 4 mm, 0.5 mm to 5 mm, 0.5 mm to 6 mm, 1 mm to 2 mm, 1 mm to 3 mm, 1 mm to 4 mm, 1 mm to 5 mm, 1 mm to 6 mm, 2 mm to 3 mm, 2 mm to 4 mm, 2 mm to 5 mm, 2 mm to 6 mm, 3 mm to 4 mm, 3 mm to 5 mm, 3 mm to 6 mm, 4 mm to 5 mm, 4 mm to 6 mm, or 5 mm to 6 mm. In some cases, a width, radius, or diameter of all or a portion of a worm interface pin 1008 can be from 0.5 mm, 1 mm, 2 mm, 3 mm, 4 mm, 5 mm, or 6 mm. In some cases, a width, radius or diameter of all or a portion of a worm interface pin 1008 can be from at least 0.5 mm, 1 mm, 2 mm, 3 mm, 4 mm, or 5 mm. In some cases, a width or diameter of all or a portion of a worm interface pin 1008 can be from at most 1 mm, 2 mm, 3 mm, 4 mm, 5 mm, or 6 mm. In some cases, a worm interface pin can comprise steel (e.g., stainless steel, such as 400 series stainless steel).

In some cases, worm interface pin 1008 can comprise a worm interface pin post 1040 (e.g., as shown in FIGS. 18B-18F, and FIG. 19), which can be fitted into a hole on the end surface of worm gear 1006 (e.g., to aid in maintaining the positioning of the worm interface pin 1008 relative to worm gear 1006). In some cases, worm interface pin 1008 can comprise worm interface pin lip 1042 (e.g., to reduce bending of worm interface pin 1008 during use, for example, by contacting the end surface of worm gear 1006). In some cases, a worm interface pin lip 1042 can be increase the consistency of initial deflection (or deformation) of a slew drive system sensor 1013 or sensor carrier 1010 (or portion thereof). For example, inserting a worm interface pin post 1040 into a worm gear end surface hole until a worm interface pin lip 1042 of the worm interface pin 1040 contacts the worm gear end surface can aid in ensuring a consistent distance between the worm gear end surface and the contact point on the sensor 1013 or sensor carrier 1010 (or portion thereof). In some cases, worm interface pin 1008 can comprise bevel 1044 (e.g., to reduce the likelihood of worm interface pin lip 1042 inadvertently contacting sensor carrier 1010 or a component coupled to proximal end plate 1014 during use).

Figure 18D:
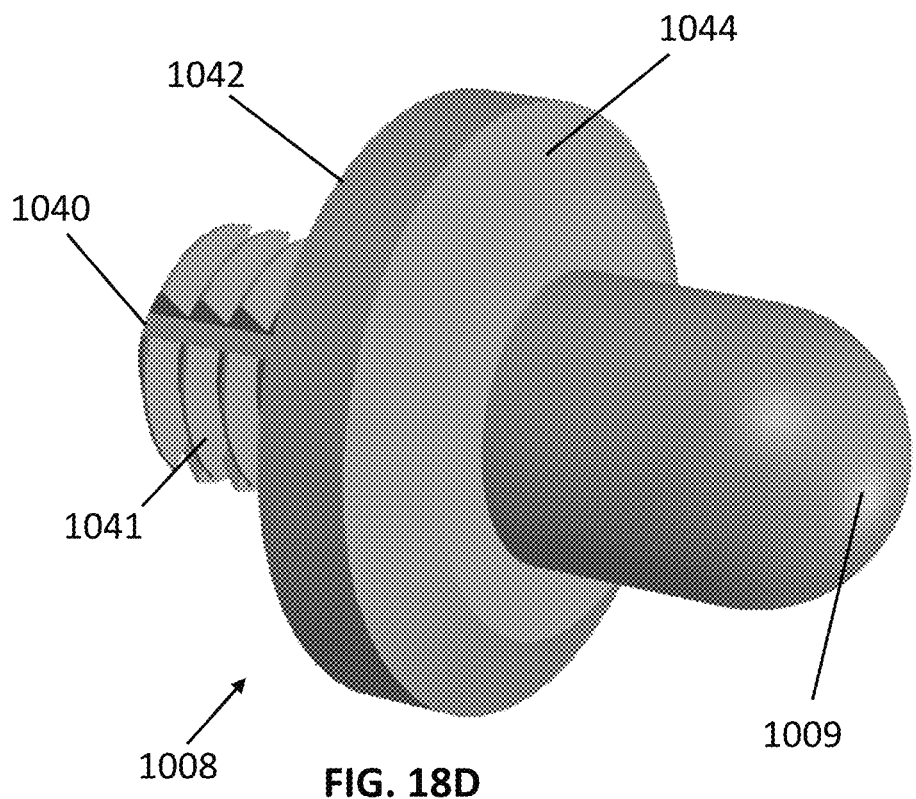
FIG. 18D shows a schematic of a worm interface pin, in accordance with embodiments.
Figure 18E:
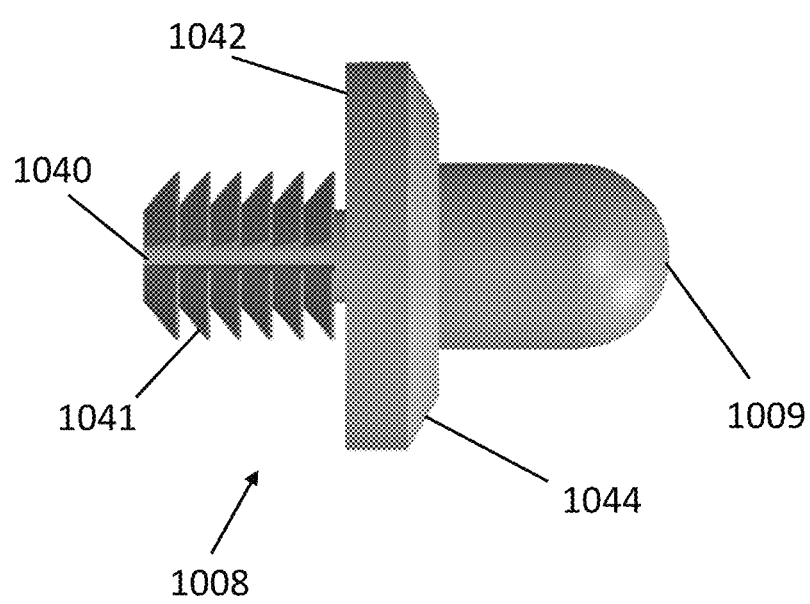
FIG. 18E shows a schematic of a worm interface pin, in accordance with embodiments.
Figure 18F:
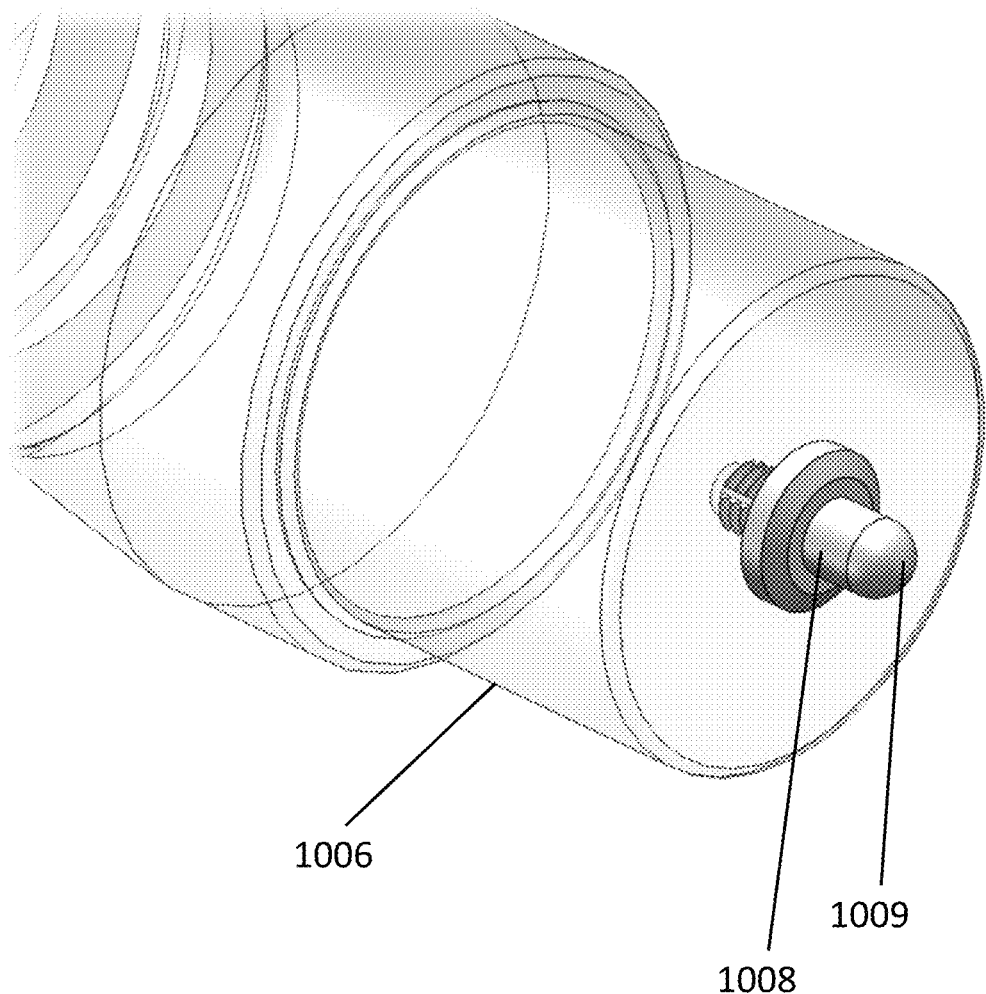
FIG. 18F shows a schematic of a worm interface pin and a worm gear, in accordance with embodiments.

In some cases, a worm interface pin post 1040 can comprise one or more worm interface pin post flanges 1041 (e.g., as shown in FIGS. 18D-18F). In some cases, one or more worm interface pin post flanges 1041 can aid in maintaining the positioning of the worm interface pin 1008 relative to worm gear 1006 (e.g., by maintaining the positioning of worm interface pin post 1040 relative to (e.g., axially and/or in a direction perpendicular to a longitudinal axis of worm gear 1006)) worm gear 1006 (e.g., as shown in FIG. 18F). For instance, one or more worm interface pin post flanges 1041 can exert a biasing force against an inner surface of a worm gear end surface hole (e.g., to increase friction between the worm interface pin 1008 and the inner surface of the worm gear end surface hole), in some embodiments. In some cases, improving positioning of the worm interface pin 1008 relative to worm gear 1006 (e.g., by employing a worm interface pin 1008 comprising one or more worm interface pin post flanges 1041) can improve the accuracy and/or precision of slew drive system sensor 1013. For example, reducing variability in the position on a sensor carrier 1010 (e.g., a position on a deformation element of the sensor carrier) at which a worm interface pin interface surface 1009 contacts the sensor carrier 1010 (e.g., resulting from movement of the worm interface pin post 1040 within the worm gear end surface hole) can reduce or eliminate variability in deformation element deflection, variability in deformation element strain, and/or error in sensor measurements of worm gear position (e.g., as shown in FIG. 18G and FIG. 18H).

Figure 18J:
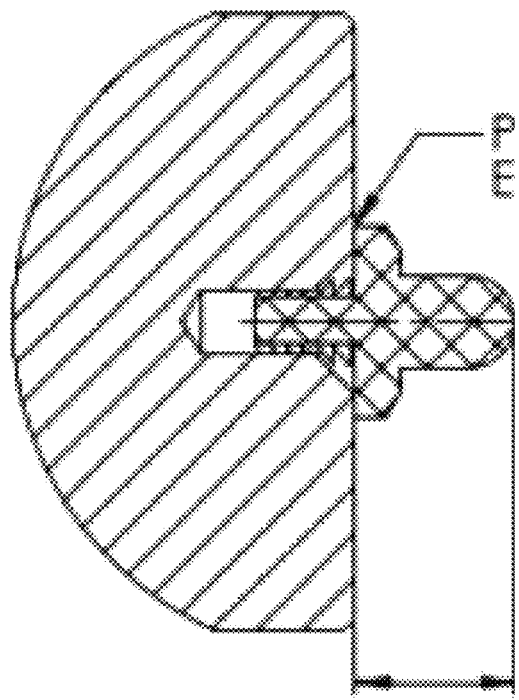
FIG. 18J shows a schematic of a worm gear end surface, in accordance with embodiments.
Figure 18J:
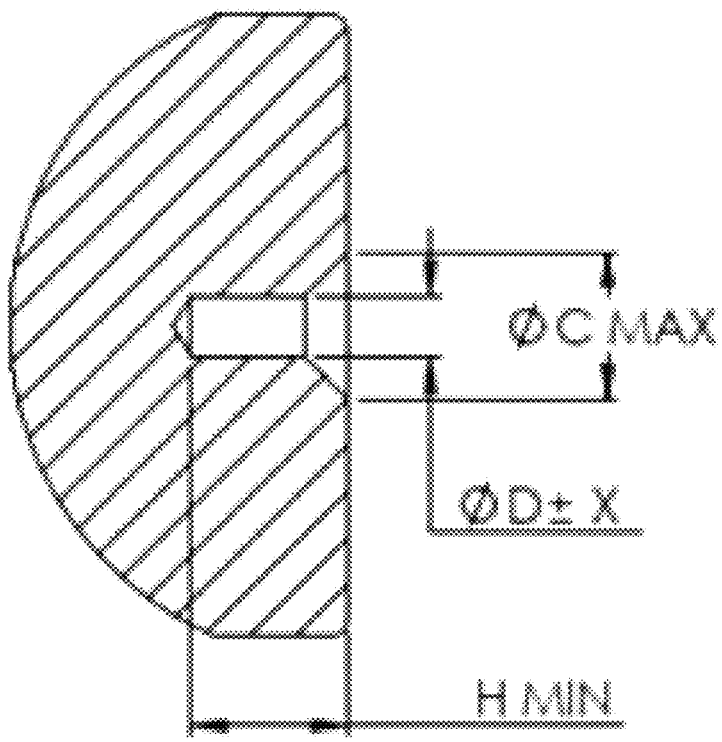

In some cases, a worm interface pin post 1040 can comprise a plurality of worm interface pin post flanges 1041. In some cases, the one or more worm interface pin post flanges 1041 of a worm interface pin can increase a radial dimension (e.g., diameter) of a worm interface pin post 1040 from less than or equal to a radial dimension (e.g., inner diameter) of a worm gear end surface hole to a length greater than the radial dimension (e.g., inner diameter) of the worm gear end surface hole (e.g., as shown in FIG. 18-I). In some cases, a worm gear end surface hole comprises a bevel (e.g., as shown in FIG. 18J). In some cases, the axial length of a worm interface pin post is less than (e.g., as shown in FIG. 18-I) or is equal to the axial length of a worm gear end surface hole. In some cases, all or portion of a worm interface pin post flange 1041 can be flexible (e.g., semi-rigid). A diameter of a worm gear end surface hole can vary between worm gears of individual slew drive systems (e.g., due to loose worm gear manufacturing control). In some cases, a worm interface pin 1008 comprising one or more worm interface pin post flanges 1041 can be properly fitted into worm gear end surface holes of different diameters. In some cases, this can reduce or eliminate the need to produce multiple sizes or styles of worm interface pins 1008 having different worm interface pin post diameters to ensure a proper fit in the worm gear of each slew drive system.

Figure 19E:
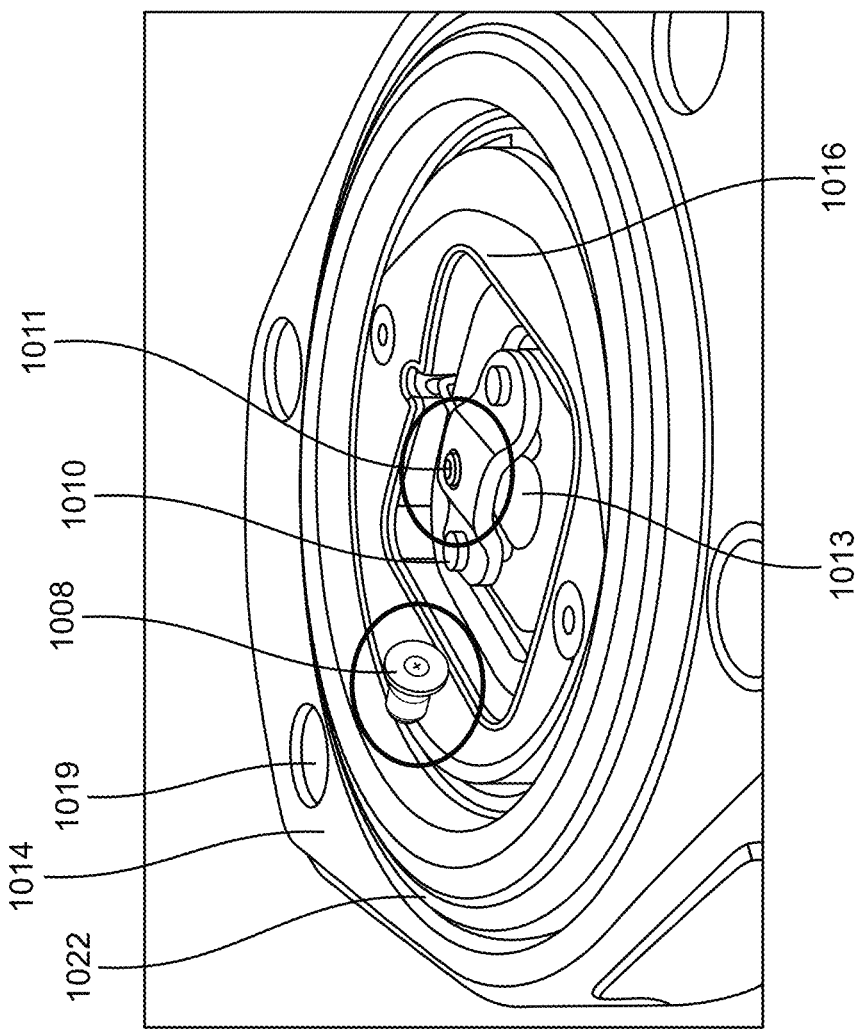
FIG. 19E shows a sensor carrier and proximal end plate of a slew drive system, in accordance with embodiments.
Figure 19C:
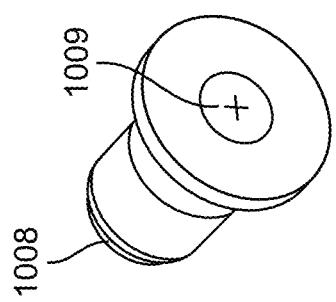
FIG. 19C shows a distal end of worm interface pin, in accordance with embodiments.
Figure 19D:
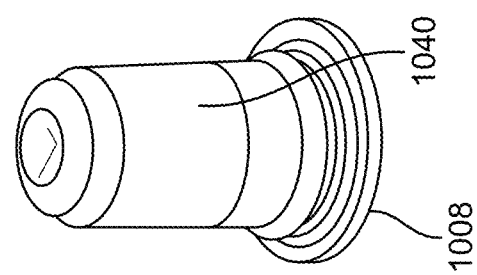
FIG. 19D shows a proximal end of a worm interface pin, in accordance with embodiments.
Figure 19A:
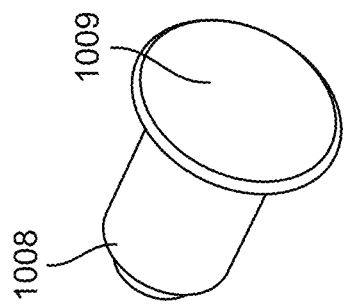
FIG. 19A shows a distal end of a worm interface pin, in accordance with embodiments.
Figure 19B:
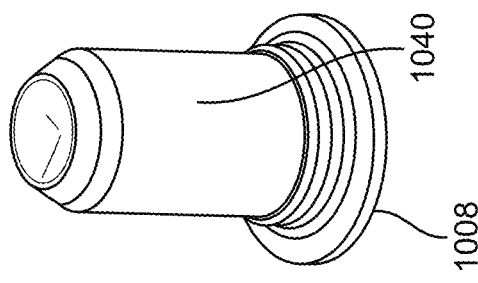
FIG. 19B shows a proximal end of a worm interface pin, in accordance with embodiments.

In some cases, a worm interface pin 1008 comprises a flat worm interface pin interface surface 1009, e.g., as shown in FIG. 19A (which shows an unused worm interface pin, in accordance with some embodiments) and FIG. 19C (which shows a worm interface pin that has been used in a slew drive system 1000, in accordance with embodiments). A worm interface pin 1008 comprising a flat worm interface pin interface surface 1009 can comprise a worm interface pin post 1040, e.g., as shown in FIG. 19B (which shows an unused worm interface pin, in accordance with some embodiments) and FIG. 19D (which shows a worm interface pin that has been used in a slew drive system 1000, in accordance with embodiments). FIG. 19E illustrates an example of a proximal end plate 1014 comprising a seal 1022 and four proximal end plate fastener holes 1019, which is coupled to a sensor carrier mount 1016 that is coupled to a sensor carrier frame 1010 and a deformation element 1011. A sensor 1013 (e.g., a force sensor) can be coupled to the sensor carrier 1010 between the sensor carrier frame 1010 and the deformation element 1011, for example, as shown in FIG. 19E. In some cases, deformation of deformation element 1011 (e.g., as configured in FIG. 19E) can compress a force sensor 1013 (e.g., as configured in FIG. 19E). In some cases, deformation element 1011, for example as configured in FIG. 19E, can be deformed as a result of displacement of a worm gear 1006 in a direction perpendicular to or substantially perpendicular to a plane of the sensor carrier 1010 and/or the deformation element 1011. In some cases, force resulting from worm gear displacement can be transmitted to a deformation element by a worm interface pin 1008. A worm interface pin 1008 (e.g., separate from worm gear 1006) is shown in FIG. 19E placed on top of the assembled proximal end plate apparatus.

Figure 20A:
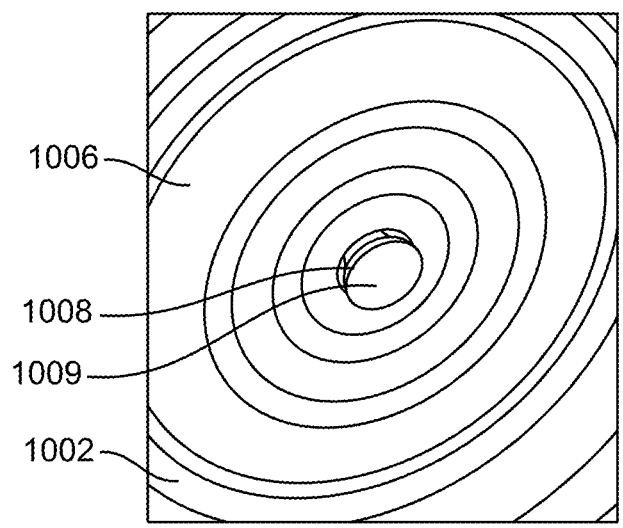
FIG. 20A shows a worm and a worm interface pin of a slew drive system, in accordance with embodiments.
Figure 20B:
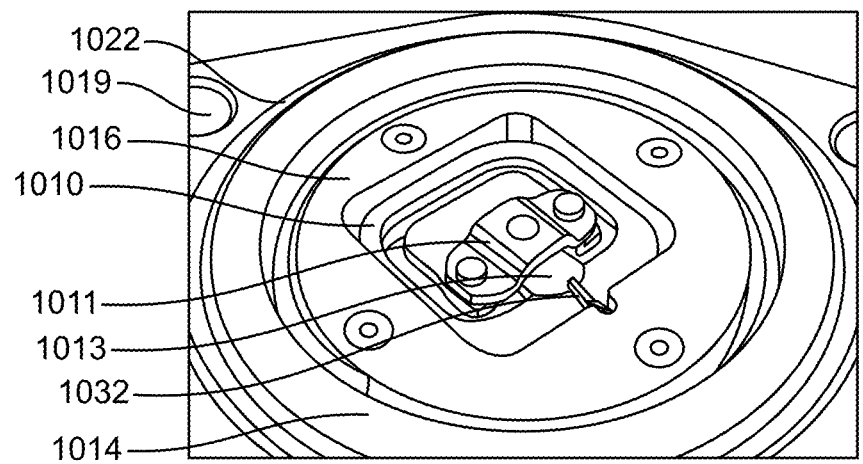
FIG. 20B shows a sensor and sensor carrier of a slew drive system, in accordance with embodiments.
Figure 20C:
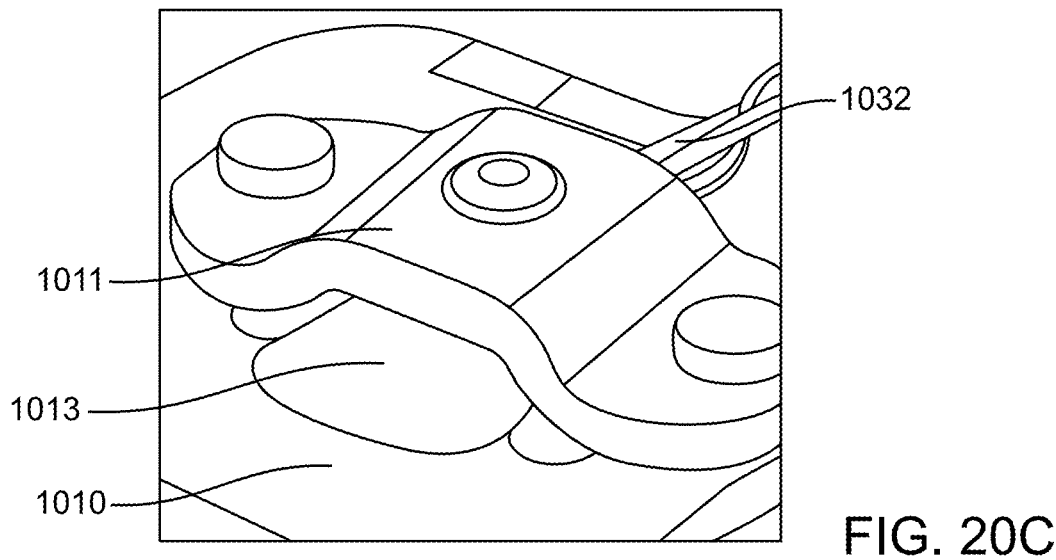
FIG. 20C shows a sensor and sensor carrier of a slew drive system, in accordance with embodiments.
Figure 21:
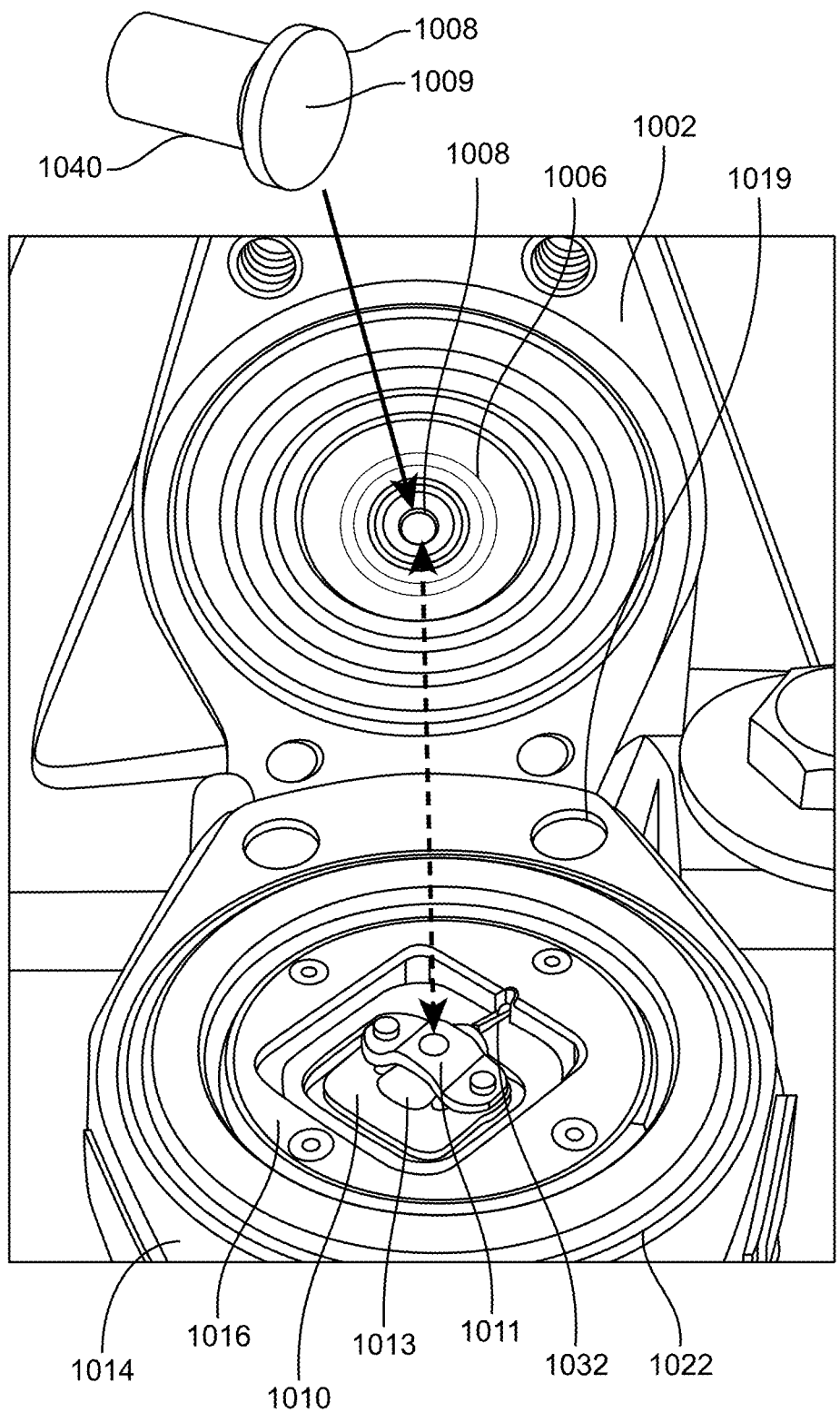
FIG. 21 shows a worm and a sensor carrier of a slew drive system, in accordance with embodiments.

FIG. 20A shows a worm interface pin 1008 placed in an end surface of a worm gear 1006. A worm interface pin 1008 can have a flat worm interface pin interface surface 1009 (e.g., as shown in FIG. 20A) or a non-flat worm interface pin interface surface 1009. A sensor 1013 can be disposed between a deformation element 1011 and a sensor carrier frame 1010, for example, as shown in FIG. 20B and FIG. 20C. As shown in FIGS. 20B and 20C, a deformation element 1011 can be coupled to a sensor carrier 1010 by fasteners, in some embodiments. As shown in FIG. 20B, a sensor carrier 1010 can be coupled to a sensor carrier mount 1016, which can in turn be coupled to a proximal end plate 1014. In some embodiments, a proximal end plate 1014 (e.g., that is coupled to a sensor carrier mount 1016, a sensor carrier 1010, and/or a sensor 1013) can comprise proximal end plate fastener holes 1019, e.g., for coupling the proximal end plate 1014 to a slew drive housing 1002 such that worm interface pin 1008 is aligned with and/or directly contacts deformation element 1011 (e.g., as shown in FIG. 21).

Figure 22A:
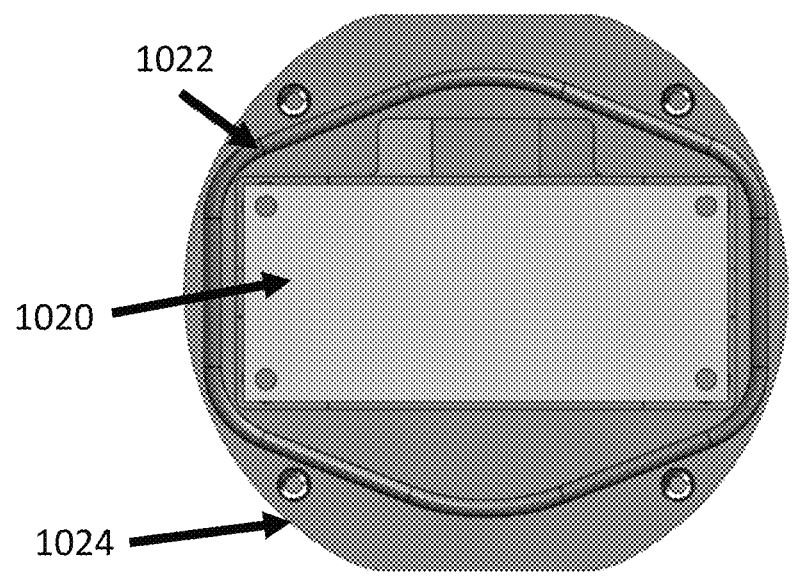
FIG. 22A is a schematic showing a distal end cap comprising a seal and a controller, in accordance with embodiments.
Figure 22B:
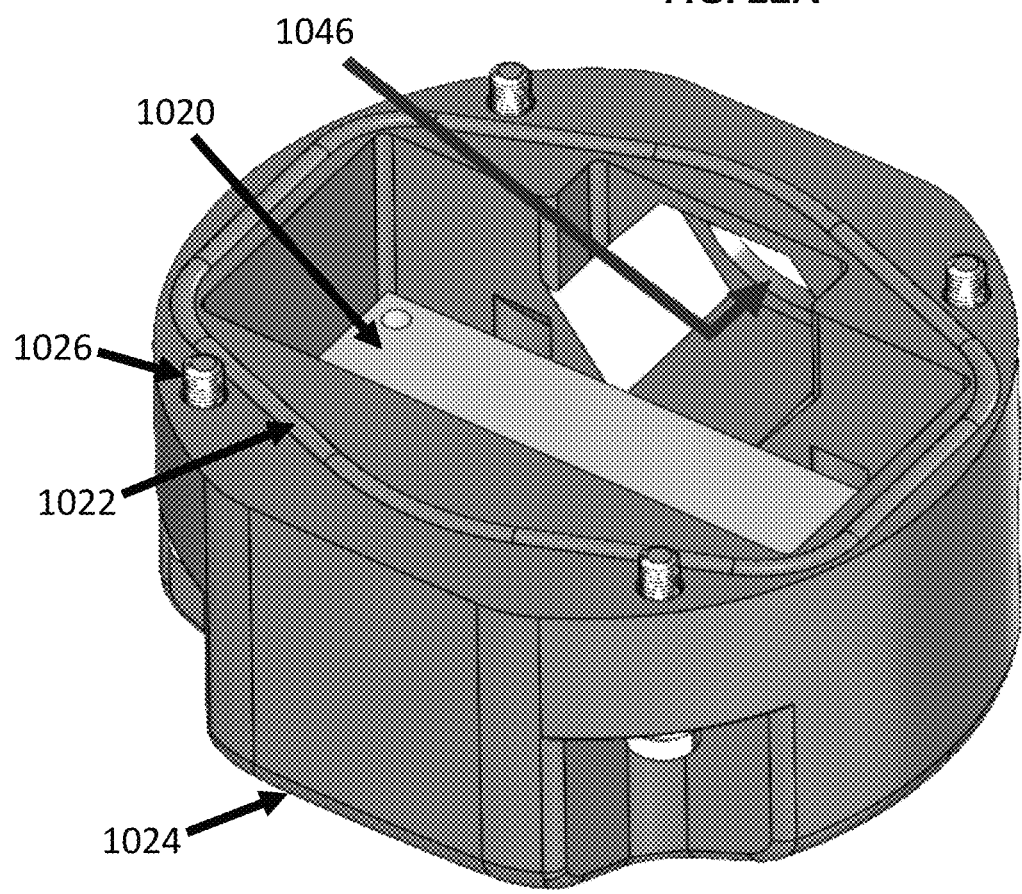
FIG. 22B is a schematic showing a distal end cap comprising a seal, a controller, and a connector port, in accordance with embodiments.

A slew drive system 1000 can comprise a distal end cap 1024. A distal end cap 1024 can be used to house a controller 1020 (e.g., as shown in FIG. 22A and FIG. 22B). In some cases, a controller 1020 is coupled to a distal end cap 1024. In some cases, a controller 1020 is coupled to an interior surface of a distal end cap 1024. While it is contemplated that a controller can be coupled to or housed within another portion of slew drive system 1000 (e.g., slew housing 1002, proximal end plate 1014, sensor carrier mount 1016, or sensor carrier 1010), housing controller 1020 within distal end cap 1024 can protect the controller 1020 from damage that could be sustained from moving components of the slew drive system 1000 and/or damage from lubricants of slew drive system 1000 in some cases. As shown in FIG. 22A and FIG. 22B, a distal end cap 1024 can comprise a seal 1022 (e.g., to reduce the likelihood of lubricants or other fluids contacting the controller 1020. In some cases, a distal end cap 1024 can be coupled to a proximal end plate 1014 and/or to a slew drive housing 1002, e.g., via distal end cap fasteners 1026. In some cases, a distal end cap 1024 (and/or a proximal end plate 1014) can comprise a connection port 1046. In some cases, a connection port comprises an aperture in a portion of distal end cap 1024 (e.g., through a side wall or end wall of distal end cap 1024, for example, to form a gap connecting an interior cavity or chamber of distal end cap 1024 with the space external to the slew drive system). In some cases, wiring 1032 connected to one or more sensors 1013 can run through a connection port 1046, e.g., to connect one or more sensors 1013 and/or controller 1020 to an external controller 1066 (e.g., an external programmable logic controller and/or a data acquisition processor). In some cases, a distal end cap 1024 can comprise a plastic material. In some cases, a distal end cap 1024 can be 3D printed (e.g., from plastic). In some cases, a distal end cap 1024 can be formed by injection molding (e.g., from plastic) In some cases, a distal end cap 1024 can comprise a metal material.

Figure 23A:
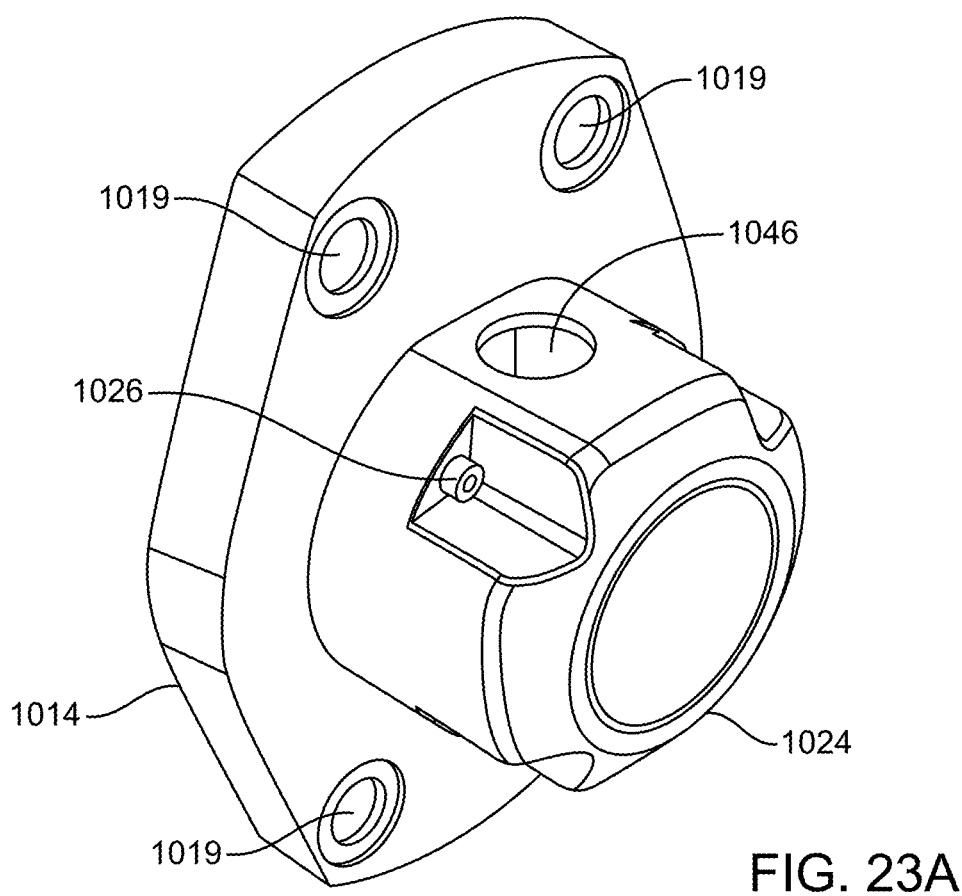
FIG. 23A shows a proximal end plate and a distal end cap, in accordance with embodiments.
Figure 23B:
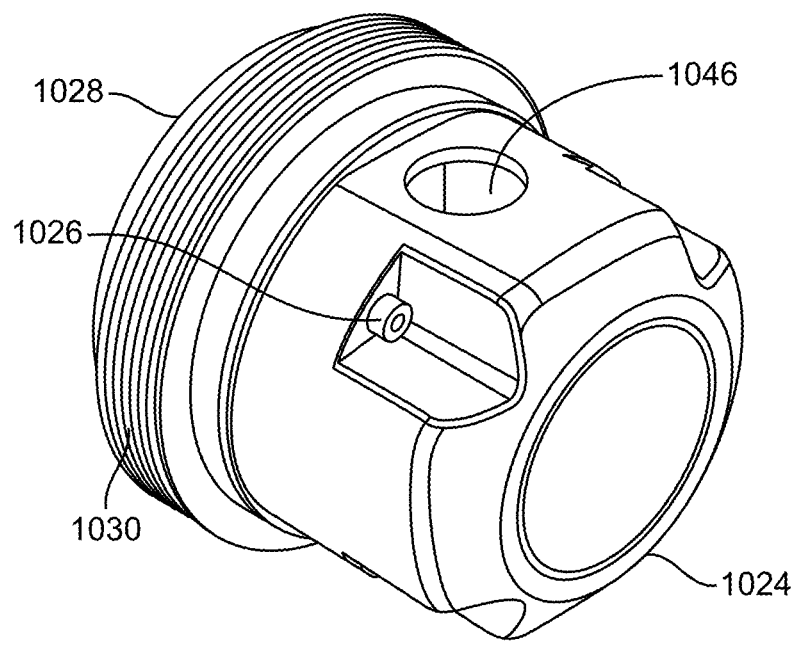
FIG. 23B shows a plug and a distal end cap, in accordance with embodiments.

A distal end cap 1024 can be coupled to a proximal end plate 1014 (e.g., as shown in FIG. 23A) or to a plug 1028 (e.g., as shown in FIG. 23B), for example, to secure controller 1020 to the body of the slew drive mechanism and/or to prevent damage to wired connections 1032 between one or more sensors and controller 1020. Additionally or alternatively, a distal end cap 1024 can be coupled to a slew drive housing 1002, e.g., via distal end cap fasteners 1026.

Figure 24A:
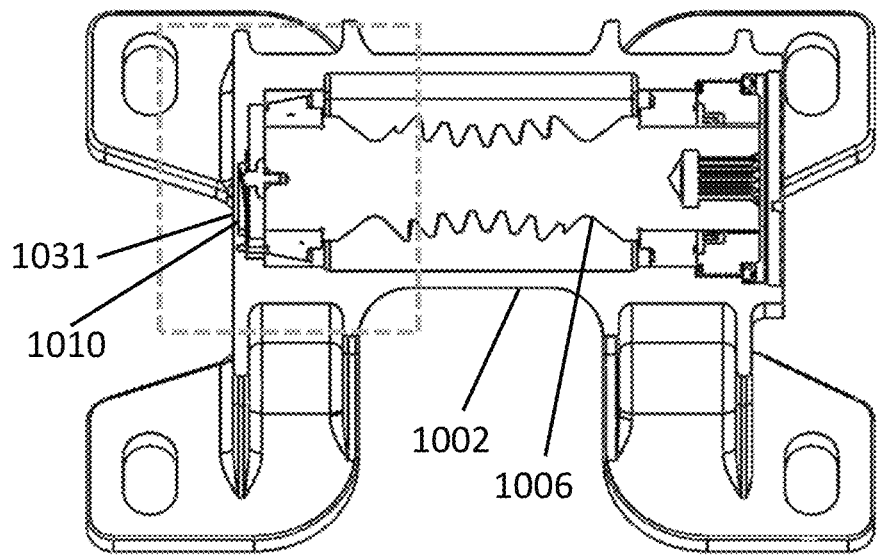
FIG. 24A shows a schematic of a portion of a slew drive system with a sensor carrier coupled to an end wall of a worm shaft housing, in accordance with embodiments.
Figure 24B:
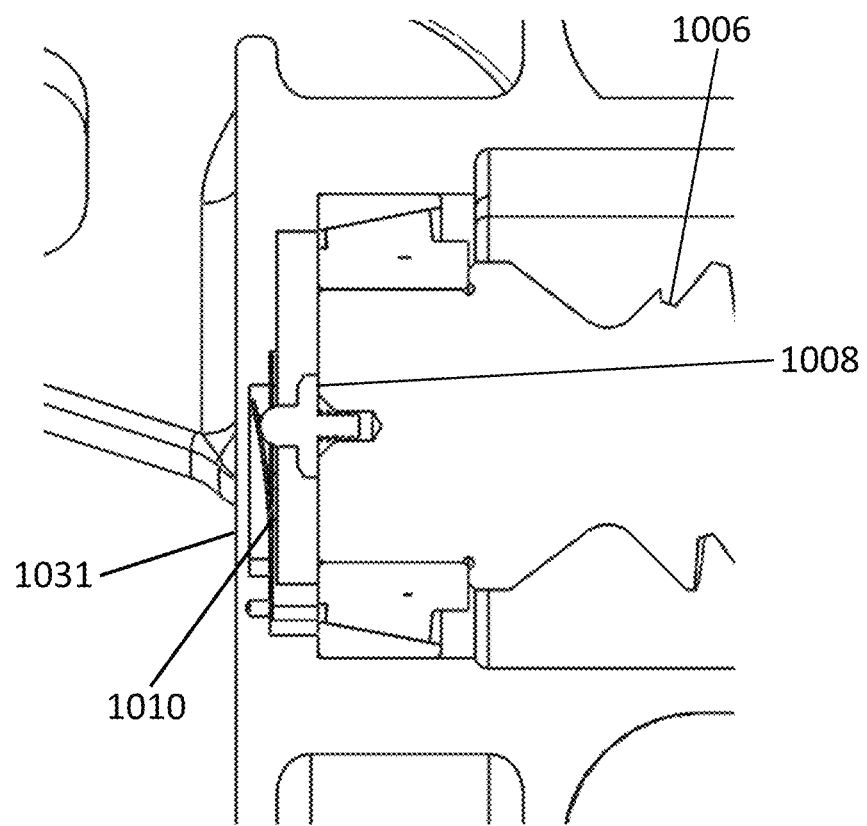
FIG. 24B shows a schematic of a portion of a slew drive system comprising a sensor carrier coupled to an end wall of a worm shaft housing, in accordance with embodiments.

In some cases, a slew drive system 1000 can comprise a sensor carrier 1010 coupled to a housing 1002 of the slew drive system 1000, for example, as shown in FIG. 24A and FIG. 24B (FIG. 24B shows an enlarged view of some embodiments of the slew drive system 1000 represented in FIG. 24A, e.g., in a region indicated by the dotted line in FIG. 24A). In some cases, a housing 1002 of a slew drive system 1000 can extend partially or completely across a worm gear shaft of the slew drive system 1000. For instance, the housing 1002 of a slew drive system 1000 can form an end wall 1031 of the worm gear shaft, which can be a continuous portion of the housing 1002, e.g., as shown in FIG. 24A and FIG. 24B. In some cases, a sensor carrier 1010 can be coupled (e.g., directly) to the end wall 1031 of the worm gear shaft. A sensor carrier 1010 coupled to an end wall 1031 of a worm gear shaft can be aligned such that a deformation element 1011 can be impinged upon by the worm gear 1006 or a worm interface pin 1008, e.g., during operation of the slew drive system 1000, for example, to facilitate measurement of axial displacement of the worm gear 1006 within the worm gear shaft (for instance by detecting a signal or change in signal from one or more sensors (e.g., one or more strain gauge sensors) coupled to the deformation element 1011). In some cases, a slew drive system 1000 with a worm gear shaft that is sealed or partially sealed by an end wall 1031 and a sensor carrier coupled directly or indirectly to the (e.g., interior surface) of the end wall 1031 of the worm gear shaft does not require and a coupleable end plate, a coupleable plug, and/or a coupleable end cap (e.g., a "plateless," "plugless," and/or "capless" system), which can reduce the number of parts required to assemble the device and/or the cost of manufacture.

Figure 24C:
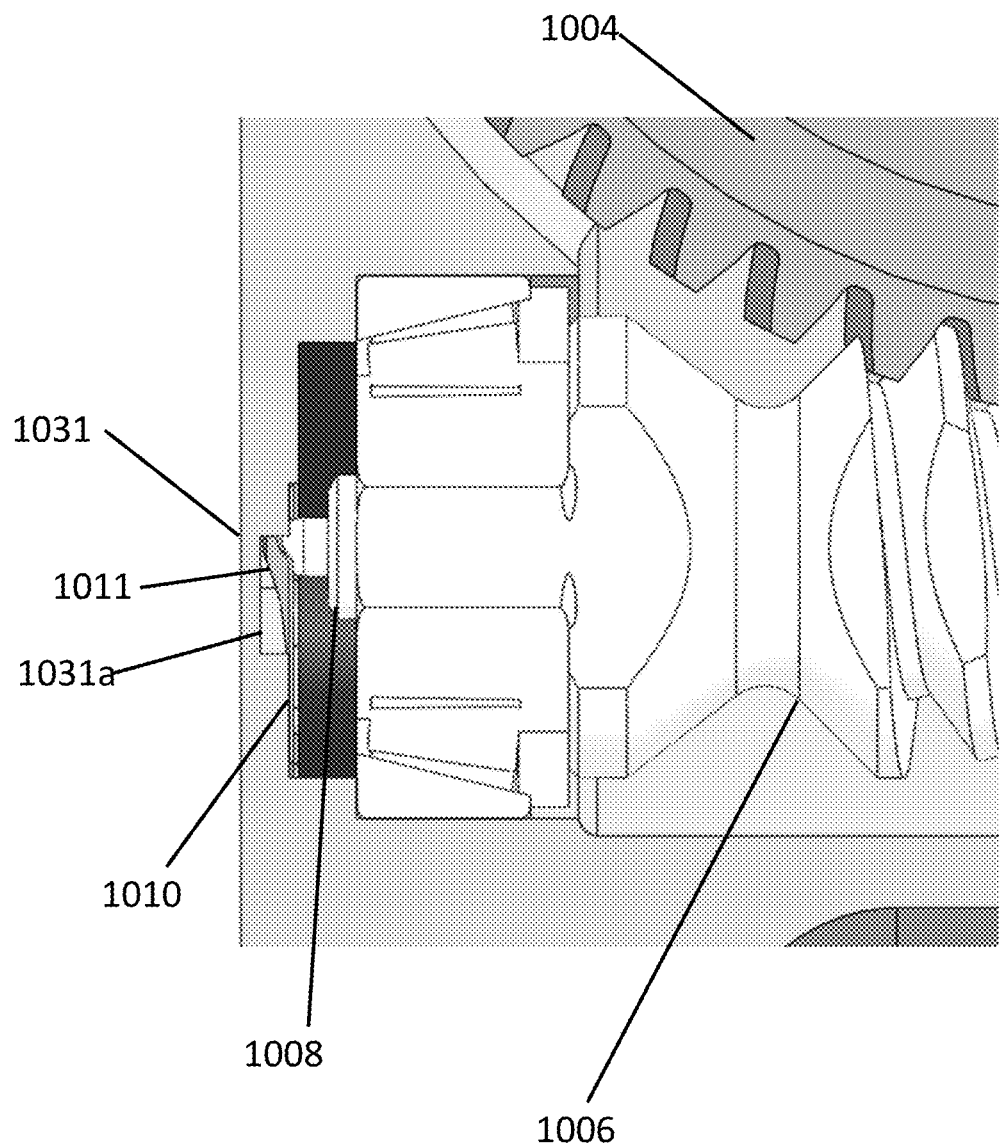
FIG. 24C shows a schematic of a portion of a slew drive system comprising a sensor carrier coupled to an end wall of a worm shaft housing, in accordance with embodiments.

FIG. 24C shows a portion of a slew drive system 1000 with a sensor carrier 1010 coupled to an end wall 1031 of the worm gear shaft of the system, in accordance with some embodiments. In some cases, an end wall 1031 of a worm gear shaft can comprise a recess 1031*a*, e.g., to allow deformation (e.g., deflection) of a deformation element 1011 of a sensor carrier 1010 coupled to the end wall 1031 of the worm gear shaft, for example as a worm interface pin 1008 (e.g., coupled to an end surface of a worm gear 1006 or in registration with a hole in an end surface of the worm gear 1006) impinges upon the deformation element 1011 (for instance, wherein the impinging results from axial displacement of the worm gear 1006 within the worm gear shaft). In some cases, allowing space for the deformation element 1011 to move (e.g., deform or displace) without contacting the end wall 1031 of the worm gear shaft allows a greater dynamic range and/or fidelity of sensor data (e.g., strain gauge data) from one or more sensors coupled to the sensor carrier 1010.

Figure 25:
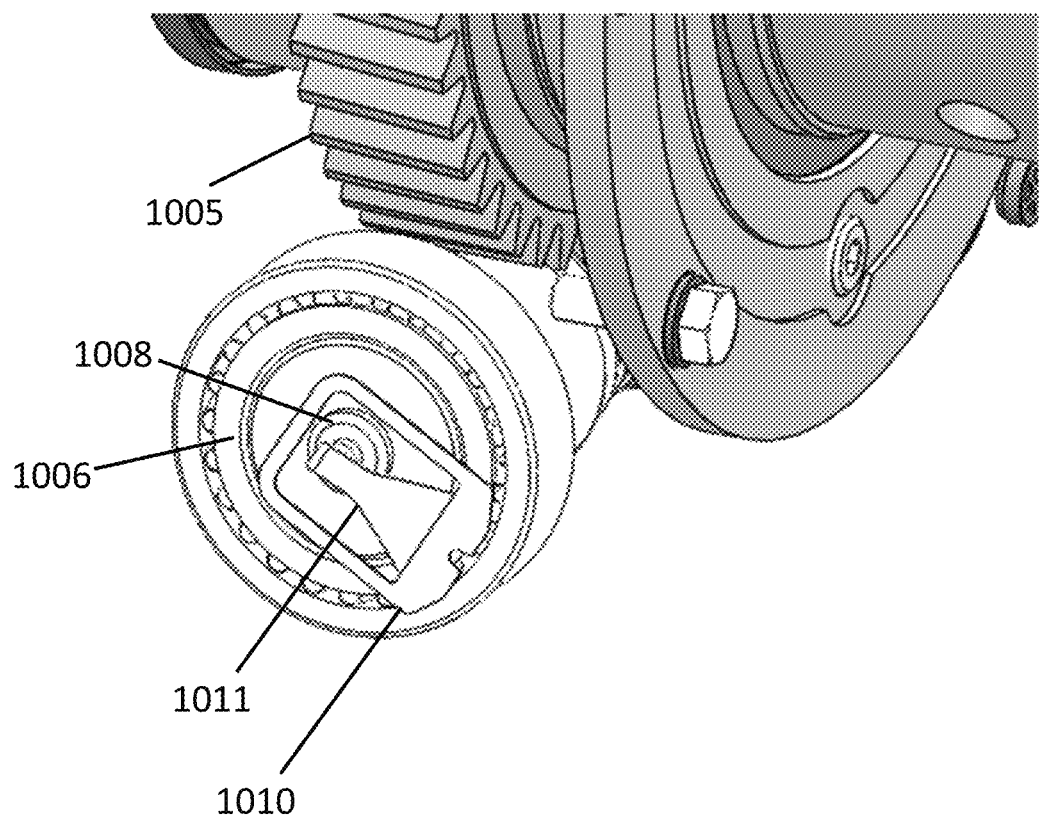
FIG. 25 shows a schematic of a worm gear interfacing with a sensor carrier, in accordance with embodiments.
Figure 26:
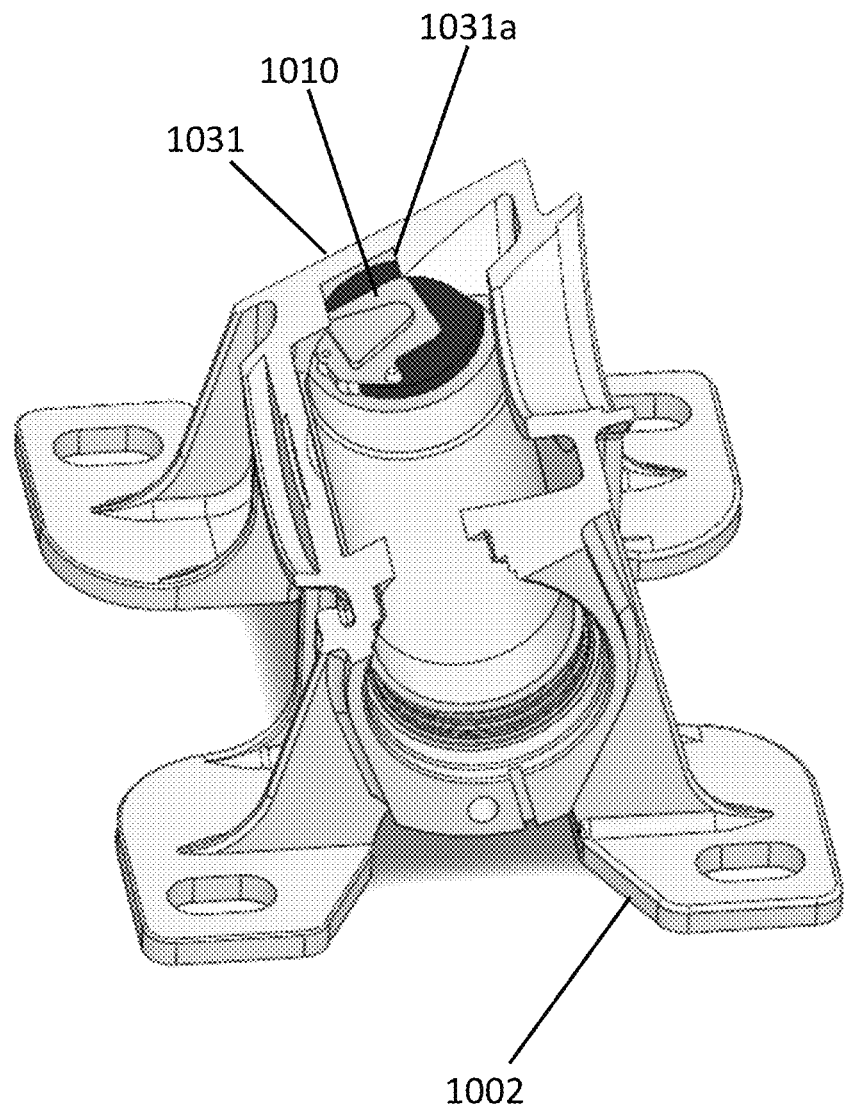
FIG. 26 shows a schematic cutaway view of a housing of a slew drive system comprising a sensor carrier coupled to an end wall of a worm shaft housing, in accordance with embodiments.

FIG. 25 shows an isolated view of a worm interface pin 1008 contacting a deformation element 1011 of a sensor carrier 1010 (sensors that may be coupled to the sensor carrier are not shown in FIG. 25), in accordance with some embodiments (e.g., wherein the sensor carrier is coupled to an end plate 1014 (e.g., proximal end cap 1014), a plug 1028, an end cap (e.g., a distal end cap 1024)), a protrusion cap 1027, or an end wall 1031 of a worm gear shaft). As shown in FIG. 25, the positioning of the sensor carrier relative to an end surface of the worm gear 1006 and/or a worm interface pin 1008 (or distal end 1009 thereof) and/or the shape of the sensor carrier 1010 can be adjusted (e.g., relative to the shape or size of the worm interface pin 1008) to avoid contact between the worm interface pin 1008 and/or the distal end surface of the worm gear 1006. FIG. 26 shows a cutaway view of a housing 1002 of a slew drive system 1000 wherein the sensor carrier 1010 is coupled to an end wall 1031 (e.g., a distal end wall 1031) of the worm gear shaft. A worm gear 1006 is not shown in FIG. 26 for clarity of the interior view of the worm gear shaft and end wall 1031 of the worm gear shaft.

Figure 27A:
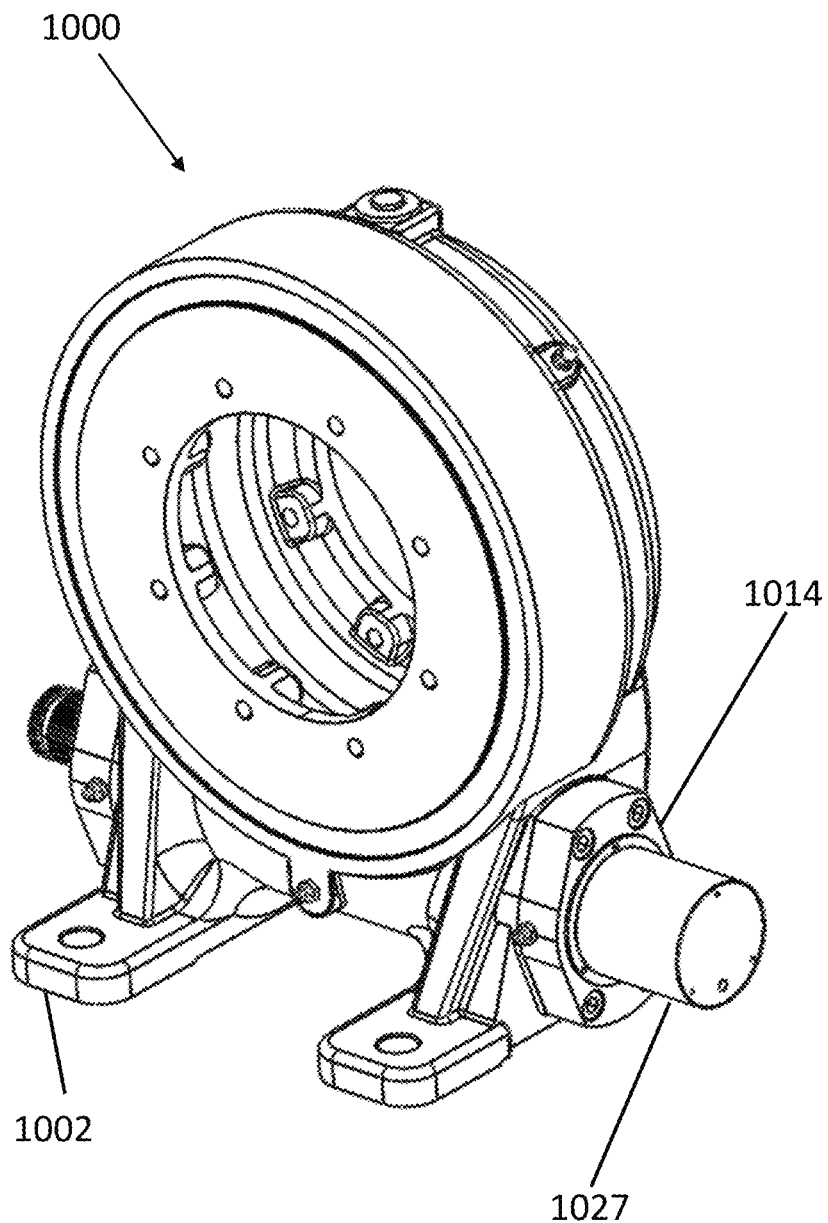
FIG. 27A shows a schematic of a slew drive system comprising a protrusion cup, in accordance with embodiments.
Figure 27B:
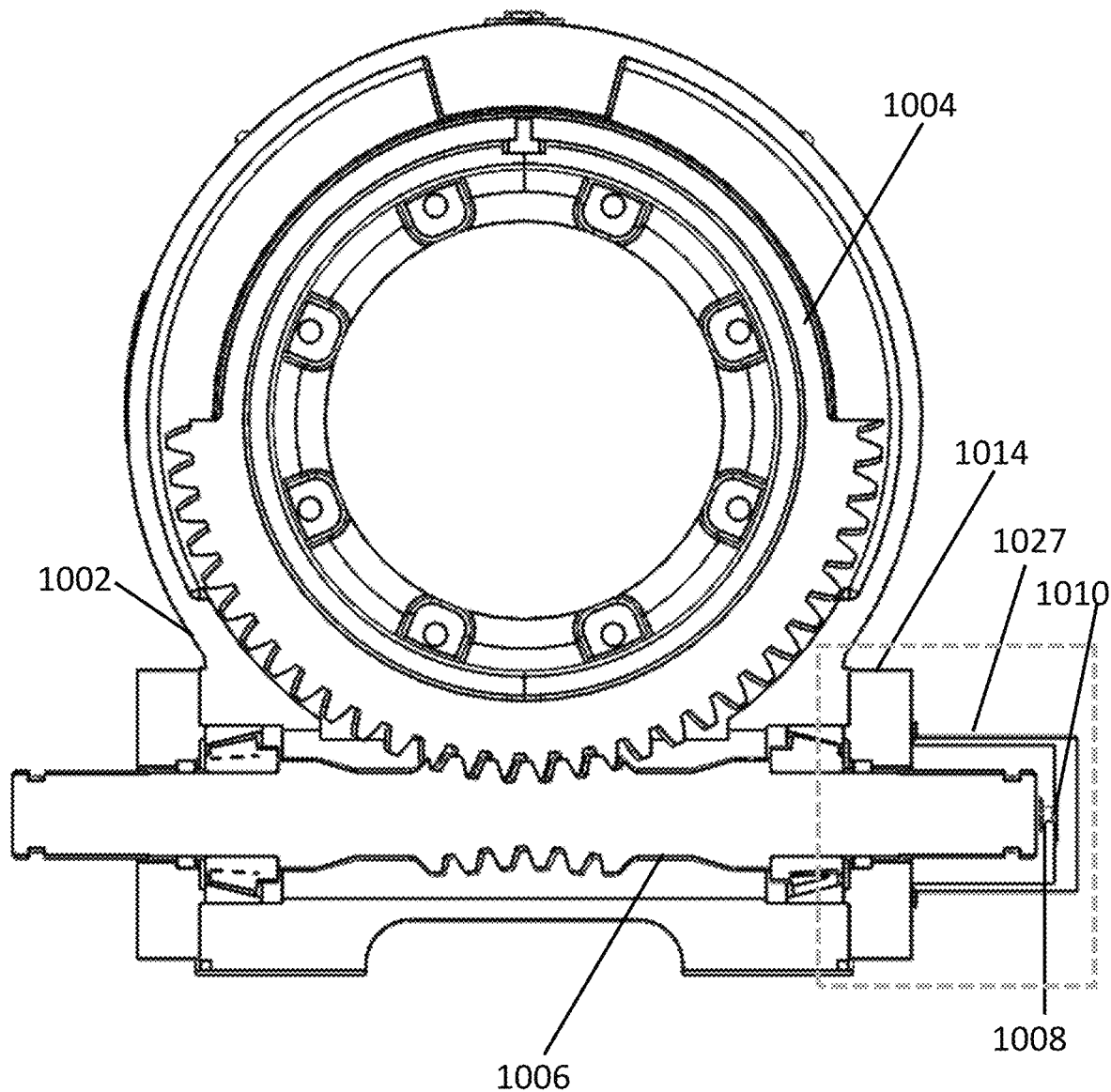
FIG. 27B shows a schematic of a cross-sectional view of a portion of a slew drive system comprising a protrusion cup, in accordance with embodiments.
Figure 27C:
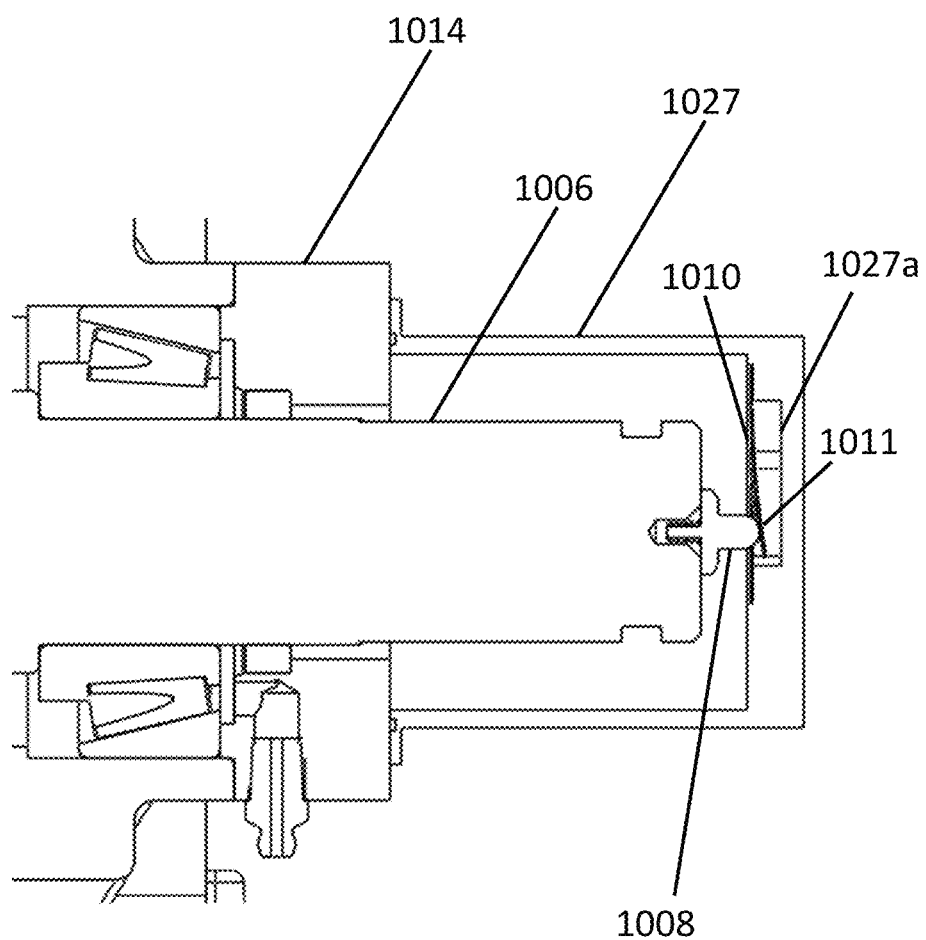
FIG. 27C shows a cross-sectional view of a section of a portion of a slew drive system comprising a protrusion cup, in accordance with embodiments.

A slew drive system 1000 can comprise a protrusion cap 1027, for instance, as shown in FIG. 27A, FIG. 27B, and/or FIG. 27C. In some cases, it is desirable or necessary for a worm gear 1006 that extends beyond the housing 1002 or an end plate 1014 of the slew drive system 1000 to be used. In some cases, it is necessary or advantageous to provide a protrusion cap 1027, which may comprise a sensor carrier 1010 coupled to an interior surface of the protrusion cap 1027, for instance, so that the sensor carrier 1010 (or a deformation element 1011 thereof) can be positioned at a distal end of the worm gear 1006, for example, which may extend beyond the housing or end plate of the system. In some cases, switching from a standard or short worm gear 1006 to a long worm gear 1006 (e.g., which may extend beyond a housing or end plate of the system) can preclude the use of a sensor carrier coupled to an end plate 1014 or a plug 1024. In some cases, the protrusion cap 1027 (e.g., coupled to a sensor carrier 1010) can be coupled to the housing 1002 (e.g., in place of an end plate 1014 or a plug 1024) so that the housing 1002 and one or more components of the slew drive system 1000 can be used with the longer worm gear 1006. FIG. 27B shows a cutaway view of a slew drive system 1000 comprising a protrusion cap 1027 and a worm gear 1006 that extends beyond the housing 1002 and end plate 1014 of the system 1000. In some cases, a protrusion cap 1027 can comprise fasteners or threading, which can be used to couple the protrusion cap 1027 to the housing 1002 and/or to the end plate 1014. As shown in FIG. 27B, a sensor carrier 1010 can be coupled to (e.g., an interior surface of) a protrusion cap 1027, for example, to allow a worm gear 1006 and/or a worm interface pin 1008 to contact the sensor carrier 1010 (e.g., a deformation element 1011 of a sensor carrier 1010) properly, as described herein. FIG. 27C shows a configuration of a portion of a slew drive system 1000 comprising a protrusion cap 1027. As shown in FIG. 27C, a protrusion cap 1027 can comprise a recess 1027a, which can be useful in providing space for deformation and/or displacement of a deformation element 1011 of a sensor carrier 1010 coupled to the protrusion cap, e.g., during use of the system 1000. In some cases, providing space (e.g., recess 1027a) for the deformation and/or displacement of a deformation element 1011 in a protrusion cap 1027 can improve the dynamic range and/or fidelity of sensor data from one or more sensors coupled to the sensor carrier 1010.

A slew drive system 1000 can comprise a controller 1020. In some cases, a controller 1020 is "on-board" or "local" (e.g., housed within or coupled to one or more components of the mechanical slew drive system). A "local" controller 1020 can be in communication with one or more sensors 1013 (e.g., one or more strain gauge sensors and/or one or more force sensors) of the slew drive system via a wired connection 1032. In some cases, a "local" controller 1020 can be powered by a battery (e.g., a battery local to the controller 1020, such as a battery on-board the "local" controller 1020 or a battery coupled to one or more of the mechanical slew drive components), an RF signal (e.g., via an RF receiver), or via power wires connected to an external power source. In some cases, a "local" controller can provide power to one or more sensors 1013, e.g., via one or more wires (e.g., a ground wire 1032c and/or a live power wire 1032a), for example, as shown in FIG. 28. In some cases, a controller 1020 (or controller 1066) can be "remote" (e.g., housed outside of all mechanical slew drive system components). In some cases, a "remote" controller 1020 (e.g., an external controller 1066) can be in communication with one or more sensors 1013, one or more "local" controllers 1020, and/or one or more additional "remote" controllers (e.g., external controllers 1066) via a wireless connection.

As shown in FIG. 29, a controller 1020 (e.g., a "local" controller 1020) can comprise wiring posts or pins for connection to wiring coupled to one or more sensors 1013 (e.g., one or more strain gauge sensors and/or one or more force sensors). In some cases, a controller 1020 (e.g., a "local" controller) can comprise a temperature sensor, e.g., to monitor internal temperature of the slew drive system. In some cases, temperature data measured by a temperature sensor of a slew drive system can be used to estimate or determine the amount of deformation a deformation element 1011, worm interface pin 1008, worm gear 1006, and/or sensor 1013 experiences during a measured data point, for example, to aid in determining a correction factor for processing and analyzing sensor measurement data. A controller 1020 can comprise a processor, e.g., for processing raw sensor data and/or for controlling sensor function. In some cases, a processor of a controller 1020 can be configured to process data input provided (e.g., by one or more sensors 1013) at a rate of at least 1 Hertz (Hz), at least 2 Hz, at least 5 Hz, at least 10 Hz, at least 15 Hz, at least 20 Hz, at least 25 Hz, at least 30 Hz, at least 40 Hz, or at least 50 Hz. A controller 1020 can comprise a non-transitory memory and/or a transitory memory, for example, to store instructions for data processing by the controller and/or instructions for operation of one or more sensors 1013 of the slew drive system 1000. In some cases, a processor of a controller 1020 can comprise circuitry for signal processing (e.g., low pass filter(s), high pass filter(s), band pass filter(s), pulse width modulators (PWM), signal rectifiers, etc.). In some cases, circuitry of controller 1020 can comprise a Wheatstone bridge architecture, e.g., for processing strain gauge sensor data. A controller 1020 can comprise one or more signal amplifiers 1052 (e.g., analog and/or digital). In some cases, a signal amplifier 1052 of a controller 1020 can amplify sensor data from a low voltage (e.g., between 0 volts and 5 volts) to a voltage readable by a processor 1050 of controller 1020 (e.g., 5 volts).

In some cases, a controller 1020 (e.g., a "local" controller) can comprise an input or input/output terminal (e.g., a 3-pin input/output terminal shown in FIG. 29. In some cases, an input terminal of a (e.g., "local") controller 1020 can be used to supply power to controller 1020 and/or to one or more sensors 1013 (e.g., via a wired connection). In some cases, an input/output terminal can be used to send data (e.g., raw and/or processed sensor data) to an external controller 1066. In some cases, an input/output terminal can be used to receive programming code for a processor of controller 1020. A controller 1020 (e.g., a "local" controller) can comprise a voltage regulator (e.g., a five volt regulator), which can accept power at a higher voltage (e.g., 6.5 Volts to 20 Volts) and step the voltage down to an amplitude usable by the controller 1020 and/or one or more sensors 1013 of the slew drive system.

FIG. 30 shows a diagram of a sensor data processing system of a slew drive system 1000. In some cases, a sensor 1013 (e.g., a force or strain sensor) can send measured data to a signal amplifier 1052 of controller 1020 (e.g., via wiring 1032 or via a wireless connection). In some cases, data from one or more sensors 1013 can be sent to an analog-to-digital converter 1054 from the sensor 1013 or the signal amplifier 1052. In some cases, data from one or more sensors 1013 can be sent to a processor 1050 (e.g., microprocessor), which can be located on controller 1020 from sensor 1013, signal amplifier 1052, and/or analog-to-digital converter 1054. In some cases, a temperature sensor 1048 (e.g., on board controller 1020 or connected to controller 1020 via a wired or wireless connection) can send measured data to an analog-to-digital converter and/or to a processor 1050 of controller 1020. In some cases, processor 1050 can execute instructions stored (e.g., as programmable code) on a non-transitory memory 1064 of controller 1020 or on an external memory in communication with microprocessor 1050 to perform functions 1060 related to data processing functions (e.g., data signal processing) and/or to control operation of one or more sensors 1013. In some cases, functions 1060 performed by processor 1050 can improve data stream performance. In some cases, instructions stored upon non-transitory memory 1064 can comprise calibration data, recorded data, and/or user settings. In some cases, a controller 1020 comprises a crystal oscillator 1056, e.g., for governing the frequency of sensor data collection and/or data output. In some cases, data can be converted by a processor 1050 to a second format (e.g., RS485 format for transmission). In some cases, processor 1050 can transmit data (e.g., comprising raw or processed sensor data) to and/or from a transceiver 1058 (e.g., an RS485 transceiver such as a MAX485 transceiver) for transmission to and/or from an external controller 1066 (e.g., via wireless communication). Additional storage, analysis, and/or processing of transmitted data can be performed by external controller 1066. In some cases, instructions (e.g., instructions for storage on non-transitory memory 1064 and/or execution by processor 1050) can be received from external controller 1066 via transceiver 1058.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

What is claimed is:

1. A slew drive system comprising:
   a worm gear shaft having an end wall;
   a sensor carrier comprising a deformation element; and
   one or more sensors coupled to the deformation element, wherein the one or more sensors comprise one or more sensors coupled to a frame of the sensor carrier;
   wherein the sensor carrier is coupled to the end wall of the worm gear shaft.

2. The system of claim 1, wherein the one or more sensors are configured to measure a deformation of the deformation element.

3. The system of claim 1, wherein the deformation element is a cantilevered deformation element.

4. The system of claim 3, wherein the cantilevered deformation element decreases in width along its length.

5. The system of claim 1, further comprising a worm gear interface pin.

6. The system of claim 5, wherein an interface surface of the worm gear interface pin is configured to contact the deformation element.

7. The system of claim 6, wherein the worm gear interface pin comprises a rounded interface surface.

8. The system of claim 5, wherein the worm gear interface pin comprises one or more worm gear interface pin post flanges.

9. The system of claim 5, wherein the worm gear interface pin comprises a worm gear interface pin post configured to engage a worm gear end surface hole.

10. The system of claim 1, wherein the one or more sensors comprises a strain gauge sensor or a force sensor.

11. The system of claim 1, wherein the one or more sensors comprise a plurality of linear strain gauge sensors.

12. The system of claim 1, further comprising a temperature sensor.

13. The system of claim 1, further comprising a controller in communication with at least one sensor of the one or more sensors.

14. The system of claim 13, wherein the controller comprises a non-transitory memory.

15. The system of claim 13, wherein the controller comprises a processor configured to determine a force applied to the deformation element based on one or more measurements from the one or more sensors.

16. The system of claim 13, wherein the controller is configured to convert one or more analog measurements from the one or more sensors into one or more digital signals.

17. The system of claim 13, further comprising a remote controller in wireless communication with the controller.

18. The system of claim 13, further comprising a distal end cap coupled to the housing of the slew drive system, wherein the controller is coupled to the distal end cap.

19. The system of claim 18, further comprising a seal disposed between the distal end cap and the housing of the slew drive system.

20. A slew drive system comprising:
    a worm gear shaft having an end wall;
    a sensor carrier comprising a deformation element, wherein the deformation element is a cantilevered deformation element; and
    one or more sensors coupled to the deformation element;
    wherein the sensor carrier is coupled to the end wall of the worm gear shaft.

21. A slew drive system comprising:
    a worm gear shaft having an end wall;
    a sensor carrier comprising a deformation element;
    one or more sensors coupled to the deformation element;
    a controller in communication with at least one sensor of the one or more sensors; and
    a distal end cap coupled to the housing of the slew drive system, wherein the controller is coupled to the distal end cap;
    wherein the sensor carrier is coupled to the end wall of the worm gear shaft.

* * * * *